US012577146B2

(12) United States Patent
Lepicard et al.

(10) Patent No.: US 12,577,146 B2
(45) Date of Patent: Mar. 17, 2026

(54) BORATE AND SILICOBORATE OPTICAL GLASSES WITH HIGH REFRACTIVE INDEX AND LOW LIQUIDUS TEMPERATURE

(71) Applicant: CORNING INCORPORATED, Corning, NY (US)

(72) Inventors: Antoine Marie Joseph Lepicard, Melun (FR); Jian Luo, Painted Post, NY (US); Alexander I Priven, Sejong-si (KR)

(73) Assignee: Corning Incorporated, Corning, NY (US)

( * ) Notice: Subject to any disclaimer, the term of this patent is extended or adjusted under 35 U.S.C. 154(b) by 850 days.

(21) Appl. No.: 17/874,792

(22) Filed: Jul. 27, 2022

(65) Prior Publication Data

US 2023/0073656 A1 Mar. 9, 2023

Related U.S. Application Data

(60) Provisional application No. 63/228,704, filed on Aug. 3, 2021.

(30) Foreign Application Priority Data

Aug. 25, 2021 (NL) ...................................... 2029053

(51) Int. Cl.
| | |
|---|---|
| C03C 3/14 | (2006.01) |
| C03C 3/064 | (2006.01) |
| C03C 3/068 | (2006.01) |
| C03C 3/072 | (2006.01) |
| C03C 3/155 | (2006.01) |
| C03C 3/19 | (2006.01) |
| C03C 4/00 | (2006.01) |

(52) U.S. Cl.
CPC ............... C03C 3/14 (2013.01); C03C 3/064 (2013.01); C03C 3/068 (2013.01); C03C 3/072 (2013.01); C03C 3/142 (2013.01); C03C 3/155 (2013.01); C03C 3/19 (2013.01); C03C 4/00 (2013.01)

(58) Field of Classification Search
CPC .. C03C 3/14; C03C 3/15; C03C 3/155; C03C 3/064; C03C 3/068
See application file for complete search history.

(56) References Cited

U.S. PATENT DOCUMENTS

| | | | |
|---|---|---|---|
| 3,480,566 | A | 11/1969 | Hoffman et al. |
| 5,288,669 | A | 2/1994 | Grateau et al. |
| 6,121,176 | A | 9/2000 | Comte |
| 6,187,702 | B1 | 2/2001 | Morishita |
| 7,091,145 | B2 | 8/2006 | Wolff et al. |
| 7,232,779 | B2 | 6/2007 | Kasuga et al. |
| 7,560,405 | B2 | 7/2009 | Hayashi et al. |
| 7,598,193 | B2 | 10/2009 | Endo |

| | | | |
|---|---|---|---|
| 7,655,585 | B2 | 2/2010 | Hayashi |
| 7,737,064 | B2 | 6/2010 | Fu |
| 7,820,576 | B2 | 10/2010 | Manabu |
| 7,827,823 | B2 | 11/2010 | Kasuga et al. |
| 7,855,158 | B2 | 12/2010 | Fujiwara |
| 8,034,733 | B2 | 10/2011 | Kobayashi et al. |
| 8,053,384 | B2 | 11/2011 | Fu |
| 8,404,606 | B2 | 3/2013 | Wolff et al. |
| 8,476,177 | B2 | 7/2013 | Ritter et al. |
| 8,486,536 | B2 | 7/2013 | Zou et al. |
| 8,563,451 | B2 | 10/2013 | Fu |
| 8,575,048 | B2 | 11/2013 | Negishi et al. |
| 8,609,560 | B2 | 12/2013 | Negishi |
| 8,661,853 | B2 | 3/2014 | Negishi et al. |
| 8,728,963 | B2 | 5/2014 | Negishi et al. |
| 8,741,795 | B2 | 6/2014 | Zou et al. |
| 8,835,336 | B2 | 9/2014 | Taguchi |
| 8,835,337 | B2 | 9/2014 | Negishi |
| 8,859,444 | B2 | 10/2014 | Yamaguchi et al. |
| 8,883,664 | B2 | 11/2014 | Negishi |
| 8,945,713 | B2 | 2/2015 | Satou et al. |
| 8,956,988 | B2 | 2/2015 | Fujiwara |
| 9,011,720 | B2 | 4/2015 | Aitken et al. |
| 9,169,152 | B2 | 10/2015 | Kuang |

(Continued)

FOREIGN PATENT DOCUMENTS

| | | |
|---|---|---|
| CN | 1935717 A | 3/2007 |
| CN | 102910816 A | 2/2013 |

(Continued)

OTHER PUBLICATIONS

Babu, et al., "Spectral Investigations of Er3+ Doped Lead Bismuth Borophosphate Glasses", International Journal of Science and Research (IJSR) ISSN, vol. 2319-7064, Impact Factor, 2013: 4.438, 5 pages.

Bale S., et al., "Optical absorption and EPR studies on (70-x)Bi2O3-xLi2O-30(ZnO—B2O3) (0<=x<=20) glasses", J.Non-Cryst.Solids, 2009, vol. 355, No. 43-44, pp. 2127-2133.

Chagraoui A., et al., "Synthesis and characterization of new amorphous and crystalline phases in Bi2O3—SrO—TeO2 system", J. Mater. Process. Technol., 2009, vol. 209, No. 7, pp. 3111-3116.

Champarnaud-Mesjard, et al., "Glass formation study in the Bi2O3—TeO3—TeO2—WO3 system", Ann. Chim. Sci.Mat., 1998, vol. 23, pp. 289-292.

Chandrashekaraiah G., et al., "Role of Er3+ and Bi3+ ions on thermal and optical properties of Li2B4O7 glasses: Structural correlation", J. Non-Cryst. Solids, 2018, vol. 498, pp. 252-261.

(Continued)

*Primary Examiner* — Elizabeth A. Bolden

(74) *Attorney, Agent, or Firm* — Kevin L. Bray

(57) ABSTRACT

Glass compositions include boron oxide (B₂O₃), lanthanum oxide (La₂O₃), tungsten oxide (WO₃) and zirconia (ZrO₂) as components and may optionally include niobia (Nb₂O₅), titania (TiO₂), bismuth oxide (Bi₂O₃), yttria (Y₂O₃), tellurium oxide (TeO₂), SiO₂, PbO and other components. The glasses may be characterized by high refractive index at 587.56 nm and low density at room temperature relative to known glasses.

20 Claims, 9 Drawing Sheets

(56) References Cited

U.S. PATENT DOCUMENTS

| | | | |
|---|---|---|---|
| 9,255,028 | B2 | 2/2016 | Negishi et al. |
| 9,302,930 | B2 | 4/2016 | Negishi et al. |
| 9,394,194 | B2 | 7/2016 | Negishi |
| 9,416,047 | B2 | 8/2016 | Yamaguchi |
| 9,487,432 | B2 | 11/2016 | Kuang |
| 9,643,880 | B2 | 5/2017 | Negishi |
| 10,259,738 | B2 | 4/2019 | Sun |
| 10,287,205 | B2 | 5/2019 | Sun |
| 10,442,722 | B2 | 10/2019 | Sun |
| 2015/0203395 | A1* | 7/2015 | Kuang .................... C03C 3/068 |
| | | | 501/78 |
| 2021/0179479 | A1 | 6/2021 | Amma et al. |
| 2022/0306517 | A1 | 9/2022 | Epicard et al. |

FOREIGN PATENT DOCUMENTS

| | | | |
|---|---|---|---|
| CN | 103708724 A | 4/2014 | |
| CN | 102219374 B | 5/2015 | |
| CN | 107879620 A | 4/2018 | |
| CN | 110963706 A | 4/2020 | |
| CN | 111320384 A | 6/2020 | |
| CN | 111892296 A | 11/2020 | |
| CN | 111943502 A | 11/2020 | |
| CN | 112028472 A | 12/2020 | |
| CN | 112028473 A | 12/2020 | |
| DE | 2653581 C3 | 12/1982 | |
| DE | 3201344 A1 | 7/1983 | |
| DE | 206138 A1 | 1/1984 | |
| EP | 4059901 A1 | 9/2022 | |
| IN | 111018343 A | 4/2020 | |
| IN | 111977970 A | 11/2020 | |
| JP | 50-018509 A | 2/1975 | |
| JP | 50-097470 A | 8/1975 | |
| JP | 53-078048 A | 7/1978 | |
| JP | 60-122745 A | 7/1985 | |
| JP | 63-274638 A | 11/1988 | |
| JP | 08-157234 A | 6/1996 | |
| JP | 09-278480 A | 10/1997 | |
| JP | 2000-128570 A | 5/2000 | |
| JP | 2001-072432 A | 3/2001 | |
| JP | 2002-012443 A | 1/2002 | |
| JP | 2002-362939 A | 12/2002 | |
| JP | 2004-175632 A | 6/2004 | |
| JP | 2005-047732 A | 2/2005 | |
| JP | 2005-330154 A | 12/2005 | |
| JP | 2006-182577 A | 7/2006 | |
| JP | 2007-112697 A | 5/2007 | |
| JP | 2008-105863 A | 5/2008 | |
| JP | 2008-214135 A | 9/2008 | |
| JP | 2008-273751 A | 11/2008 | |
| JP | 2009-096662 A | 5/2009 | |
| JP | 2009-102215 A | 5/2009 | |
| JP | 2009-203083 A | 9/2009 | |
| JP | 2010-052954 A | 3/2010 | |
| JP | 2011-116275 A | 6/2011 | |
| JP | 2011-228167 A | 11/2011 | |
| JP | 5097470 B2 | 12/2012 | |
| JP | 2017019696 A * | 1/2017 | ............ C03C 3/155 |
| JP | 2019-196296 A | 11/2019 | |
| JP | 2020-059628 A | 4/2020 | |
| JP | 2020-059629 A | 4/2020 | |
| JP | 2020-073453 A | 5/2020 | |
| JP | 2021-031378 A | 3/2021 | |
| RU | 1533244 A1 | 11/1994 | |
| RU | 141274 U1 | 5/2014 | |
| SU | 798060 A1 | 1/1981 | |
| TW | 201713602 A | 4/2017 | |
| TW | 201900572 A | 1/2019 | |
| WO | 2012/014839 A1 | 2/2012 | |
| WO | 2012/046833 A1 | 4/2012 | |
| WO | 2012/099168 A1 | 7/2012 | |
| WO | 2013/084706 A1 | 6/2013 | |
| WO | 2014/187132 A1 | 11/2014 | |
| WO | WO-2019017205 A1 * | 1/2019 | ............ C03C 3/068 |
| WO | 2019/131123 A1 | 7/2019 | |
| WO | 2020/034210 A1 | 2/2020 | |
| WO | 2020/034215 A1 | 2/2020 | |
| WO | 2020/045417 A1 | 3/2020 | |
| WO | 2020/062009 A1 | 4/2020 | |
| WO | 2020/203673 A1 | 10/2020 | |
| WO | 2021/006072 A1 | 1/2021 | |
| WO | 2021/065456 A1 | 4/2021 | |
| WO | 2021/085271 A1 | 5/2021 | |
| WO | 2022/048335 A1 | 3/2022 | |

OTHER PUBLICATIONS

Dai Shixun, et al., "Optical properties of and concentration quenching in Bi2O3—B2O3—Ga2O3 glasses", J. Non-Cryst. Solids, 2007, vol. 353, No. 28, pp. 2744-2749.

European Patent Application No. 22186978.7, European Search Report dated Dec. 13, 2022; 3 pages; European Patent Office.

Fujino S., et al., "Measurements of refractive indexes and factors affecting dispersion in oxide glasses", J. Am. Ceram. Soc., 1995, vol. 78, No. 5, pp. 1179-1184.

Imaoka M., et al., "Refractive index and Abbes number of glass of lanthanum borate system", J. Ceram. Assoc. Japan, 1962, vol. 70, No. 5, pp. 115-123.

Jackson J., et al., "Estimation of peak Raman gain coefficients for barium-bismuth-tellurite glasses from spontaneous Raman cross-section experiments", Optics Express, 2009, vol. 17, No. 11, pp. 9071-9079.

Kaky K.M., et al., "Stuctural, optical and radiation shielding properties of zinc borotellurite alumina glasses", Appl. Phys. A., 2019, vol. 125, pp. 32-1.

Lin H., et al., "Spectral parameters and visible fluorescence of Sm3+ in alkali-barium-bismuth-tellurite glass with high refractive index", J. Luminescence, 2006, vol. 116, No. 1-2, pp. 139-144.

Mochida N., et al., "Properties and structure of glasses in the systems MO3/2—BO3/2 (M: As, Sb, Bi)", J. Ceram. Soc. Japan, 1976, vol. 84, No. 9, pp. 413-420.

Rabukhin A.I., et al., "Refraction and molecular volume of bismuth-containing gallate glasses", Steklo Keram., 1992, No. 9, p. 8-9.

Rabukhin A.I., et al., "Sound velocity and compressibility of bismuth-containing gallate glasses", Steklo Keram., 1993, No. 3, pp. 13-14.

Rabukhin A.I., etal., "Photoelastic constants of bismuth-containing gallate glasses", Steklo Keram., 1992, No. 10, pp. 7-9.

Saddeek Y.B., et al., "Spectroscopic properties, electronic polarizability, and optical basicity of Bi2O3—Li2O—B2O3 glasses", Physica B, 2008, vol. 403, No. 13-16, pp. 2399-2407.

Shen Xiang, et al., "Optical transitions of Er3+/Yb3+ codoped TeO2—WO3—Bi2O3 glass_u", Spectrochimica Acta, 2005, vol. A61, No. 13-14, pp. 2827-2831.

Shen Xiang, et al., "Spectral properties of Er3+/Yb3+ codoped tungsten-tellurite glasses_u", Spectrochimica Acta, 2005, vol. A61, No. 9, p. 2189-2193.

Strimple J.H., et al., "Glass formation and properties of glasses in the system Na2O—B2O3—SiO2—TiO2", J. Am. Ceram. Soc., 1958, vol. 41, No. 7, pp. 231-237.

Wang Jun, et al., "Effect of WO3 on the spectroscopic properties in Er3+/Yb3+ co-doped bismuth-borate glasses", Physica B, 2007, vol. 400, No. 1-2, pp. 224-228.

Wang X.Y., et al., "Derivation of quantum yields for visible emission transitions of Sm3+ in heavy metal tellurite glass", Optics Communications, 2007, vol. 276, No. 1, pp. 122-126.

Xu Tiefeng, et al., "Effect of SiO2 content on the thermal stability and spectroscopic properties of Er3+/Yb3+ co-doped tellurite borate glasses", Physica B, 2007, vol. 389, No. 2, pp. 242-247.

Xu Tiefeng, et al., "Spectral properties and thermal stability of Er3+/Yb3+ codoped tungsten-tellurite glasses_u", Optical Materials, 2006, vol. 28, No. 3, pp. 241-245.

Yakhkind A.K., Tellurite glasses., J.Am.Ceram.Soc., 1966, vol. 49, No. 12, pp. 670-675.

* cited by examiner

BORATE AND SILICOBORATE OPTICAL GLASSES WITH HIGH REFRACTIVE INDEX AND LOW LIQUIDUS TEMPERATURE

This application claims the benefit of priority to Dutch Patent Application No. 2029053 filed on Aug. 25, 2021, which claims priority from U.S. Provisional Patent Application Ser. No. 63/228,704 filed on Aug. 3, 2021, the content of which is relied upon and incorporated herein by reference in its entirety.

FIELD

The present disclosure generally relates to borate and silicoborate glasses having a high refractive index, low density, and low liquidus temperature.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glass-forming ability of the material. For example, crystallization and/or liquid-liquid phase separation can occur during cooling of the glass melt at cooling rates that are generally preferred in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borate glasses are typically easier to produce and in some cases can exhibit a high transmittance without a bleaching step. However, silicoborate and boro-silicate glasses typically exhibit an increase in density at increasing refractive indices, compared to phosphate glasses.

In view of these considerations, there is a need for borate and silicoborate glasses having a high refractive index, a low density, and a high transmittance to blue light.

SUMMARY

According to an embodiment of the present disclosure, a glass comprises a plurality of components, the glass having a composition of the components comprising greater than or equal to 10.0 mol. % and less than or equal to 40.0 mol. % $B_2O_3$, greater than or equal to 0.0 mol. % and less than or equal to 40.0 mol. % $WO_3$, greater than or equal to 0.0 mol. % and less than or equal to 30.0 mol. % $Nb_2O_5$, greater than or equal to 0.0 mol. % and less than or equal to 30.0 mol. % $TiO_2$, greater than or equal to 0.0 mol. % and less than or equal to 25.0 mol. % $La_2O_3$, greater than or equal to 0.0 mol. % and less than or equal to 20.0 mol. % $Bi_2O_3$, greater than or equal to 0.0 mol. % and less than or equal to 15.0 mol. % $TeO_2$, greater than or equal to 0.0 mol. % and less than or equal to 15.0 mol. % $ZrO_2$, greater than or equal to 0.0 mol. % and less than or equal to 10.0 mol. % $SiO_2$, greater than or equal to 0.0 mol. % and less than or equal to 10.0 mol. % PbO, greater than or equal to 0.0 mol. % and less than or equal to 10.0 mol. % $GeO_2$, greater than or equal to 0.0 mol. % and less than or equal to 10.0 mol. % $P_2O_5$, greater than or equal to 0.0 mol. % and less than or equal to 6.0 mol. % $Y_2O_3$, greater than or equal to 0.0 mol. % and less than or equal to 5.0 mol. % $V_2O_5$, greater than or equal to 0.1 mol. % $WO_3+Bi_2O_3$ and may optionally contain one or more components selected from rare earth metal oxides $RE_mO_n$, $Al_2O_3$, BaO, CaO, $K_2O$, $Li_2O$, MgO, $Na_2O$, SrO, $Ta_2O_5$ and ZnO, wherein the composition of the components satisfies the condition: $RE_mO_n+ZrO_2—Nb_2O_5$ [mol. %]≥5.0, and wherein the glass satisfies the conditions: $P_n>2.04$ and $-5≤P_{GF}≤15$, where $P_n$ is a refractive index parameter, calculated from the glass composition in terms of mol. % of the components according to the Formula (IV):

$$P_n=-0.0058979*Al_2O_3-0.006059*B_2O_3-$$
$$0.00099077*BaO+0.008748*Bi_2O_3-$$
$$0.0023394*CaO+0.0063304*Er_2O_3+$$
$$0.0019089*Gd_2O_3-0.0043254*GeO_2-$$
$$0.0056788*K_2O+0.0036519*La_2O_3-$$
$$0.0033647*Li_2O-0.0036379*MgO-$$
$$0.0043599*Na_2O+0.0027829*Nb_2O_5-$$
$$0.0085247*P_2O_5+0.0016124*PbO-$$
$$0.0054718*SiO_2-0.0024916*SrO+$$
$$0.0052979*Ta_2O_5-0.0030478*TeO_2+$$
$$0.0018048*TiO_2+0.00087206*WO_3+$$
$$0.0026681*Y_2O_3+0.0052852*Yb_2O_3-$$
$$0.0012391*ZnO+2.05, \qquad (IV)$$

$P_{GF}$ is a glass formation parameter, calculated from the glass composition in terms of mol. % of the components according to the Formula (III):

$$P_{GF}=(B_2O_3/3)+max(0,WO_3-TiO_2-0.5*ZrO_2)+$$
$$Nb_2O_5+Ta_2O_5—(RE_mO_n+Bi_2O_3), \qquad (III)$$

where $RE_mO_n$ is a total sum of rare earth metal oxides, $max(0, WO_3-TiO_2-0.5*ZrO_2)$ refers to the greater of 0 and a difference $WO_3-TiO_2-0.5*ZrO_2$, and an asterisk (*) means multiplication.

According to another embodiment of the present disclosure, a glass comprises a plurality of components, the glass having a composition of the components comprising greater than or equal to 10.0 mol. % and less than or equal to 40.0 mol. % $B_2O_3$, greater than or equal to 0.5 mol. % and less than or equal to 20.0 mol. % $Bi_2O_3$, greater than or equal to

3

0.0 mol. % and less than or equal to 3.0 mol. % $P_2O_5$, greater than or equal to 0.0 at. % and less than or equal to 1.0 at. % Cu, greater than or equal to 0.0 at. % and less than or equal to 1.0 at. % Fe, greater than or equal to 0.0 mol. % and less than or equal to 25.0 mol. % BaO+SrO+ZnO+CdO, greater than or equal to 0.0 mol. % and less than or equal to 5.0 mol. % $MoO_3+V_2O_5$ and may optionally contain one or more components selected from $TiO_2$, $Nb_2O_5$, $SiO_2$, $Al_2O_3$, CaO, $Er_2O_3$, $Gd_2O_3$, $GeO_2$, $K_2O$, $La_2O_3$, $Li_2O$, MgO, $Na_2O$, PbO, $Ta_2O_5$, $TeO_2$, $WO_3$, $Y_2O_3$, $Yb_2O_3$ and $ZrO_2$, wherein the composition of the components satisfies the conditions: $TiO_2$— $Nb_2O_5$ [mol. %]≤5.0 and $SiO_2$— $B_2O_3$ [mol. %]≤ 5.0, and the glass satisfies the conditions: $P_n$>1.9 and $P_n$–(1.483+0.104*$P_d$)>0.000, where $P_n$ is a refractive index parameter, calculated from the glass composition in terms of mol. % of the components according to the Formula (IV):

$$P_n=-0.0058979*Al_2O_3-0.006059*B_2O_3-$$
$$0.00099077*BaO+0.008748*Bi_2O_3-$$
$$0.0023394*CaO+0.0063304*Er_2O_3+$$
$$0.0019089*Gd_2O_3-0.0043254*GeO_2-$$
$$0.0056788*K_2O+0.0036519*La_2O_3-$$
$$0.0033647*Li_2O-0.0036379*MgO-$$
$$0.0043599*Na_2O+0.0027829*Nb_2O_5-$$
$$0.0085247*P_2O_5+0.0016124*PbO-$$
$$0.0054718*SiO_2-0.0024916*SrO+$$
$$0.0052979*Ta_2O_5-0.0030478*TeO_2+$$
$$0.0018048*TiO_2+0.00087206*WO_3+$$
$$0.0026681*Y_2O_3+0.0052852*Yb_2O_3-$$
$$0.0012391*ZnO+2.05, \qquad \text{(IV)}$$

$P_d$ is a density parameter, calculated from the glass composition in terms of mol. % of the components according to the Formula (V):

$$P_d=4.488-0.030315*Al_2O_3-0.023886*B_2O_3+$$
$$0.022641*BaO+0.075639*Bi_2O_3-$$
$$0.0035072*CaO+0.072631*Er_2O_3+$$
$$0.072133*Gd_2O_3-0.014396*GeO_2-$$
$$0.019374*K_2O+0.051970*La_2O_3-$$
$$0.011393*Li_2O-0.0049704*MgO-$$
$$0.010898*Na_2O+0.0014888*Nb_2O_5-$$
$$0.043265*P_2O_5+0.032783*PbO-$$
$$0.021778*SiO_2+0.0071976*SrO+$$
$$0.056465*Ta_2O_5+0.0079679*TeO_2-$$
$$0.0080419*TiO_2+0.023079*WO_3+$$
$$0.031205*Y_2O_3+0.080706*Yb_2O_3+$$
$$0.010824*ZnO+0.0073434*ZrO_2, \qquad \text{(V)}$$

where an asterisk (*) means multiplication.

According to one more embodiment of the present disclosure, a glass comprises a plurality of components, the glass having a composition of the components comprising greater than or equal to 10.0 mol. % $B_2O_3$, greater than or equal to 3.0 mol. % and less than or equal to 30.0 mol. % $Nb_2O_5$, greater than or equal to 0.0 mol. % and less than or equal to 40.0 mol. % $TiO_2$, greater than or equal to 0.0 mol. % and less than or equal to 25.0 mol. % $La_2O_3$, greater than or equal to 0.0 mol. % and less than or equal to 15.0 mol. % $Bi_2O_3$, greater than or equal to 0.0 mol. % and less than or equal to 14.0 mol. % $TeO_2$, greater than or equal to 0.0 mol. % and less than or equal to 10.0 mol. % $P_2O_5$, greater than or equal to 0.0 mol. % and less than or equal to 10.0 mol. % $GeO_2$, greater than or equal to 2.0 mol. % $WO_3+Bi_2O_3$, greater than or equal to 2.0 mol. % $TiO_2+ZrO_2$, greater than or equal to 1.0 mol. % $TiO_2+Nb_2O_5$, greater than or equal to 0.0 mol. % and less than or equal to 20.0 mol. % BaO+ZnO and may optionally contain one or more components selected from $SiO_2$, $Al_2O_3$, CaO, $Er_2O_3$, $Gd_2O_3$, $K_2O$, $Li_2O$, MgO, $Na_2O$, PbO, SrO, $Ta_2O_5$, $Y_2O_3$ and $Yb_2O_3$, wherein the composition of the components satisfies the condition: $Nb_2O_5$— $SiO_2$ [mol. %]≥3.0, and the glass satisfies the conditions: 500≤$P_{Tg}$≤750 and $P_n$–(1.47+0.0009*$P_{Tg}$) >0.000, where $P_n$ is a refractive index parameter, calculated from the glass composition in terms of mol. % of the components according to the Formula (IV):

$$P_n=-0.0058979*Al_2O_3-0.006059*B_2O_3-$$
$$0.00099077*BaO+0.008748*Bi_2O_3-$$
$$0.0023394*CaO+0.0063304*Er_2O_3+$$
$$0.0019089*Gd_2O_3-0.0043254*GeO_2-$$
$$0.0056788*K_2O+0.0036519*La_2O_3-$$
$$0.0033647*Li_2O-0.0036379*MgO-$$
$$0.0043599*Na_2O+0.0027829*Nb_2O_5-$$
$$0.0085247*P_2O_5+0.0016124*PbO-$$
$$0.0054718*SiO_2-0.0024916*SrO+$$
$$0.0052979*Ta_2O_5-0.0030478*TeO_2+$$
$$0.0018048*TiO_2+0.00087206*WO_3+$$
$$0.0026681*Y_2O_3+0.0052852*Yb_2O_3-$$
$$0.0012391*ZnO+2.05, \qquad \text{(IV)}$$

$P_{Tg}$ is a $T_g$ parameter, calculated from the glass composition in terms of mol. % of the components according to the Formula (VI):

$$P_{Tg}=590+1.2049*Al_2O_3-0.73463*B_2O_3+$$
$$0.48384*BaO-4.6279*Bi_2O_3+5.1528*Er_2O_3+$$
$$4.7419*Gd_2O_3-0.46782*GeO_2-5.4336*K_2O+$$
$$3.6709*La_2O_3-4.4120*Li_2O-4.5127*Na_2O+$$
$$1.5185*Nb_2O_5-2.2882*PbO+0.18633*SiO_2+$$
$$0.59627*SrO+2.9784*Ta_2O_5-4.1591*TeO_2+$$
$$1.1157*TiO_2-2.0154*WO_3+4.7923*Y_2O_3+$$
$$3.0372*Yb_2O_3-1.8077*ZnO+0.40110*ZrO_2, \qquad \text{(VI)}$$

where an asterisk (*) means multiplication.

These and other aspects, objects, and features of the present disclosure will be understood and appreciated by those skilled in the art upon studying the following specification, claims, and appended drawings.

DETAILED DESCRIPTION

Figure 1:
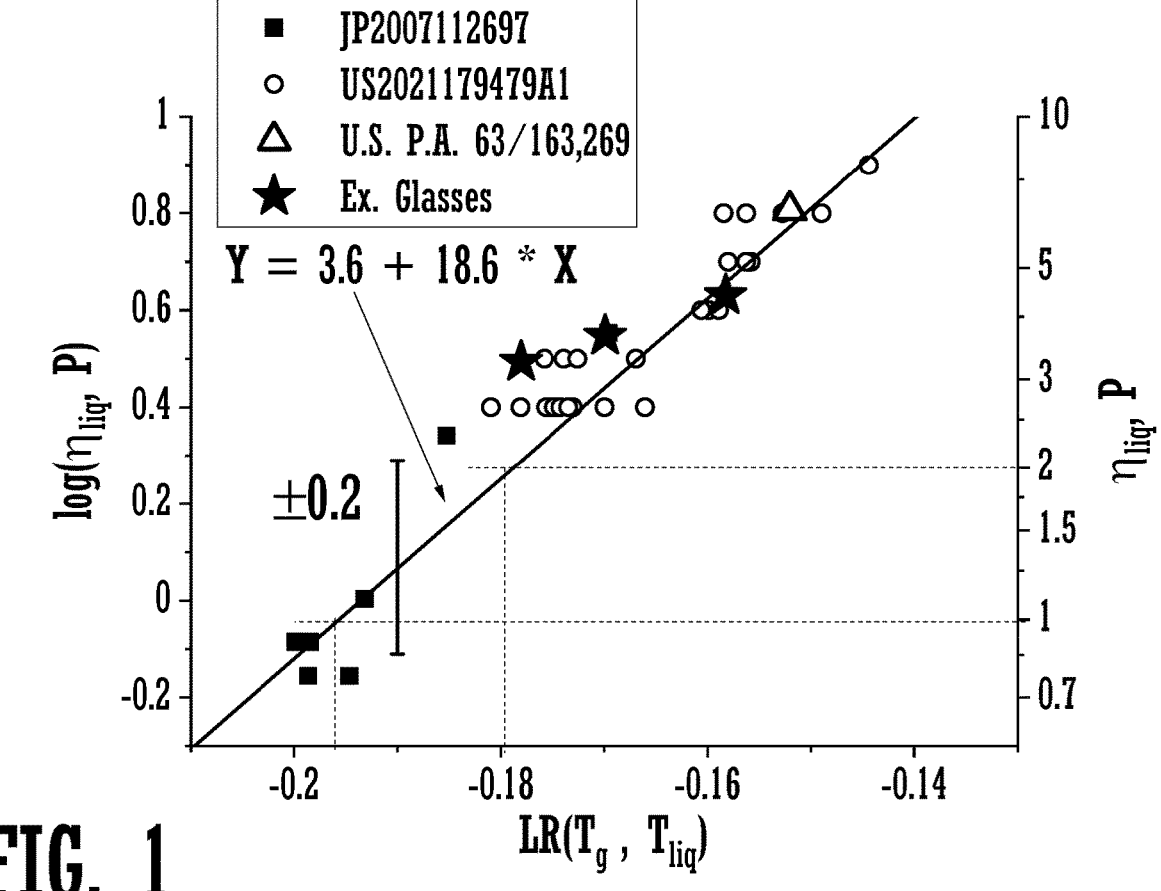
FIG. 1 is a plot illustrating the relationship between the ratio ($T_g/T_{liq}$) and liquidus viscosity for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "component" refers to a material or compound included in a batch composition from which a glass is formed. Components include oxides, including but not limited to those expressed in Formulas (III), (IV), (V), and (VI), and the claims. Representative components include $B_2O_3$, $SiO_2$, $WO_3$, $Nb_2O_5$, $TiO_2$, $ZrO_2$, $La_2O_3$, $Bi_2O_3$, $TeO_2$, etc. Other representative components include halogens (e.g. F, Br, Cl). Whenever a component is included as a term in a mathematical expression or formula, it is understood that the component refers to the amount of the component in units of mol. % in the batch composition of the glass. For example, the expression $B_2O_3 + WO_3$ refers to the sum of the amount of $B_2O_3$ in units of mol. % and the amount of $WO_3$ in units of mol. % in the batch composition of the glass. A mathematical expression or formula is any expression or formula that includes a mathematical operator such as "+", "−", "*", "/" or "max".

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular component in a glass composition, refers to a component that is not intentionally added to the glass composition and is present in an amount of less than 0.10 mol. %. Tramp components may be unintentionally added to the glass composition as an impurity in another component and/or through migration of the tramp component into the composition during processing of the glass composition.

Unless otherwise specified, the term "glass" is used to refer to a glass made from a glass composition disclosed herein.

The symbol "*" means multiplication when used in any mathematical expression or formula herein.

The term "log" means logarithm in base 10.

Temperature is expressed herein in units of ° C. (degrees Celsius).

The term "glass former" is used herein to refer to a component that, being solely present in the glass composition (i.e., without other components, except possibly for tramps), is able to form a glass when cooling a melt of the component at a rate of not greater than about 200° C./min to about 300° C./min.

The term "modifier", as used herein, refers to the oxides of monovalent or divalent metals, i.e., $R_2O$ or RO, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal RE has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in EuO, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting as-batched composition is recalculated assuming that two moles of $CeO_2$ is equivalent to one mole of $Ce_2O_3$, and the resulting as-batched composition is expressed in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state, also specified as "trivalent equivalent".

Unless otherwise specified, all compositions are expressed in terms of as-batched mole percent (mol. %) of the components of the glass. As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol. % when measuring final articles as compared to the as-batched compositions provided herein. With the forgoing in mind, substantial compositional equivalence between final articles and as-batched compositions is expected.

In the case when fluorine or other halogen (chlorine, bromine, and/or iodine) is added to or is present in an oxide glass, the molecular representation of the resulting glass composition may be expressed in different ways. In the present disclosure, the content of fluorine as a single term, when present, is expressed in terms of atomic percent (at. %), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si_4^+$], boron [$B_3^+$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The said fluorine is assumed to be present in the form of silicon fluoride ($SiF_4$); accordingly, the total sum of all oxides plus $SiF_4$ is assumed to be 100 mole percent or 100 weight percent in all compositions.

The measured density values for the glasses reported herein were measured at room temperature in units of $g/cm^3$ by the Archimedes method in water with an error of 0.001 $g/cm^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 $g/cm^3$.

As used herein, good glass forming ability refers to a resistance of the melt to devitrification as the batch cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible to the naked eye under an optical microscope under magnification of 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermal event corresponding to the melting of crystals was taken as the liquidus temperature. For the second technique (isothermal hold), a glass block (about 1 $cm^3$) was wrapped in platinum foil, to avoid volatilization, and placed in a furnace at a given temperature for 17 hours. The glass block was then observed under an optical microscope to check for crystals.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refer to a refractive index value of a glass that is greater than or equal to at least 1.90, unless otherwise indicated. Where indicated, embodiments of the terms "high refractive index" or "high index" refer to a refractive index value of a glass that is greater than or equal to at least 1.95, greater than or equal to 2.00, or greater than or equal to 2.05.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_x = (n_x-1)/(n_F-n_C)$, where "x" in the present disclosure stands for one of the commonly used wavelengths (for example, 587.56 nm [d-line] for $v_d$ or 589.3 nm [D-line] for $v_D$), $n_x$ is the refractive index at this wavelength (for example, $n_d$ for $v_d$ and $n_D$ for $v_D$), and $n_F$ and $n_C$ are refractive indices at the wavelengths 486.1 nm (F-line) and 656.3 nm (C-line), respectively. The numerical values of $v_d$ and $V_D$ differ very slightly, mostly within ±0.1% to ±0.2%. As reported herein, the dispersion of a glass sample is represented by the Abbe number ($v_d$), which characterizes the relationship between the refractive indices of the sample at three different wavelengths according to the following formula: $v_d = (n_d-1)/(n_F-n_C)$, where $n_d$ is the refractive index at 587.56 nm (d-line), $n_F$ is the refractive index at 486.1 nm, and $n_C$ is the refractive index at 656.3 nm. A higher Abbe number corresponds to a lower optical dispersion.

As used herein, unless otherwise specified, the term "internal transmittance" or $\tau_{int}$ is used to refer to the transmittance through a glass sample that is corrected for Fresnel losses. The term "total transmittance" or $\tau$ is used to refer to transmittance values for which Fresnel losses are not accounted for. Transmittance of the glass samples were measured on 2 mm thick samples with a Cary 5000 Spectrometer at wavelengths of from 250 nm to 2500 nm, at a resolution of 1 nm, and using an integrating sphere. The internal transmittance values for 10 mm thick samples was calculated between 375 nm and 1175 nm using the measured refractive index and the measured raw transmittance. The wavelengths corresponding to specific values of transmittance, such as, for example, 5% or 70%, are represented with corresponding subscripts, such as $\lambda_{5\%}$ and $\lambda_{70\%}$, respectively.

The term "$\alpha$," or "$\alpha_{20-300}$," as used herein, refers to the coefficient of linear thermal expansion (CTE) of the glass composition over a temperature range from 20° C. (room temperature, or RT) to 300° C. This property is measured by using a horizontal dilatometer (push-rod dilatometer) in accordance with ASTM E228-11. The numeric measure of $\alpha$ is a linear average value in a specified temperature range $\Delta T$ (e.g., RT to 300° C.) expressed as $\alpha = \Delta L/(L_0 \Delta T)$, where $L_0$ is the linear size of a sample at some temperature within or near the measured range, and L is the change in the linear size ($\Delta L$) in the measured temperature range $\Delta T$.

The Young's elastic modulus E is measured by using Resonant Ultrasound Spectroscopy, using a Quasar RUSpec 4000 available from ITW Indiana Private Limited, Magnaflux Division.

The glass transition temperature ($T_g$) is measured by differential scanning calorimeter (DSC) upon heating as-made samples from room temperature at a heating rate of 10 K/min.

Glass composition may include boron oxide ($B_2O_3$). According to some embodiments of the present disclosure, boron oxide may play a role of a glass former. As a glassformer, $B_2O_3$ may help to increase the liquidus viscosity and, therefore, protect a glass composition from crystallization. However, adding $B_2O_3$ to a glass composition may cause liquid-liquid phase separation, which may cause devitrification and/or reducing the transmittance of the resulting glass. Also, adding $B_2O_3$ to the high-index glasses reduces the refractive index. Accordingly, the amount of boron oxide is preferably limited. In embodiments, the glass composition may contain boron oxide ($B_2O_3$) in an amount from greater than or equal to 10.0 mol. % to less than or equal to 40.0 mol. % and all ranges and sub-ranges between the foregoing values. In some embodiments, the glass composition may contain $B_2O_3$ in an amount greater than or equal to 10.0 mol. %, greater than or equal to 15.0 mol. %, greater than or equal to 20.0 mol. %, greater than or equal to 23.5 mol. %, greater than or equal to 24.0 mol. %, greater than or equal to 24.5 mol. %, greater than or equal to 30.0 mol. %, greater than or equal to 34.0 mol. %, greater than or equal to 36.0 mol. %, or greater than or equal to 38.0 mol. %. In some other embodiments, the glass composition may contain $B_2O_3$ in an amount less than or equal to 40.0 mol. %, less than or equal to 38.0 mol. %, less than or equal to 36.0 mol. %, less than or equal to 35.0 mol. %, less than or equal to 34.0 mol. %, less than or equal to 32.0 mol. %, less than or equal to 31.0 mol. %, less than or equal to 30.0 mol. %, less than or equal to 29.0 mol. %, less than or equal to 20.0 mol. %, or less than or equal to 15.0 mol. %. In some more embodiments, the glass composition may contain $B_2O_3$ in an amount greater than or equal to 10.0 mol. % and less than or equal to 40.0 mol. %, greater than or equal to 20.0 mol. % and less than or equal to 35.0 mol. %, greater than or equal to 23.5 mol. % and less than or equal to 32.0 mol. %, greater than or equal to 24.11 mol. % and less than or equal to 29.1 mol. %, greater than or equal to 24.5 mol. % and less than or equal to 31.0 mol. %, greater than or equal to 20.0 mol. % and less than or equal to 29.0 mol. %, greater than or equal to 30.0 mol. % and less than or equal to 31.0 mol. %, greater than or equal to 31.0 mol. % and less than or equal to 32.0 mol. %, greater than or equal to 32.0 mol. % and less than or equal to 40.0 mol. %, greater than or equal to 32.0 mol. % and less than or equal to 34.0 mol. %.

Glass composition may include germania ($GeO_2$). Germania ($GeO_2$) provides excellent ratio between the refractive index and density and does not reduce transmittance. However, germania is expensive. Accordingly, the content of germania is preferably limited, or glasses may be substantially free of $GeO_2$. In embodiments, the glass composition may contain germania ($GeO_2$) in an amount from greater than or equal to 0.0 mol. % to less than or equal to 10.0 mol. % and all ranges and sub-ranges between the foregoing values. In some embodiments, the glass composition may contain $GeO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $GeO_2$ in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 0.5 mol. %. In some more embodiments, the glass composition may contain $GeO_2$ in an amount greater than or equal to 0.0 mol. % and less than or equal to 10.0 mol. %, greater than or equal to 0.0 mol. % and less than or equal to 0.5 mol. %, greater than or equal to 0.5 mol. % and less than or equal to 10.0 mol. %, greater than or equal to 0.5 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %.

Glass composition may include phosphorus oxide ($P_2O_5$). The glass compositions in the embodiments described herein may comprise phosphorus oxide ($P_2O_5$) as an additional glassformer. Greater amounts of $P_2O_5$ cause greater increase the melt viscosity values at a given temperature, which inhibits crystallization from the melt when cooling and, therefore, improves the glass-forming ability of the melt (i.e. lowers the critical cooling rate of the melt). However, $P_2O_5$ decreases the refractive index. Also, in some cases it may stimulate liquid-liquid phase separation, which may cause crystallization of melts when cooling and/or loss of transmittance. Accordingly, the content of $P_2O_5$ is preferably limited, or glasses may be free of $P_2O_5$. In embodiments, the glass composition may contain phosphorus oxide ($P_2O_5$) in an amount from greater than or equal to 0.0 mol. % to less than or equal to 10.0 mol. % and all ranges and sub-ranges between the foregoing values. In some embodiments, the glass composition may contain $P_2O_5$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $P_2O_5$ in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 3.0 mol. %. In some more embodiments, the glass composition may contain $P_2O_5$ in an amount greater than or equal to 0.0 mol. % and less than or equal to 10.0 mol. %, greater than or equal to 0.0 mol. % and less than or equal to 3.0 mol. %, greater than or equal to 3.0 mol. % and less than or equal to 10.0 mol. %, greater than or equal to 3.0 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %.

Glass composition may include silica ($SiO_2$). Silica may play a role of an additional glass-former. Silica, as well as $B_2O_3$, may help to increase the liquidus viscosity (viscosity at the liquidus temperature) and, therefore, protect a glass composition from crystallization. However, adding $SiO_2$ to a glass composition may cause liquid-liquid phase separation, which may cause devitrification and/or reducing the transmittance of the resulting glass. Also, $SiO_2$ is a low refractive index component and makes it difficult to achieve high index. Accordingly, the content of $SiO_2$ is preferably limited, or glasses may be substantially free of $SiO_2$. In embodiments, the glass composition may contain silica ($SiO_2$) in an amount from greater than or equal to 0.0 mol. % to less than or equal to 10.0 mol. % and all ranges and sub-ranges between the foregoing values. In some embodiments, the glass composition may contain $SiO_2$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $SiO_2$ in an amount less than or equal to 10.0 mol. %, less than or equal to 9.0 mol. %, less than or equal to 8.0 mol. %, less than or equal to 7.5 mol. %, less than or equal to 7.0 mol. %, less than or equal to 5.5 mol. %, or less than or equal to 5.0 mol. %. In some more embodiments, the glass composition may contain $SiO_2$ in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 5.5 mol. %, greater than or equal to 0.0 mol. % and less than or equal to 5.0 mol. %, greater than or equal to 5.0 mol. % and less than or equal to 10.0 mol. %, greater than or equal to 5.0 mol. % and less than or equal to 5.5 mol. %, greater than or equal to 5.5 mol. % and less than or equal to 10.0 mol. %, greater than or equal to 5.5 mol. % and less than or equal to 7.0 mol. %, greater than or equal to 7.0 mol. % and less than or equal to 10.0 mol. %, greater than or equal to 7.0 mol. % and less than or equal to 7.5 mol. %.

Glass composition may include lanthanum oxide ($La_2O_3$). Lanthanum oxide is one of the cheapest oxides providing high refractive indexes without significant loss of transmittance in visible range. Also, addition of $La_2O_3$ may reduce the risk of phase separation. However, $La_2O_3$ provides higher density than other high-index components, such as, for example, $TiO_2$, $Nb_2O_5$ or $WO_3$. Also, being added in high amount, it may cause crystallization of refractory species, like lanthanum disilicate ($La_2Si_2O_7$), lanthanum zirconate ($La_2ZrO_5$) and others, or solid solutions comprising these minerals, which may increase the liquidus temperature of glasses and, accordingly, reduce their glass forming ability. For this reason, the content of $La_2O_3$ is preferably limited, and in some cases a glass may be substantially free of $La_2O_3$. In embodiments, the glass composition may contain lanthanum oxide ($La_2O_3$) in an amount from greater than or equal to 0.0 mol. % to less than or equal to 26.0 mol. % and all ranges and sub-ranges between the foregoing values. In some embodiments, the glass composition may contain $La_2O_3$ in an amount greater than or equal to 0.0 mol. %, greater than or equal to 5.0 mol. %, greater than or equal to 10.0 mol. %, greater than or equal to 13.5 mol. %, greater than or equal to 14.0 mol. %, greater than or equal to 14.25 mol. %, greater than or equal to 20.0 mol. %, greater than or equal to 22.0 mol. %, or greater than or equal to 24.0 mol. %. In some other embodiments, the glass composition may contain $La_2O_3$ in an amount less than or equal to 26.0 mol. %, less than or equal to 25.0 mol. %, less than or equal to 24.0 mol. %, less than or equal to 22.0 mol. %, less than or equal to 21.0 mol. %, less than or equal to 20.0 mol. %, less than or equal to 10.0 mol. %, or less than or equal to 5.0 mol. %. In some more embodiments, the glass composition may contain $La_2O_3$ in an amount greater than or equal to 0.0 mol. % and less than or equal to 25.0 mol. %, greater than or equal to 5.0 mol. % and less than or equal to 20.0 mol. %, greater than or equal to 10.0 mol. % and less than or equal to 25.0 mol. %, greater than or equal to 13.5 mol. % and less than or equal to 22.0 mol. %, greater than or equal to 14.17 mol. % and less than or equal to 19.99 mol. %, greater than or equal to 14.25 mol. % and less than or equal to 21.0 mol. %, greater than or equal to 0.0 mol. % and less than or equal to 26.0 mol. %, greater than or equal to 0.0 mol. % and less than or equal to 5.0 mol. %, greater than or equal to 5.0 mol. % and less than or equal to 10.0 mol. %, greater than or equal to 5.0 mol. % and less than or equal to 10.0 mol. %, greater than or equal to 10.0 mol. % and less than or equal to 20.0 mol. %, greater than or equal to 21.0 mol. % and less than or equal to 22.0 mol. %, greater than or equal to 22.0 mol. % and less than or equal to 24.0 mol. %.

Glass composition may include yttria ($Y_2O_3$). Yttria provides high refractive index at a lower density than other rare earth metal oxides, such as $La_2O_3$, $Gd_2O_3$ and others, without causing the loss of transmittance in the visible. However, addition of $Y_2O_3$ may cause crystallization of refractory minerals, such as yttrium zirconate $Y_2ZrO_5$, yttrium niobate $YNbO_4$ and others, which may increase the liquidus temperature of glasses and, accordingly, reduce their glass forming ability. For this reason, the content of $Y_2O_3$ is preferably limited, and in some cases a glass may be substantially free of $Y_2O_3$. In embodiments, the glass composition may contain yttria ($Y_2O_3$) in an amount from greater than or equal to 0.0 mol. % to less than or equal to 10.0 mol. % and all ranges and sub-ranges between the foregoing values. In some embodiments, the glass composition may contain $Y_2O_3$ in an amount greater than or equal to 0.0 mol. %, greater than or equal to 0.8 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $Y_2O_3$ in an amount less than or equal to 10.0 mol. %, less than or equal to 9.0 mol. %, less than or equal to 8.0 mol. %, less than or equal to 7.0 mol. %, less than or equal to 6.0 mol. %, less than or equal to 5.0 mol. %, less than or equal to 4.0 mol. %, less than or equal to 3.4 mol. %, less than or equal to 3.0 mol. %, or less than or equal to 1.5 mol. %. In some more embodiments, the glass composition may contain $Y_2O_3$ in an amount greater than or equal to 0.0 mol. % and less than or equal to 6.0 mol. %, greater than or equal to 0.0 mol. % and less than or equal to 4.0 mol. %, greater than or equal to 0.0 mol. % and less than or equal to 3.4 mol. %, greater than or equal to 0.0 mol. % and less than or equal to 3.0 mol. %, greater than or equal to 0.8 mol. % and less than or equal to 1.5 mol. %, greater than or equal to 0.0 mol. % and less than or equal to 10.0 mol. %, greater than or equal to 1.5 mol. % and less than or equal to 3.0 mol. %, greater than or equal to 3.4 mol. % and less than or equal to 4.0 mol. %, greater than or equal to 4.0 mol. % and less than or equal to 5.0 mol. %.

Glass composition may include vanadia ($V_2O_5$). Vanadia provides the highest ratio of the refractive index to density among all oxides. However, vanadia may cause undesirable dark coloring and may also raise environmental concerns. For these reasons, the content of vanadia is preferably limited, or glass compositions may be free of $V_2O_5$. In embodiments, the glass composition may contain vanadia ($V_2O_5$) in an amount from greater than or equal to 0.0 mol. % to less than or equal to 10.0 mol. % and all ranges and sub-ranges between the foregoing values. In some embodiments, the glass composition may contain $V_2O_5$ in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $V_2O_5$ in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 0.1 mol. %. In some more embodiments, the glass composition may contain $V_2O_5$ in an amount greater than or equal to 0.0 mol. % and less than or equal to 5.0 mol. %, greater than or equal to 0.0 mol. % and less than or equal to 0.1 mol. %, greater than or equal to 0.0 mol. % and less than or equal to 10.0 mol. %, greater than or equal to 0.1 mol. % and less than or equal to 10.0 mol. %, greater than or equal to 0.1 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %.

Glass composition may include lead oxide (PbO). Lead oxide provides very high refractive index, but also significantly increases the density. Also, PbO may cause ecological concern. For these reasons, the content of PbO is preferably limited, or glasses may be substantially free of PbO. In embodiments, the glass composition may contain lead oxide (PbO) in an amount from greater than or equal to 0.0 mol. % to less than or equal to 10.0 mol. % and all ranges and sub-ranges between the foregoing values. In some embodiments, the glass composition may contain PbO in an amount greater than or equal to 0.0 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain PbO in an amount less than or equal to 10.0 mol. %, less than or equal to 9.0 mol. %, less than or equal to 8.0 mol. %, less than or equal to 7.0 mol. %, less than or equal to 5.0 mol. %, or less than or equal to 0.5 mol. %. In some more embodiments, the glass composition may contain PbO in an amount greater than or equal to 0.0 mol. % and less than or equal to 10.0 mol. %, greater than or equal to 0.0 mol. % and less than or equal to 0.5 mol. %, greater than or equal to 0.5 mol. % and less than or equal to 10.0 mol. %, greater than or equal to 0.5 mol. % and less than or equal to 5.0 mol. %, greater than or equal to 5.0 mol. % and less than or equal to 10.0 mol. %, greater than or equal to 5.0 mol. % and less than or equal to 7.0 mol. %, greater than or equal to 7.0 mol. % and less than or equal to 10.0 mol. %, greater than or equal to 7.0 mol. % and less than or equal to 8.0 mol. %.

Glass composition may include tellurium oxide ($TeO_2$). Tellurium oxide generally works like bismuth oxide described in this disclosure; in addition, $TeO_2$ is very expensive, which may make the cost of starting materials high. Accordingly, the content of tellurium oxide is preferably limited, or glass compositions may be free of $TeO_2$. In embodiments, the glass composition may contain tellurium oxide ($TeO_2$) in an amount from greater than or equal to 0.0 mol. % to less than or equal to 15.0 mol. % and all ranges and sub-ranges between the foregoing values. In some embodiments, the glass composition may contain $TeO_2$ in an amount greater than or equal to 0.0 mol. %, greater than or equal to 0.1 mol. %, greater than or equal to 5.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain $TeO_2$ in an amount less than or equal to 15.0 mol. %, less than or equal to 14.0 mol. %, less than or equal to 13.0 mol. %, less than or equal to 11.0 mol. %, less than or equal to 10.0 mol. %, less than or equal to 9.0 mol. %, less than or equal to 8.5 mol. %, less than or equal to 5.0 mol. %, less than or equal to 1.2 mol. %, or less than or equal to 0.1 mol. %. In some more embodiments, the glass composition may contain $TeO_2$ in an amount greater than or equal to 0.0 mol. % and less than or equal to 15.0 mol. %, greater than or equal to 0.0 mol. % and less than or equal to 14.0 mol. %, greater than or equal to 0.0 mol. % and less than or equal to 10.0 mol. %, greater than or equal to 0.0 mol. % and less than or equal to 8.5 mol. %, greater than or equal to 0.0 mol. % and less than or equal to 0.1 mol. %, greater than or equal to 0.14 mol. % and less than or equal to 1.21 mol. %, greater than or equal to 0.1 mol. % and less than or equal to 1.2 mol. %, greater than or equal to 1.2 mol. % and less than or equal to 5.0 mol. %, greater than or equal to 5.0 mol. % and less than or equal to 15.0 mol. %, greater than or equal to 5.0 mol. % and less than or equal to 8.5 mol. %, greater than or equal to 8.5 mol. % and less than or equal to 15.0 mol. %.

Glass composition may include bismuth oxide ($Bi_2O_3$). $Bi_2O_3$ provides very high refractive index, but leads to increases in density. However, it may decrease the viscosity of melts at high temperatures, which may cause crystallization of the melts when cooling. Accordingly, the content of bismuth oxide is preferably limited, or glass compositions may be free of $Bi_2O_3$. In embodiments, the glass composition may contain bismuth oxide ($Bi_2O_3$) in an amount from greater than or equal to 0.0 mol. % to less than or equal to 20.0 mol. % and all ranges and sub-ranges between the foregoing values. In some embodiments, the glass composition may contain $Bi_2O_3$ in an amount greater than or equal to 0.0 mol. %, greater than or equal to 0.1 mol. %, greater than or equal to 0.5 mol. %, greater than or equal to 1.0 mol. %, greater than or equal to 3.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $Bi_2O_3$ in an amount less than or equal to 20.0 mol. %, less than or equal to 18.0 mol. %, less than or equal to 16.0 mol. %, less than or equal to 15.0 mol. %, less than or equal to 14.0 mol. %, less than or equal to 11.5 mol. %, less than or equal to 10.0 mol. %, less than or equal to 7.0 mol. %, or less than or equal to 5.0 mol. %. In some more embodiments, the glass composition may contain $Bi_2O_3$ in an amount greater than or equal to 0.0 mol. % and less than or equal to 15.0 mol. %, greater than or equal to 0.0 mol. % and less than or equal to 11.5 mol. %, greater than or equal to 0.0 mol. % and less than or equal to 10.0 mol. %, greater than or equal to 0.1 mol. % and less than or equal to 20.0 mol. %, greater than or equal to 0.5 mol. % and less than or equal to 20.0 mol. %, greater than or equal to 1.0 mol. % and less than or equal to 15.0 mol. %, greater than or equal to 2.88 mol. % and less than or equal to 7.13 mol. %, greater than or equal to 0.0 mol. % and less than or equal to 20.0 mol. %, greater than or equal to 0.0 mol. % and less than or equal to 5.0 mol. %, greater than or equal to 5.0 mol. % and less than or equal to 7.0 mol. %, greater than or equal to 7.0 mol. % and less than or equal to 10.0 mol. %, greater than or equal to 10.0 mol. % and less than or equal to 11.5 mol. %, greater than or equal to 11.5 mol. % and less than or equal to 20.0 mol. %, greater than or equal to 14.0 mol. % and less than or equal to 15.0 mol. %, greater than or equal to 15.0 mol. % and less than or equal to 16.0 mol. %.

Glass composition may include zirconia ($ZrO_2$). Zirconia can increase the refractive index while maintaining an acceptably low density. $ZrO_2$ can also increase the viscosity of the melt, which may help to protect the melt from crystallization. $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon (Zr-$SiO_4$), yttrium zirconate ($Y_2ZrO_5$) and others, which may decrease the glass forming ability of the melt. Accordingly, the content of zirconia is preferably limited, or glass compositions may be free of $ZrO_2$. In embodiments, the glass composition may contain zirconia ($ZrO_2$) in an amount from greater than or equal to 0.0 mol. % to less than or equal to 15.0 mol. % and all ranges and sub-ranges between the foregoing values. In some embodiments, the glass composition may contain $ZrO_2$ in an amount greater than or equal to 0.0 mol. %, greater than or equal to 2.5 mol. %, greater than or equal to 4.4 mol. %, greater than or equal to 5.0 mol. %, greater than or equal to 7.0 mol. %, greater than or equal to 9.0 mol. %, greater than or equal to 10.0 mol. %, greater than or equal to 11.0 mol. %, or greater than or equal to 13.0 mol. %. In some other embodiments, the glass composition may contain $ZrO_2$ in an amount less than or equal to 15.0 mol. %, less than or equal to 13.0 mol. %, less than or equal to 11.0 mol. %, less than or equal to 10.0 mol. %, less than or equal to 9.0 mol. %, less than or equal to 8.6 mol. %, less than or equal to 8.5 mol. %, less than or equal to 8.3 mol. %, or less than or equal to 5.0 mol. %. In some more embodiments, the glass composition may contain $ZrO_2$ in an amount greater than or equal to 0.0 mol. % and less than or equal to 15.0 mol. %, greater than or equal to 2.5 mol. % and less than or equal to 10.0 mol. %, greater than or equal to 4.4 mol. % and less than or equal to 8.6 mol. %, greater than or equal to 5.0 mol. % and less than or equal to 9.0 mol. %, greater than or equal to 5.0 mol. % and less than or equal to 8.5 mol. %, greater than or equal to 6.99 mol. % and less than or equal to 8.29 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 8.3 mol. %, greater than or equal to 8.3 mol. % and less than or equal to 8.5 mol. %, greater than or equal to 8.5 mol. % and less than or equal to 8.6 mol. %, greater than or equal to 8.6 mol. % and less than or equal to 9.0 mol. %, greater than or equal to 9.0 mol. % and less than or equal to 10.0 mol. %.

Glass composition may include titania ($TiO_2$). The levels of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ is preferably limited, and in some cases a glass composition may be substantially free of $TiO_2$. In embodiments, the glass composition may contain titania ($TiO_2$) in an amount from greater than or equal to 0.0 mol. % to less than or equal to 40.0 mol. % and all ranges and sub-ranges between the foregoing values. In some embodiments, the glass composition may contain $TiO_2$ in an amount greater than or equal to 0.0 mol. %, greater than or equal to 1.0 mol. %, greater than or equal to 3.5 mol. %, greater than or equal to 5.0 mol. %, greater than or equal to 11.0 mol. %, greater than or equal to 20.0 mol. %, greater than or equal to 25.0 mol. %, greater than or equal to 30.0 mol. %, or greater than or equal to 35.0 mol. %. In some other embodiments, the glass composition may contain $TiO_2$ in an amount less than or equal to 40.0 mol. %, less than or equal to 35.0 mol. %, less than or equal to 30.0 mol. %, less than or equal to 25.0 mol. %, less than or equal to 20.0 mol. %, less than or equal to 18.0 mol. %, less than or equal to 15.5 mol. %, less than or equal to 14.0 mol. %, or less than or equal to 5.0 mol. %. In some more embodiments, the glass composition may contain $TiO_2$ in an amount greater than or equal to 0.0 mol. % and less than or equal to 40.0 mol. %, greater than or equal to 0.0 mol. % and less than or equal to 30.0 mol. %, greater than or equal to 0.0 mol. % and less than or equal to 20.0 mol. %, greater than or equal to 1.0 mol. % and less than or equal to 18.0 mol. %, greater than or equal to 3.5 mol. % and less than or equal to 15.5 mol. %, greater than or equal to 5.0 mol. % and less than or equal to 20.0 mol. %, greater than or equal to 10.99 mol. % and less than or equal to 13.53 mol. %, greater than or equal to 5.0 mol. % and less than or equal to 14.0 mol. %, greater than or equal to 14.0 mol. % and less than or equal to 15.5 mol. %, greater than or equal to 15.5 mol. % and less than or equal to 18.0 mol. %, greater than or equal to 18.0 mol. % and less than or equal to 20.0 mol. %, greater than or equal to 20.0 mol. % and less than or equal to 25.0 mol. %.

Glass composition may include niobia ($Nb_2O_5$). Niobia can be used to increase the refractive index of glass while maintaining a low density. However, niobia can introduce a yellow coloring to the glass that cannot be bleached in the same manner as titania, which can result in a loss of transmittance, particularly in the blue and UV range. Niobia may cause crystallization and/or phase separation of the melt. Accordingly, the amount of $Nb_2O_5$ is preferably limited; in some embodiments, the glasses may be substantially free of $Nb_2O_5$. In embodiments, the glass composition may contain $Nb_2O_5$ in an amount from greater than or equal to 0.0 mol. % to less than or equal to 30.0 mol. % and all ranges and sub-ranges between the foregoing values. In some embodiments, the glass composition may contain $Nb_2O_5$ in an amount greater than or equal to 0.0 mol. %, greater than or equal to 0.3 mol. %, greater than or equal to 3.0 mol. %, greater than or equal to 4.5 mol. %, greater than or equal to 5.0 mol. %, greater than or equal to 10.0 mol. %, greater than or equal to 11.0 mol. %, greater than or equal to 20.0 mol. %, greater than or equal to 24.0 mol. %, greater than or equal to 26.0 mol. %, or greater than or equal to 28.0 mol. %. In some other embodiments, the glass composition may contain $Nb_2O_5$ in an amount less than or equal to 30.0 mol. %, less than or equal to 28.0 mol. %, less than or equal to 26.0 mol. %, less than or equal to 25.0 mol. %, less than or equal to 24.0 mol. %, less than or equal to 20.0 mol. %, less than or equal to 16.0 mol. %, less than or equal to 10.0 mol. %, or less than or equal to 5.0 mol. %. In some more embodiments, the glass composition may contain $Nb_2O_5$ in an amount greater than or equal to 0.0 mol. % and less than or equal to 30.0 mol. %, greater than or equal to 0.3 mol. % and less than or equal to 20.0 mol. %, greater than or equal to 3.0 mol. % and less than or equal to 30.0 mol. %, greater than or equal to 3.0 mol. % and less than or equal to 16.0 mol. %, greater than or equal to 4.5 mol. % and less than or equal to 16.0 mol. %, greater than or equal to 10.0 mol. % and less than or equal to 25.0 mol. %, greater than or equal to 11.0 mol. % and less than or equal to 15.78 mol. %, greater than or equal to 0.0 mol. % and less than or equal to 5.0 mol. %, greater than or equal to 5.0 mol. % and less than or equal to 10.0 mol. %, greater than or equal to 10.0 mol. % and less than or equal to 16.0 mol. %, greater than or equal to 16.0 mol. % and less than or equal to 30.0 mol. %, greater than or equal to 16.0 mol. % and less than or equal to 20.0 mol. %, greater than or equal to 20.0 mol. % and less than or equal to 24.0 mol. %, greater than or equal to 24.0 mol. % and less than or equal to 25.0 mol. %, greater than or equal to 25.0 mol. % and less than or equal to 26.0 mol. %.

Glass composition may include tungsten oxide ($WO_3$). $WO_3$ provides high refractive index without significantly increasing density or causing undesirable coloring. Also, it was empirically found that addition of $WO_3$ to glass composition may decrease the liquidus temperature, which allows melting such glasses at lower temperatures, that, in turn, may increase the transmittance of such glasses. Also, addition of $WO_3$ may decrease the glass transition temperature $T_g$, which allows forming these glasses at lower temperatures. At high concentrations of $WO_3$, the liquidus temperature tends to increase, and the viscosity at the liquidus temperature decreases, making it difficult to avoid crystallization of melts when cooling. Accordingly, the content of $WO_3$ is preferably limited, or glass compositions may be free of $WO_3$. In embodiments, the glass composition may contain tungsten oxide ($WO_3$) in an amount from greater than or equal to 0.0 mol. % to less than or equal to 40.0 mol. % and all ranges and sub-ranges between the foregoing values. In some embodiments, the glass composition may contain $WO_3$ in an amount greater than or equal to 0.0 mol. %, greater than or equal to 0.3 mol. %, greater than or equal to 5.0 mol. %, greater than or equal to 9.0 mol. %, greater than or equal to 13.0 mol. %, greater than or equal to 14.5 mol. %, greater than or equal to 20.0 mol. %, greater than or equal to 25.0 mol. %, greater than or equal to 30.0 mol. %, or greater than or equal to 35.0 mol. %. In some other embodiments, the glass composition may contain $WO_3$ in an amount less than or equal to 40.0 mol. %, less than or equal to 38.0 mol. %, less than or equal to 35.0 mol. %, less than or equal to 30.0 mol. %, less than or equal to 25.0 mol. %, less than or equal to 23.0 mol. %, less than or equal to 20.0 mol. %, or less than or equal to 5.0 mol. %. In some more embodiments, the glass composition may contain $WO_3$ in an amount greater than or equal to 0.3 mol. % and less than or equal to 40.0 mol. %, greater than or equal to 5.0 mol. % and less than or equal to 35.0 mol. %, greater than or equal to 5.0 mol. % and less than or equal to 20.0 mol. %, greater than or equal to 9.0 mol. % and less than or equal to 40.0 mol. %, greater than or equal to 9.0 mol. % and less than or equal to 38.0 mol. %, greater than or equal to 13.0 mol. % and less than or equal to 35.0 mol. %, greater than or equal to 14.49 mol. % and less than or equal to 23.0 mol. %, greater than or equal to 0.0 mol. % and less than or equal to 40.0 mol. %, greater than or equal to 23.0 mol. % and less than or equal to 25.0 mol. %, greater than or equal to 25.0 mol. % and less than or equal to 40.0 mol. %, greater than or equal to 25.0 mol. % and less than or equal to 30.0 mol. %, greater than or equal to 30.0 mol. % and less than or equal to 35.0 mol. %, greater than or equal to 35.0 mol. % and less than or equal to 38.0 mol. %.

Glass composition may include iron (Fe). Iron oxides FeO and $Fe_2O_3$, and especially $Fe_2O_3$, may increase the viscosity of melt and, therefore, increase the liquidus viscosity. However, iron also provides undesirable coloring, which may reduce the light transmittance. Accordingly, the content of iron oxides is preferably limited, or glass compositions may be substantially free of iron oxides. In embodiments, the glass composition may contain iron (Fe) in an amount from greater than or equal to 0.0 at. % to less than or equal to 1.0 at. % and all ranges and sub-ranges between the foregoing values. In some other embodiments, the glass composition may contain Fe in an amount less than or equal to 1.0 at. % or less than or equal to 0.5 at. %. In some more embodiments, the glass composition may contain Fe in an amount greater than or equal to 0.0 at. % and less than or equal to 1.0 at. %, greater than or equal to 0.0 at. % and less than or equal to 0.5 at. %.

Glass composition may include copper (Cu). Copper oxides may suppress yellow coloring of glass; also, these oxides may be unintentionally added to a glass composition as impurities to other materials. However, when adding at high amount, copper oxides may cause undesirable coloring. Accordingly, the content of copper oxides in glass composition is preferably limited, or a glass composition may be substantially free of copper oxides. In embodiments, the glass composition may contain copper (Cu) in an amount from greater than or equal to 0.0 at. % to less than or equal to 1.0 at. % and all ranges and sub-ranges between the foregoing values. In some other embodiments, the glass composition may contain Cu in an amount less than or equal to 1.0 at. % or less than or equal to 0.5 at. %. In some more embodiments, the glass composition may contain Cu in an amount greater than or equal to 0.0 at. % and less than or equal to 1.0 at. %, greater than or equal to 0.0 at. % and less than or equal to 0.5 at. %.

In some embodiments, the glass composition may have a sum of BaO+SrO+ZnO+CdO greater than or equal to 0.0 mol. %, greater than or equal to 10.0 mol. %, or greater than or equal to 20.0 mol. %. In some other embodiments, the glass composition may have a sum of BaO+SrO+ZnO+CdO less than or equal to 25.0 mol. %, less than or equal to 20.0 mol. %, or less than or equal to 10.0 mol. %. In some more embodiments, the glass composition may have a sum of BaO+SrO+ZnO+CdO greater than or equal to 0.0 mol. % and less than or equal to 25.0 mol. %, greater than or equal to 0.0 mol. % and less than or equal to 20.0 mol. %, or greater than or equal to 0.0 mol. % and less than or equal to 10.0 mol. %, greater than or equal to 10.0 mol. % and less than or equal to 25.0 mol. %, or greater than or equal to 10.0 mol. % and less than or equal to 20.0 mol. %.

In some embodiments, the glass composition may have a sum of BaO+ZnO greater than or equal to 0.0 mol. %, or greater than or equal to 10.0 mol. %. In some other embodiments, the glass composition may have a sum of BaO+ZnO less than or equal to 20.0 mol. % or less than or equal to 10.0 mol. %. In some more embodiments, the glass composition may have a sum of BaO+ZnO greater than or equal to 0.0 mol. % and less than or equal to 20.0 mol. %, or greater than or equal to 0.0 mol. % and less than or equal to 10.0 mol. %.

In some other embodiments, the glass composition may contain sum of $FeO+Fe_2O_3$ in an amount less than or equal to 0.5 mol. % or less than or equal to 0.25 mol. %. In some more embodiments, the glass composition may contain $FeO+Fe_2O_3$ in an amount greater than or equal to 0.0 mol. % and less than or equal to 0.5 mol. %, or greater than or equal to 0.0 mol. % and less than or equal to 0.25 mol. %.

In some embodiments, the glass composition may have a sum of $Li_2O+Na_2O+K_2O$ greater than or equal to 0.0 mol. %, or greater than or equal to 10.0 mol. %. In some other embodiments, the glass composition may have a sum of $Li_2O+Na_2O+K_2O$ less than or equal to 15.0 mol. % or less than or equal to 10.0 mol. %. In some more embodiments, the glass composition may have a sum of $Li_2O+Na_2O+K_2O$ greater than or equal to 0.0 mol. % and less than or equal to 15.0 mol. %, or greater than or equal to 0.0 mol. % and less than or equal to 10.0 mol. %.

In some embodiments, the glass composition may have a sum of MgO+CaO+SrO greater than or equal to 0.0 mol. %, or greater than or equal to 10.0 mol. %. In some other embodiments, the glass composition may have a sum of MgO+CaO+SrO less than or equal to 15.0 mol. % or less than or equal to 10.0 mol. %. In some more embodiments, the glass composition may have a sum of MgO+CaO+SrO greater than or equal to 0.0 mol. % and less than or equal to 15.0 mol. %, or greater than or equal to 0.0 mol. % and less than or equal to 10.0 mol. %.

In some other embodiments, the glass composition may have a sum of $MoO_3+V_2O_5$ less than or equal to 5.0 mol. % or less than or equal to 2.5 mol. %. In some more embodiments, the glass composition may have a sum of $MoO_3+V_2O_5$ greater than or equal to 0.0 mol. % and less than or equal to 5.0 mol. %, or greater than or equal to 0.0 mol. % and less than or equal to 2.5 mol. %.

In some embodiments, the glass composition may have a sum of $TiO_2+Nb_2O_5$ greater than or equal to 0.0 mol. %, greater than or equal to 1.0 mol. %, greater than or equal to 10.0 mol. %, greater than or equal to 20.0 mol. %, or greater than or equal to 22.0 mol. %. In some other embodiments, the glass composition may have a sum of $TiO_2+Nb_2O_5$ less than or equal to 28.9 mol. %, less than or equal to 20.0 mol. %, or less than or equal to 10.0 mol. %. In some more embodiments, the glass composition may have a sum of $TiO_2+Nb_2O_5$ greater than or equal to 0.0 mol. % and less than or equal to 28.9 mol. %, greater than or equal to 0.0 mol. % and less than or equal to 20.0 mol. %, or greater than or equal to 0.0 mol. % and less than or equal to 10.0 mol. %, greater than or equal to 1.0 mol. % and less than or equal to 28.9 mol. %, greater than or equal to 1.0 mol. % and less than or equal to 20.0 mol. %, or greater than or equal to 1.0 mol. % and less than or equal to 10.0 mol. %, greater than or equal to 10.0 mol. % and less than or equal to 28.9 mol. %, or greater than or equal to 10.0 mol. % and less than or equal to 20.0 mol. %.

In some embodiments, the glass composition may have a sum of $TiO_2+ZrO_2$ greater than or equal to 0.0 mol. %, greater than or equal to 2.0 mol. %, greater than or equal to 10.0 mol. %, greater than or equal to 18.0 mol. %, or greater than or equal to 20.0 mol. %. In some other embodiments, the glass composition may have a sum of $TiO_2+ZrO_2$ less than or equal to 21.0 mol. %, less than or equal to 20.0 mol. %, or less than or equal to 10.0 mol. %. In some more embodiments, the glass composition may have a sum of $TiO_2+ZrO_2$ greater than or equal to 0.0 mol. % and less than or equal to 21.0 mol. %, greater than or equal to 0.0 mol. % and less than or equal to 20.0 mol. %, or greater than or equal to 0.0 mol. % and less than or equal to 10.0 mol. %, greater than or equal to 2.0 mol. % and less than or equal to 21.0 mol. %, greater than or equal to 2.0 mol. % and less than or equal to 20.0 mol. %, or greater than or equal to 2.0 mol. % and less than or equal to 10.0 mol. %, greater than or equal to 10.0 mol. % and less than or equal to 21.0 mol. %, or greater than or equal to 10.0 mol. % and less than or equal to 20.0 mol. %.

In some embodiments, the glass composition may have a sum of $WO_3+Bi_2O_3$ greater than or equal to 0.0 mol. %, greater than or equal to 0.1 mol. %, greater than or equal to 2.0 mol. %, greater than or equal to 10.0 mol. %, greater than or equal to 18.9 mol. %, or greater than or equal to 20.0 mol. %. In some other embodiments, the glass composition may have a sum of $WO_3+Bi_2O_3$ less than or equal to 26.2 mol. %, less than or equal to 20.0 mol. %, or less than or equal to 10.0 mol. %. In some more embodiments, the glass composition may have a sum of $WO_3+Bi_2O_3$ greater than or equal to 0.0 mol. % and less than or equal to 26.2 mol. %, greater than or equal to 0.0 mol. % and less than or equal to 20.0 mol. %, or greater than or equal to 0.0 mol. % and less than or equal to 10.0 mol. %, greater than or equal to 0.1 mol. % and less than or equal to 26.2 mol. %, greater than or equal to 0.1 mol. % and less than or equal to 20.0 mol. %, or greater than or equal to 0.1 mol. % and less than or equal to 10.0 mol. %, greater than or equal to 2.0 mol. % and less than or equal to 26.2 mol. %, greater than or equal to 2.0 mol. % and less than or equal to 20.0 mol. %, or greater than or equal to 2.0 mol. % and less than or equal to 10.0 mol. %, greater than or equal to 10.0 mol. % and less than or equal to 26.2 mol. %, or greater than or equal to 10.0 mol. % and less than or equal to 20.0 mol. %, greater than or equal to 18.9 mol. % and less than or equal to 26.2 mol. %.

In some embodiments, the glass composition may have limitations for a ratio $(La_2O_3+Y_2O_3)/(TiO_2+Bi_2O_3)$. It was empirically found that undesirable color provided by $TiO_2$ and $Bi_2O_3$ may be reduced in the presence of $La_2O_3$ and $Y_2O_3$. In some embodiments, the glass composition may have a ratio $(La_2O_3+Y_2O_3)/(TiO_2+Bi_2O_3)$ [mol. %] greater than or equal to 0.000, or greater than or equal to 0.7.

In some embodiments, the glass composition may have limitations for a ratio $Nb_2O_5/TiO_2$. It was empirically found that in some embodiments the risk of phase separation of the melt may be reduced in some range of the ratio $(Nb_2O_5/TiO_2)$. In some embodiments, the glass composition may have a ratio $Nb_2O_5/TiO_2$ greater than or equal to 0.00 mol. %, or greater than or equal to 1.00 mol. %. In some other embodiments, the glass may have a ratio $Nb_2O_5/TiO_2$ less than or equal to 1.50 mol. % or less than or equal to 1.00 mol. %. In some more embodiments, the glass composition may have a ratio $Nb_2O_5/TiO_2$ greater than or equal to 1.00 mol. % and less than or equal to 1.50 mol. %, greater than or equal to 0.00 mol. % and less than or equal to 1.50 mol. %, or greater than or equal to 0.00 mol. % and less than or equal to 1.00 mol. %.

In some embodiments, glass composition may have limitations for a ratio $P_2O_5/B_2O_3$. It was empirically found that when $P_2O_5$ is added to glass compositions of the present disclosure, the risk of liquid-liquid phase separation may increase, especially in the case of comparably low content of $B_2O_3$. In some embodiments, the glass composition may have a ratio $P_2O_5B_2O_3$ greater than or equal to 0.0 mol. %, or greater than or equal to 0.25 mol. %. In some other embodiments, the glass composition may have a ratio $P_2O_5B_2O_3$ less than or equal to 0.5 mol. % or less than or equal to 0.25 mol. %. In some more embodiments, the glass composition may have a $P_2O_5B_2O_3$ greater than or equal to 0.0 mol. % and less than or equal to 0.5 mol. %, or greater than or equal to 0.0 mol. % and less than or equal to 0.25 mol. %.

In some embodiments, the glass composition may have limitations for a difference $SiO_2—B_2O_3$. In some embodiments, the glass composition may have a difference $SiO_2—B_2O_3$ greater than or equal to –29.0 mol. %, or greater than or equal to –10.0 mol. %. In some other embodiments, the glass composition may have a difference $SiO_2—B_2O_3$ less than or equal to 5.0 mol. %, less than or equal to –10.0 mol. %, or less than or equal to –24.0 mol. %. In some more embodiments, the glass composition may have a difference $SiO_2—B_2O_3$ greater than or equal to –29.0 mol. % and less than or equal to 5.0 mol. %, greater than or equal to –29.0 mol. % and less than or equal to –10.0 mol. %.

In some embodiments, glass composition may have limitations for a ratio $SiO_2/B_2O_3$. It was empirically found that $SiO_2$, like $P_2O_5$, may sometimes stimulate liquid-liquid phase separation in the melts of the glasses of the present disclosure, especially in the case of comparably low content of $B_2O_3$. For that reason, in some embodiments the ratio ($SiO_2/B_2O_3$) is preferably limited. In some embodiments, the glass composition may have a ratio $SiO_2/B_2O_3$ greater than or equal to 0.0 mol. %, or greater than or equal to 0.2 mol. %. In some other embodiments, the glass composition may have a ratio $SiO_2/B_2O_3$ less than or equal to 0.4 mol. % or less than or equal to 0.2 mol. %. In some more embodiments, the glass composition may have a ratio $SiO_2/B_2O_3$ greater than or equal to 0.0 mol. % and less than or equal to 0.4 mol. %, or greater than or equal to 0.0 mol. % and less than or equal to 0.2 mol. %.

In some embodiments, glass composition may have limitations for the difference $TiO_2—Nb_2O_5$. It was empirically found that a large excess of $TiO_2$ over $Nb_2O_5$, as well as $Nb_2O_5$ over $TiO_2$, may sometimes stimulate crystallization of the refractory phases containing the component that is in excess. Accordingly, in some embodiments, the difference ($TiO_2—Nb_2O_5$) is preferably limited. In some embodiments, the glass composition may have a difference $TiO_2—Nb_2O_5$ greater than or equal to –3.0 mol. %, or greater than or equal to 2.0 mol. %. In some other embodiments, the glass composition may have a difference $TiO_2—Nb_2O_5$ less than or equal to 5.0 mol. %, less than or equal to 2.0 mol. %, or less than or equal to 0 mol. %. In some more embodiments, the glass composition may have a $TiO_2—Nb_2O_5$ greater than or equal to –3.0 mol. % and less than or equal to 5.0 mol. %, greater than or equal to –3.0 mol. % and less than or equal to 2.0 mol. %, or greater than or equal to –3.0 mol. % and less than or equal to 0 mol. %.

In some embodiments, glass composition may have limitations for a difference $Nb_2O_5—SiO_2$. In some embodiments, it was empirically found that reducing the content of $Nb_2O_5$ may cause liquid-liquid phase separation, especially when $SiO_2$ is added to a glass composition. In some embodiments, the glass composition may have a difference $Nb_2O_5—SiO_2$ greater than or equal to 3.0 mol. %, greater than or equal to 11.0 mol. %, or greater than or equal to 12.5 mol. %. In some other embodiments, the glass composition may have a difference $Nb_2O_5—SiO_2$ less than or equal to 16.0 mol. % or less than or equal to 12.5 mol. %. In some more embodiments, the glass composition may have a difference $Nb_2O_5—SiO_2$ greater than or equal to 3.0 mol. % and less than or equal to 16.0 mol. %, or greater than or equal to 3.0 mol. % and less than or equal to 12.5 mol. %, greater than or equal to 11.0 mol. % and less than or equal to 16.0 mol. %.

In some embodiments, glass composition may have limitations for the difference $RE_mO_n+ZrO_2—Nb_2O_5$. It was empirically found that in some cases, adding rare earth metal oxides and/or zirconia without or with little amount of $Nb_2O_5$ may cause liquid-liquid phase separation of the melt. Accordingly, in some embodiments, it is desirable to maintain a high enough value of the difference $RE_mO_n+ZrO_2—Nb_2O_5$. In some embodiments, the glass composition may have a difference $RE_mO_n+ZrO_2—Nb_2O_5$ greater than or equal to 5.0 mol. %, greater than or equal to 6.8 mol. %, greater than or equal to 9.0 mol. %, or greater than or equal to 14.0 mol. %. In some other embodiments, the glass composition may have a difference $RE_mO_n+ZrO_2—Nb_2O_5$ less than or equal to 14.7 mol. %, less than or equal to 14.0 mol. %, or less than or equal to 9.0 mol. %. In some more embodiments, the glass composition may have a difference $RE_mO_n+ZrO_2—Nb_2O_5$ greater than or equal to 5.0 mol. % and less than or equal to 14.7 mol. %, greater than or equal to 5.0 mol. % and less than or equal to 14.0 mol. %, or greater than or equal to 5.0 mol. % and less than or equal to 9.0 mol. %, greater than or equal to 6.8 mol. % and less than or equal to 14.7 mol. %, greater than or equal to 6.8 mol. % and less than or equal to 14.0 mol. %, or greater than or equal to 6.8 mol. % and less than or equal to 9.0 mol. %, greater than or equal to 9.0 mol. % and less than or equal to 14.7 mol. %, or greater than or equal to 9.0 mol. % and less than or equal to 14.0 mol. %.

In some embodiments, the glass may have the refractive index at 587.56 nm $n_d$ from greater than or equal to 1.90 to less than or equal to 2.20 and all ranges and sub-ranges between the foregoing values. In some embodiments, the glass may have the $n_d$ greater than or equal to 1.90, greater than or equal to 1.95, greater than or equal to 2.00, greater than or equal to 2.04, greater than or equal to 2.05, greater than or equal to 2.10, greater than or equal to 2.14, greater than or equal to 2.16, or greater than or equal to 2.18. In some other embodiments, the glass may have the $n_d$ less than or equal to 2.20, less than or equal to 2.18, less than or equal to 2.16, less than or equal to 2.15, less than or equal to 2.14, less than or equal to 2.10, less than or equal to 2.09, less than or equal to 2.00, or less than or equal to 1.95. In some more embodiments, the glass may have the $n_d$ greater than or equal to 2.04 and less than or equal to 2.20, greater than or equal to 2.05 and less than or equal to 2.20, greater than or equal to 1.90 and less than or equal to 2.20, greater than or equal to 1.90 and less than or equal to 1.95, greater than or equal to 2.00 and less than or equal to 2.09, greater than or equal to 2.09 and less than or equal to 2.20, greater than or equal to 2.09 and less than or equal to 2.10, greater than or equal to 2.14 and less than or equal to 2.15.

In some embodiments, the glass may have the glass transition temperature $T_g$ from greater than or equal to 500° C. to less than or equal to 750° C. and all ranges and sub-ranges between the foregoing values. In some embodiments, the glass may have the $T_g$ greater than or equal to 500° C., greater than or equal to 550° C., greater than or equal to 600° C., greater than or equal to 606° C., greater than or equal to 690° C., greater than or equal to 700° C., greater than or equal to 710° C., or greater than or equal to 730° C. In some other embodiments, the glass may have the $T_g$ less than or equal to 750° C., less than or equal to 730° C., less than or equal to 710° C., less than or equal to 700° C., less than or equal to 690° C., less than or equal to 650° C., less than or equal to 631° C., less than or equal to 600° C., or less than or equal to 550° C. In some more embodiments, the glass may have the $T_g$ greater than or equal to 500° C. and less than or equal to 750° C., greater than or equal to 500° C. and less than or equal to 700° C., greater than or equal to 600° C. and less than or equal to 631° C., greater than or equal to 631° C. and less than or equal to 750° C., greater than or equal to 631° C. and less than or equal to 650° C., greater than or equal to 650° C. and less than or equal to 750° C., greater than or equal to 650° C. and less than or equal to 690° C.

In some embodiments, the glass may have the density at room temperature $d_{RT}$ from greater than or equal to 4.50 g/cm³ to less than or equal to 6.30 g/cm³ and all ranges and sub-ranges between the foregoing values. In some embodiments, the glass may have the $d_{RT}$ greater than or equal to 4.50 g/cm³, greater than or equal to 5.00 g/cm³, greater than or equal to 5.50 g/cm³, greater than or equal to 5.70 g/cm³, greater than or equal to 5.90 g/cm³, or greater than or equal to 6.10 g/cm³. In some other embodiments, the glass may have the $d_{RT}$ less than or equal to 6.30 g/cm³, less than or equal to 6.10 g/cm³, less than or equal to 5.90 g/cm³, less than or equal to 5.70 g/cm³, less than or equal to 5.50 g/cm³, or less than or equal to 5.00 g/cm³. In some more embodiments, the glass may have the $d_{RT}$ greater than or equal to 4.50 g/cm³ and less than or equal to 6.30 g/cm³, greater than or equal to 4.50 g/cm³ and less than or equal to 5.70 g/cm³, greater than or equal to 4.50 g/cm³ and less than or equal to 5.00 g/cm³, greater than or equal to 5.00 g/cm³ and less than or equal to 6.30 g/cm³, greater than or equal to 5.00 g/cm³ and less than or equal to 5.50 g/cm³, greater than or equal to 5.50 g/cm³ and less than or equal to 6.30 g/cm³, greater than or equal to 5.50 g/cm³ and less than or equal to 5.70 g/cm³, greater than or equal to 5.70 g/cm³ and less than or equal to 6.30 g/cm³, greater than or equal to 5.70 g/cm³ and less than or equal to 5.90 g/cm³, greater than or equal to 5.90 g/cm³ and less than or equal to 6.30 g/cm³, greater than or equal to 5.90 g/cm³ and less than or equal to 6.10 g/cm³.

In some embodiments, the glass may have the Abbe number $v_d$ from greater than or equal to 14.00 to less than or equal to 23.00 and all ranges and sub-ranges between the foregoing values. In some embodiments, the glass may have the $v_d$ greater than or equal to 14.00, greater than or equal to 15.00, greater than or equal to 19.00, greater than or equal to 20.00, greater than or equal to 21.00, or greater than or equal to 22.00. In some other embodiments, the glass may have the $v_d$ less than or equal to 23.00, less than or equal to 22.00, less than or equal to 21.00, less than or equal to 20.00, less than or equal to 19.00, or less than or equal to 15.00. In some more embodiments, the glass may have the $v_d$ greater than or equal to 14.00 and less than or equal to 23.00, greater than or equal to 15.00 and less than or equal to 21.00, greater than or equal to 14.00 and less than or equal to 15.00, greater than or equal to 15.00 and less than or equal to 23.00, greater than or equal to 15.00 and less than or equal to 19.00, greater than or equal to 19.00 and less than or equal to 23.00, greater than or equal to 19.00 and less than or equal to 20.00, greater than or equal to 20.00 and less than or equal to 23.00, greater than or equal to 20.00 and less than or equal to 21.00, greater than or equal to 21.00 and less than or equal to 23.00, greater than or equal to 21.00 and less than or equal to 22.00.

In some embodiments, the glass may have the Young's modulus E from greater than or equal to 100 GPa to less than or equal to 140 GPa and all ranges and sub-ranges between the foregoing values. In some embodiments, the glass may have the E greater than or equal to 100 GPa, greater than or equal to 105 GPa, greater than or equal to 120 GPa, greater than or equal to 125 GPa, greater than or equal to 130 GPa, or greater than or equal to 135 GPa. In some other embodiments, the glass may have the E less than or equal to 140 GPa, less than or equal to 135 GPa, less than or equal to 130 GPa, less than or equal to 125 GPa, less than or equal to 120 GPa, or less than or equal to 105 GPa. In some more embodiments, the glass may have the E greater than or equal to 100 GPa and less than or equal to 140 GPa, greater than or equal to 100 GPa and less than or equal to 105 GPa, greater than or equal to 105 GPa and less than or equal to 140 GPa, greater than or equal to 105 GPa and less than or equal to 120 GPa, greater than or equal to 120 GPa and less than or equal to 140 GPa, greater than or equal to 120 GPa and less than or equal to 125 GPa, greater than or equal to 125 GPa and less than or equal to 140 GPa, greater than or equal to 125 GPa and less than or equal to 130 GPa, greater than or equal to 130 GPa and less than or equal to 140 GPa, greater than or equal to 130 GPa and less than or equal to 135 GPa.

In some embodiments, the glass may have the linear thermal expansion coefficient of glass in the range 20-300° C. $\alpha_{20\text{-}300}$ from greater than or equal to $60\times10^{-7}$ K$^{-1}$ to less than or equal to $90\times10^{-7}$ K$^{-1}$ and all ranges and sub-ranges between the foregoing values. In some embodiments, the glass may have the $\alpha_{20\text{-}300}$ greater than or equal to $60\times10^{-7}$ K$^{-1}$, greater than or equal to $\times10^{-7}$ 65 K$^{-1}$, greater than or equal to $70\times10^{-7}$ K$^{-1}$, greater than or equal to $80\times10^{-7}$ K$^{-1}$, greater than or equal to $84\times10^{-7}$ K$^{-1}$, greater than or equal to $86\times10^{-7}$ K$^{-1}$, or greater than or equal to $88\times10^{-7}$ K$^{-1}$. In some other embodiments, the glass may have the $\alpha_{20\text{-}300}$ less than or equal to $90\times10^{-7}$ K$^{-1}$, less than or equal to $88\times10^{-7}$ K$^{-1}$, less than or equal to $86\times10^{-7}$ K$^{-1}$, less than or equal to $84\times10^{-7}$ K$^{-1}$, less than or equal to $80\times10^{-7}$ K$^{-1}$, less than or equal to $70\times10^{-7}$ K$^{-1}$, or less than or equal to $65\times10^{-7}$ K$^{-1}$. In some more embodiments, the glass may have the $\alpha_{20\text{-}300}$ greater than or equal to $60\times10^{-7}$ K$^{-1}$ and less than or equal to $90\times10^{-7}$ K$^{-1}$, greater than or equal to $60\times10^{-7}$ K$^{-1}$ and less than or equal to $65\times10^{-7}$ K$^{-1}$, greater than or equal to $65\times10^{-7}$ K$^{-1}$ and less than or equal to $90\times10^{-7}$ K$^{-1}$, greater than or equal to $65\times10^{-7}$ K$^{-1}$ and less than or equal to $70\times10^{-7}$ K$^{-1}$, greater than or equal to $70\times10^{-7}$ K$^{-1}$ and less than or equal to $90\times10^{-7}$ K$^{-1}$, greater than or equal to $70\times10^{-7}$ K$^{-1}$ and less than or equal to $80\times10^{-7}$ K$^{-1}$, greater than or equal to $80\times10^{-7}$ K$^{-1}$ and less than or equal to $90\times10^{-7}$ K$^{-1}$, greater than or equal to $80\times10^{-7}$ K$^{-1}$ and less than or equal to $84\times10^{-7}$ K$^{-1}$, greater than or equal to $84\times10^{-7}$ K$^{-1}$ and less than or equal to $90\times10^{-7}$ K$^{-1}$, greater than or equal to $84\times10^{-7}$ K$^{-1}$ and less than or equal to $86\times10^{-7}$ K$^{-1}$.

In some embodiments, the glass may have the liquidus temperature $T_{liq}$ less than or equal to 1200° C.

In some embodiments, the glass may have the wavelength corresponding to 70% total transmittance of a sample of 10 mm thickness $\lambda_{70\%}$ less than or equal to 450 nm.

In some embodiments, the glass may have a glass formation parameter $P_{GF}$ greater than or equal to −5, greater than or equal to 0, greater than or equal to 5, greater than or equal to 9, greater than or equal to 11, or greater than or equal to 13. In some other embodiments, the glass may have a glass formation parameter $P_{GF}$ less than or equal to 15 or less than or equal to 5. In some more embodiments, the glass may have a $P_{GF}$ greater than or equal to −5 and less than or equal to 15, or greater than or equal to −5 and less than or equal to 5, greater than or equal to 0 and less than or equal to 15, or greater than or equal to 0 and less than or equal to 5.

In some embodiments, the glass may have a quantity $n_d-(1.483+0.104*d_{RT})$ greater than or equal to 0.000.

In some embodiments, the glass may have a quantity $n_d-(1.503+0.104*d_{RT})$ greater than or equal to 0.000.

In some embodiments, the glass may have a quantity $n_d-(1.47+0.0009*T_g)$ greater than or equal to 0.000.

In some embodiments, the glass may have a quantity $n_d-(1.49+0.0009*T_g)$ greater than or equal to 0.000.

Logarithmic ratio) $LR(T_g, T_{liq})$, where $T_g$ and $T_{liq}$ are expressed in units of ° C., is a quantity calculated by the following formula (I):

$$LR(T_g, T_{liq}) = \log\left[\frac{(T_g + 273)}{(T_{liq} + 273)}\right]. \qquad (I)$$

It was empirically found that for the glasses the value of $LR(T_g, T_{liq})$ correlates with the liquidus viscosity $\eta_{liq}$. FIG. 1 presents the relationship between these two quantities for some Comparative Glasses, which compositions include greater than or equal to 15.0 mol. % $B_2O_3$ and which have a refractive index that is greater than or equal to 2.00. The Comparative Glasses were disclosed in US patent application publication no. 2021/0179479 A1, JP patent application publication no. 2007-112697A and U.S. provisional patent application Ser. No. 63/163,269. As follows from the figure, higher values of the logarithmic ratio $LR(T_g, T_{liq})$ statistically correspond to higher liquidus viscosities; in particular, a liquidus viscosity of $\eta_{liq}=1P$ approximately corresponds to $LR(T_g, T_{liq})=-0.20$; a liquidus viscosity of $\eta_L=2P$ approximately corresponds to $LR(T_g, T_{liq})=-0.18$, and so on. The correlation can be approximated with the following equation (II) (where liquidus viscosity is expressed in units of P (Poise))

$$\log(\eta_{liq})=3.6+18.6*LR(T_g,T_{liq}) \qquad (II)$$

Accordingly, the value of $LR(T_g, T_{liq})$ can be used as an approximate predictor for the liquidus viscosity.

Glass formation parameter $P_{GF}$ is a quantity calculated from the glass composition in terms of mol. % of the components by the following formula (III):

$$P_{GF}=(B_2O_3/3)+max(0,WO_3-TiO_2-0.5*ZrO_2)+ \\ Nb_2O_5+Ta_2O_5-(RE_mO_n+Bi_2O_3), \qquad (III)$$

where $RE_mO_n$ is total sum of rare earth metal oxides. In the formula (III), "max" means maximum of two values in parentheses delimited by comma and in particular max(0, $WO_3-TiO_2-0.5*ZrO_2$) means the greater of 0 and a difference $WO_3-TiO_2-0.5*ZrO_2$.

The glass formation parameter $P_{GF}$ has been found to correlate with the ability of the melt of a given composition to vitrify when cooling. It was empirically found that when the value of $P_{GF}$ is low or negative the risk of liquid-liquid phase separation may increase, and in this case the melt may either become opaque or crystallize when cooling. In turn, when the value of $P_{GF}$ becomes very high, the risk of precipitation of $WO_3$ and other components of the melt when cooling may be increased. Also, at high values of $P_{GF}$ it may become more difficult to reach high refractive index. Accordingly, in some embodiments, it is preferable when the value of $P_{GF}$ is limited.

Refractive index $n_d$, density $d_{RT}$ and glass transition temperature $T_g$ are properties of glass that can be predicted from the glass composition. A linear regression analysis of the Exemplary Glasses of the present disclosure in the EXAMPLES section below and other glass compositions reported in the literature was performed to determine equations that can predict the composition dependences of the refractive index $n_d$, density and glass transition temperature.

The training dataset of glass compositions satisfying the criteria specified in Table 1 below and having measured values of the properties of interest, about 100 glass compositions for each property ($n_d$, density and $T_g$), was randomly selected from the literature data presented in the publicly available SciGlass Information System database and from the Exemplary Glasses from the embodiments presented herein. The linear regression analysis on the above-specified dataset was used to determine the formulas, with the exclusion of insignificant variables and outliers. The resulting formulas are presented in Table 2 below. Another part of glass compositions satisfying the same criteria was used as a validation set to evaluate the ability to interpolate within predefined compositional limits, which corresponds to the standard deviations specified in the Table 2. An external dataset of prior art glass compositions, also randomly selected from the SciGlass Information System database, was used to evaluate the ability to predict the properties outside of the specified compositional limits with a reasonable accuracy. Multiple iterations of this process were performed in order to determine the best variant for each property, corresponding to the above-mentioned regression formulas specified in the Table 2.

The data for the Comparative Glass compositions used in the linear regression modeling, including the training dataset, validation dataset and external dataset were obtained from the publicly available SciGlass Information System database. Formulas (IV), (V) and (VI) below were obtained from the linear regression analysis and used to predict the refractive index $n_d$, density $d_{RT}$ and glass transition temperature $T_g$, respectively, of the glasses:

$$P_n=-0.0058979*Al_2O_3-0.006059*B_2O_3-\\ 0.00099077*BaO+0.008748*Bi_2O_3-\\ 0.0023394*CaO+0.0063304*Er_2O_3+\\ 0.0019089*Gd_2O_3-0.0043254*GeO_2-\\ 0.0056788*K_2O+0.0036519*La_2O_3-\\ 0.0033647*Li_2O-0.0036379*MgO-\\ 0.0043599*Na_2O+0.0027829*Nb_2O_5-\\ 0.0085247*P_2O_5+0.0016124*PbO-\\ 0.0054718*SiO_2-0.0024916*SrO+\\ 0.0052979*Ta_2O_5-0.0030478*TeO_2+\\ 0.0018048*TiO_2+0.00087206*WO_3+\\ 0.0026681*Y_2O_3+0.0052852*Yb_2O_3-\\ 0.0012391*ZnO+2.05, \qquad (IV)$$

$$P_d(g/cm^3)=4.488-0.030315*Al_2O_3-0.023886*B_2O_3+\\ 0.022641*BaO+0.075639*Bi_2O_3-\\ 0.0035072*CaO+0.072631*Er_2O_3+\\ 0.072133*Gd_2O_3-0.014396*GeO_2-\\ 0.019374*K_2O+0.051970*La_2O_3-\\ 0.011393*Li_2O-0.0049704*MgO-\\ 0.010898*Na_2O+0.0014888*Nb_2O_5-\\ 0.043265*P_2O_5+0.032783*PbO-\\ 0.021778*SiO_2+0.0071976*SrO+\\ 0.056465*Ta_2O_5+0.0079679*TeO_2-\\ 0.0080419*TiO_2+0.023079*WO_3+\\ 0.031205*Y_2O_3+0.080706*Yb_2O_3+\\ 0.010824*ZnO+0.0073434*ZrO_2, \qquad (V)$$

$$P_{Tg}(° C.)=590+1.2049*Al_2O_3-0.73463*B_2O_3+\\ 0.48384*BaO-4.6279*Bi_2O_3+5.1528*Er_2O_3+\\ 4.7419*Gd_2O_3-0.46782*GeO_2-5.4336*K_2O+\\ 3.6709*La_2O_3-4.4120*Li_2O-4.5127*Na_2O+\\ 1.5185*Nb_2O_5-2.2882*PbO+0.18633*SiO_2+\\ 0.59627*SrO+2.9784*Ta_2O_5-4.1591*TeO_2+\\ 1.1157*TiO_2-2.0154*WO_3+4.7923*Y_2O_3+\\ 3.0372*Yb_2O_3-1.8077*ZnO+0.40110*ZrO_2. \qquad (VI)$$

In Formulas (IV), (V) and (VI) and Tables 1 and 2, the refractive index parameter $P_n$ is a parameter that predicts the refractive index $n_d$ at 587.56 nm, calculated from the components of the glass composition expressed in mol. %; density parameter $P_d$ is a parameter that predicts the density at room temperature $d_{RT}$ [in units of g/cm$^3$], calculated from the components of the glass composition expressed in mol. %; and $T_g$ parameter $P_{Tg}$ is a parameter that predicts the glass transition temperature $T_g$ [in units of ° C.], calculated from the components of the glass composition expressed in mol. %.

In Formulas (IV), (V) and (VI), each component of the glass composition is listed in terms of its chemical formula, where the chemical formula refers to the concentration of the component expressed in mol. %. For example, for purposes of Formulas (IV), (V) and (VI), $Al_2O_3$ refers to the concentration of $Al_2O_3$, expressed in mol. %, in the glass composition. It is understood that not all components listed in Formulas (IV), (V) and (VI) are necessarily present in a particular glass composition and that Formulas (IV), (V) and (VI) are equally valid for glass compositions that contain less than all of the components listed in the formulas. It is further understood that Formulas (IV), (V) and (VI) are also valid for glass compositions within the scope and claims of the present disclosure that contain components in addition to the components listed in the formulas. If a component listed in Formulas (IV), (V) and (VI) is absent in a particular glass composition, the concentration of the component in the glass composition is 0 mol. % and the contribution of the component to the value calculated from the formulas is zero. In Table 1, $RE_mO_n$ is a total sum of rare earth metal oxides.

TABLE 1

| | Composition Space Used for Modeling | | | | | |
|---|---|---|---|---|---|---|
| | | Property | | | | |
| | $n_d$ | | $d_{RT}$, g/cm$^3$ | | $T_g$ ° C. | |
| Component limits | Min, mol. % | Max, mol. % | Min, mol. % | Max, mol. % | Min, mol. % | Max, mol. % |
| TiO$_2$ | 5 | 40 | 1 | 20 | 1 | 35 |
| La$_2$O$_3$ | 0 | 30 | 1 | 30 | Not limited | Not limited |
| B$_2$O$_3$ | 5 | 30 | 0 | 35 | 5 | 30 |
| SiO$_2$ | 0 | 15 | 0 | 30 | 0 | 15 |
| ZrO$_2$ | 0 | 10 | 0 | 20 | 0 | 15 |
| Nb$_2$O$_5$ | 0 | 15 | 0 | 15 | 0 | 15 |
| CaO | 0 | 20 | Not limited | Not limited | 0 | 20 |
| BaO | 0 | 10 | Not limited | Not limited | 0 | 10 |
| WO$_3$ | 0 | 30 | 1 | 25 | 0 | 30 |
| Bi$_2$O$_3$ | 0 | 20 | Not limited | Not limited | 0 | 20 |
| PbO | 0 | 15 | Not limited | Not limited | 0 | 15 |
| P$_2$O$_5$ | 0 | 10 | 0 | 10 | 0 | 10 |
| TeO$_2$ | 0 | 20 | Not limited | Not limited | 0 | 20 |
| Al$_2$O$_3$ + RE$_m$O$_n$ | 0 | 30 | Not limited | Not limited | 0 | 30 |
| GeO$_2$ | 0 | 10 | Not limited | Not limited | 0 | 10 |
| F | 0 | 3 [at. %] | 0 | 5 [at. %] | Not limited | Not limited |
| La$_2$O$_3$ + Gd$_2$O$_3$ + ZrO$_2$ + TiO$_2$ + Nb$_2$O$_5$ + WO$_3$ + Bi$_2$O$_3$ | Not limited | Not limited | 10 | Not limited | Not limited | Not limited |
| La$_2$O$_3$ + Gd$_2$O$_3$ | Not limited | Not limited | Not limited | Not limited | 1 | 35 |
| F + Cl + Br + I | Not limited | Not limited | Not limited | Not limited | 0 | 3 |
| TiO$_2$ + Nb$_2$O$_5$ | Not limited | Not limited | Not limited | Not limited | Not limited | 45 |
| SiO$_2$ + B$_2$O$_3$ − P$_2$O$_5$ | Not limited | Not limited | Not limited | Not limited | 0 | Not limited |
| Li$_2$O + Na$_2$O + K$_2$O | Not limited | Not limited | Not limited | Not limited | 0 | 25 |
| Other species | 0 | Not limited | 0 | Not limited | 0 | Not limited |

TABLE 2

| | Property prediction models | | | | | |
|---|---|---|---|---|---|---|
| Property | Abbreviation | Unit | Predicting Parameter | Regression Formula | Composition Unit | Standard error |
| Refractive index at 587.56 nm | $n_d$ | | $P_n$ | Formula (IV) | Mol. % | 0.017 |

TABLE 2-continued

| | | | Predicting | Regression | Composition | Standard |
|---|---|---|---|---|---|---|
| Property | Abbreviation | Unit | Parameter | Formula | Unit | error |
| Property prediction models | | | | | | |
| Density at room temperature | $d_{RT}$ | $g/cm^3$ | $P_d$ | Formula (V) | Mol. % | 0.085 |
| Glass transition temperature | $T_g$ | ° C. | $P_{Tg}$ | Formula (VI) | Mol. % | 17 |

Figure 2:
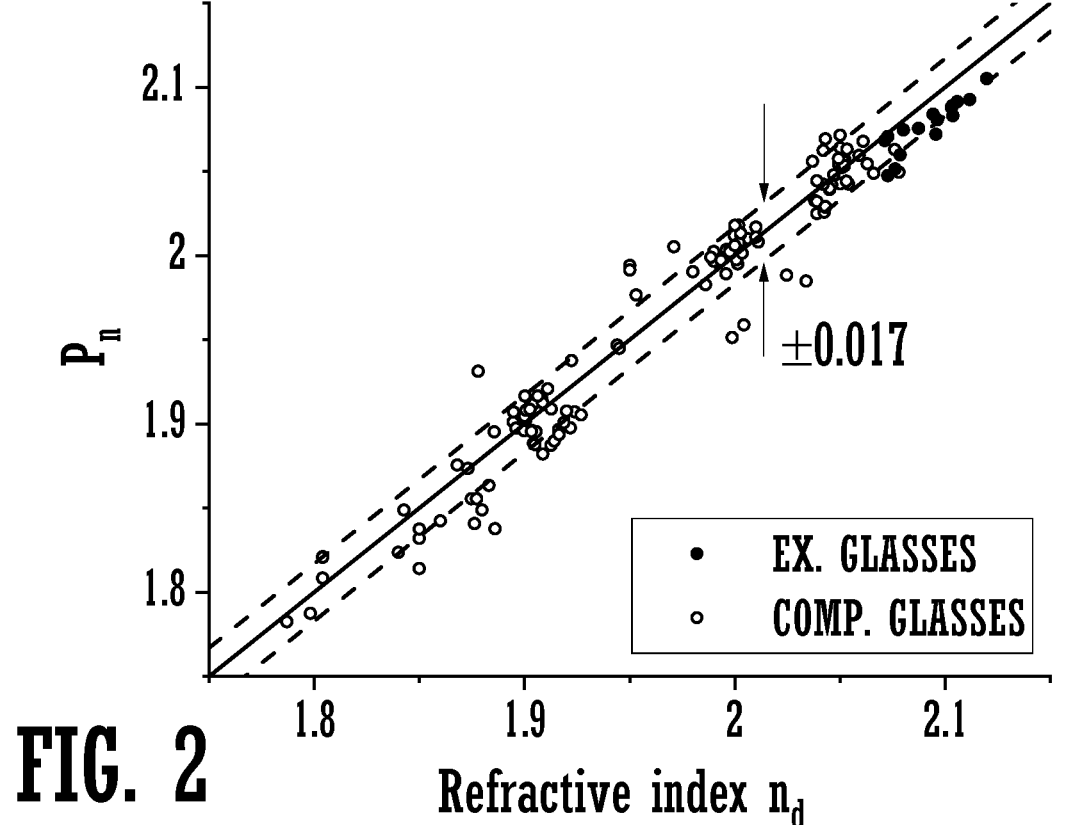
FIG. 2 is a plot illustrating the relationship between the refractive index $n_d$ and the refractive index parameter $P_n$ calculated by formula (IV) for some Comparative Glasses and some Exemplary Glasses according to an embodiment of the present disclosure.

FIG. 2 is a plot of the parameter $P_n$ calculated by Formula (IV) as a function of measured refractive index $n_d$ for some Literature Glasses ("Comp. Glasses") and some Exemplary Glasses ("Ex. Glasses"). As illustrated by the data in FIG. 2, the compositional dependence of the parameter $P_n$ had an error within a range of ±0.017 unit of the measured $n_d$ for the majority of glasses, that corresponds to the standard error specified in Table 2.

Figure 3:
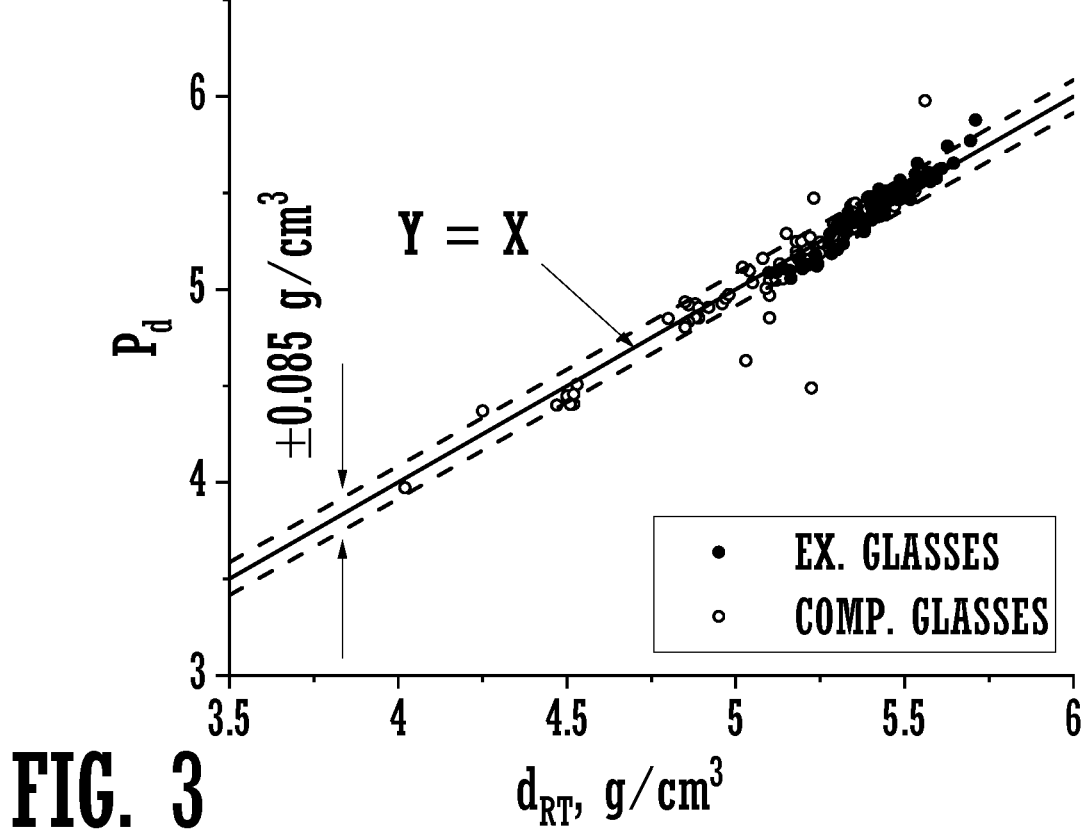
FIG. 3 is a plot illustrating the relationship between the density $d_{RT}$ and the density parameter $P_d$ calculated by formula (V) for some Comparative Glasses and some Exemplary Glasses according to an embodiment of the present disclosure.

FIG. 3 is a plot of the parameter $P_d$ calculated by Formula (V) as a function of measured density $d_{RT}$ for some Literature Glasses ("Comp. Glasses") and some Exemplary Glasses ("Ex. Glasses"). As illustrated by the data in FIG. 3, the compositional dependence of the parameter $P_d$ had an error within a range of ±0.085 unit ($g/cm^3$) of the measured $d_{RT}$ for the majority of glasses, that corresponds to the standard error specified in Table 2.

Figure 4:
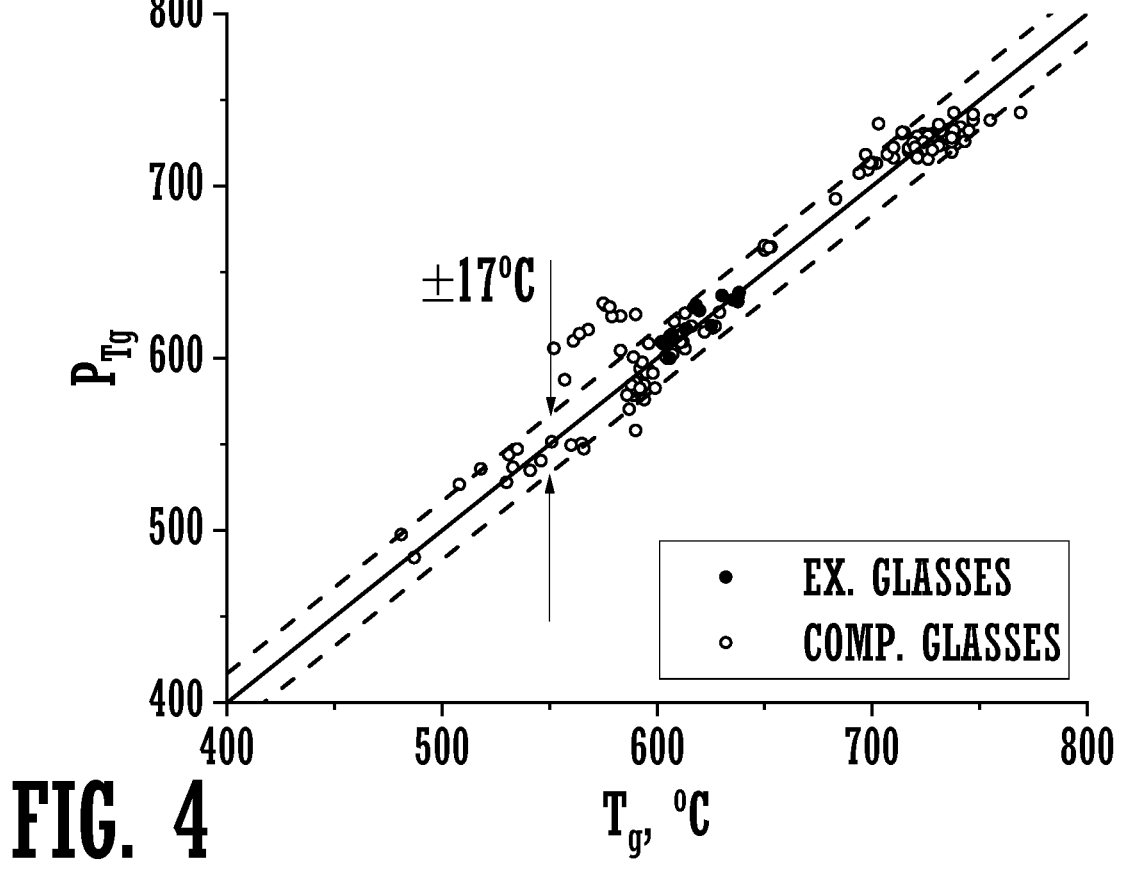
FIG. 4 is a plot illustrating the relationship between the glass transition temperature $T_g$ and the $T_g$ parameter $P_{Tg}$ calculated by formula (VI) for some Comparative Glasses and some Exemplary Glasses according to an embodiment of the present disclosure.

FIG. 4 is a plot of the parameter $P_{Tg}$ calculated by Formula (VI) as a function of measured glass transition temperature $T_g$ for some Literature Glasses ("Comp. Glasses") and some Exemplary Glasses ("Ex. Glasses"). As illustrated by the data in FIG. 4, the compositional dependence of the parameter $P_{Tg}$ had an error within a range of ±17 unit (° C.) of the measured $T_g$ for the majority of glasses, that corresponds to the standard error specified in Table 2.

When considering $T_g$ as a function of glass composition, one should understand that the numerical value of this quantity may depend on the method of its measurement (such as differential scanning calorimetry [DSC], differential thermal analysis [DTA], thermomechanical analysis [TMA] and others), measurement conditions (such as heating rate when measuring $T_g$ when heating a sample), and the thermal history, that means the time-temperature schedule of preliminary thermal treatment, starting from melting a sample. That is why comparison of measured values of $T_g$ with the results of calculation from the glass composition may give some deviations caused by different methods of measurement, and/or different process conditions, and/or different thermal history. The analysis of published data taken from different sources, performed with the use of the publicly available SciGlass Information System database shows that typically the values of $T_g$ reported for the same compositions and obtained in different ways deviate from each other within approximately ±10-20° C., which is, typically, many times less than the variation of $T_g$ caused by changing the glass compositions within the ranges considered in the present disclosure.

Accordingly, the formula for prediction of $T_g$ from the glass composition presented in the present disclosure relates to the experimental conditions and methods described in the disclosure, which assumes the measurement by DSC method when heating the glass samples with the rate of 10° C./min cooled according to the procedure described in the present disclosure without special preliminary treatment. When comparing the results of such calculations with the data published in the literature, it is assumed that the published values of $T_g$ typically do not deviate from the values obtained in the conditions used herein for more than approximately 20° C.

Table 3 identifies the combination of components and their respective amounts according to some embodiments of the present disclosure. The Exemplary Glasses A in Table 3 may include additional components according to any aspects of the present disclosure as described herein.

TABLE 3

| Exemplary Glasses A | |
|---|---|
| Component | Amount (mol. %) |
| $B_2O_3$ | 10.0 to 40.0 mol. % |
| $WO_3$ | 0.0 to 40.0 mol. % |
| $Nb_2O_5$ | 0.0 to 30.0 mol. % |
| $TiO_2$ | 0.0 to 30.0 mol. % |
| $La_2O_3$ | 0.0 to 25.0 mol. % |
| $Bi_2O_3$ | 0.0 to 20.0 mol. % |
| $TeO_2$ | 0.0 to 15.0 mol. % |
| $ZrO_2$ | 0.0 to 15.0 mol. % |
| $SiO_2$ | 0.0 to 10.0 mol. % |
| PbO | 0.0 to 10.0 mol. % |
| $GeO_2$ | 0.0 to 10.0 mol. % |
| $P_2O_5$ | 0.0 to 10.0 mol. % |
| $Y_2O_3$ | 0.0 to 6.0 mol. % |
| $V_2O_5$ | 0.0 to 5.0 mol. % |
| Sum of ($WO_3 + Bi_2O_3$) | ≥0.1 mol. % |

According to some embodiments, Exemplary Glasses A may also have a refractive index at 587.56 nm $n_d$ of greater than or equal to 2.04.

According to some embodiments, Exemplary Glasses A may also have a glass formation parameter $P_{GF}$ from −5 to 15.

Table 4 identifies the combination of components and their respective amounts according to other embodiments. The Exemplary Glasses B in Table 4 may include additional components according to any aspects of the present disclosure as described herein.

TABLE 4

| Exemplary Glasses B | |
|---|---|
| Component | Amount (mol. %) |
| $B_2O_3$ | 10.0 to 40.0 mol. % |
| $Bi_2O_3$ | 0.5 to 20.0 mol. % |
| Sum of (BaO + SiO + ZnO + CdO) | 0.0 to 25.0 mol. % |
| Sum of ($MoO_3 + V_2O_5$) | 0.0 to 5.0 mol. % |

Exemplary Glasses B according to embodiments may optionally include copper (Cu) in an amount 0.0 to 1.0 at. %.

According to some embodiments, Exemplary Glasses B may also optionally include iron (Fe) in an amount 0.0 to 1.0 at. %.

According to some embodiments, Exemplary Glasses B may also satisfy the following condition:

$$TiO_2\text{—}Nb_2O_5[mol. \%]\leq 5.0,$$

where chemical formulas refer to the amounts of components in the glass composition, expressed in mol. %.

According to some embodiments, Exemplary Glasses B may also satisfy the following condition:

$$SiO_2\text{—}B_2O_3[mol. \%]\leq 5.0,$$

where chemical formulas refer to the amounts of components in the glass composition, expressed in mol. %.

According to some embodiments, Exemplary Glasses B may also have a refractive index at 587.56 nm $n_d$ of greater than or equal to 1.9.

According to some embodiments, Exemplary Glasses B may also satisfy the following formula:

$$n_d\text{—}(1.483+0.104*d_{RT})>0.000.$$

According to some embodiments, Exemplary Glasses B may also satisfy the following formula:

$$n_d\text{—}(1.503+0.104*d_u)>0.000.$$

Table 5 identifies the combination of components and their respective amounts according to further embodiments of the present disclosure. The Exemplary Glasses C in Table 5 may include additional components according to any aspects of the present disclosure as described herein.

TABLE 5

| Exemplary Glasses C | |
| --- | --- |
| Component | Amount (mol. %) |
| $B_2O_3$ | ≥10.0 mol. % |
| $Nb_2O_5$ | 3.0 to 30.0 mol. % |
| $TiO_2$ | 0.0 to 40.0 mol. % |
| $La_2O_3$ | 0.0 to 25.0 mol. % |
| $Bi_2O_3$ | 0.0 to 15.0 mol. % |
| $TeO_2$ | 0.0 to 14.0 mol. % |
| $P_2O_5$ | 0.0 to 10.0 mol. % |
| $GeO_2$ | 0.0 to 10.0 mol. % |
| Sum of ($WO_3 + Bi_2O_3$) | ≥2.0 mol. % |
| Sum of ($TiO_2 + ZrO_2$) | ≥2.0 mol. % |
| Sum of ($TiO_2 + Nb_2O_5$) | ≥1.0 mol. % |
| Sum of ($BaO + ZnO$) | 0.0 to 20.0 mol. % |

Exemplary Glasses C according to embodiments may satisfy the following condition:

$$Nb_2O_5\text{—}SiO_2[mol. \%]\geq 3.0,$$

where chemical formulas refer to the amounts of components in the glass composition, expressed in mol. %.

According to some embodiments, Exemplary Glasses C may also have a glass transition temperature $T_g$ [° C.] from 500 to 750.

According to some embodiments, Exemplary Glasses C may also satisfy the following formula:

$$n_d\text{—}(1.47+0.0009*T_g)>0.000,$$

where $n_d$ is a refractive index at 587.56 nm, and $T_g$ is a glass transition temperature (° C.).

According to some embodiments, Exemplary Glasses C may also satisfy the following formula:

$$n_d\text{—}(1.49+0.0009*T_g)>0.000,$$

where $n_d$ is a refractive index at 587.56 nm, and $T_g$ is a glass transition temperature (° C.).

Examples

The following examples describe various features and advantages provided by the disclosure, and are in no way intended to limit the invention and appended claims.

Figure 5:
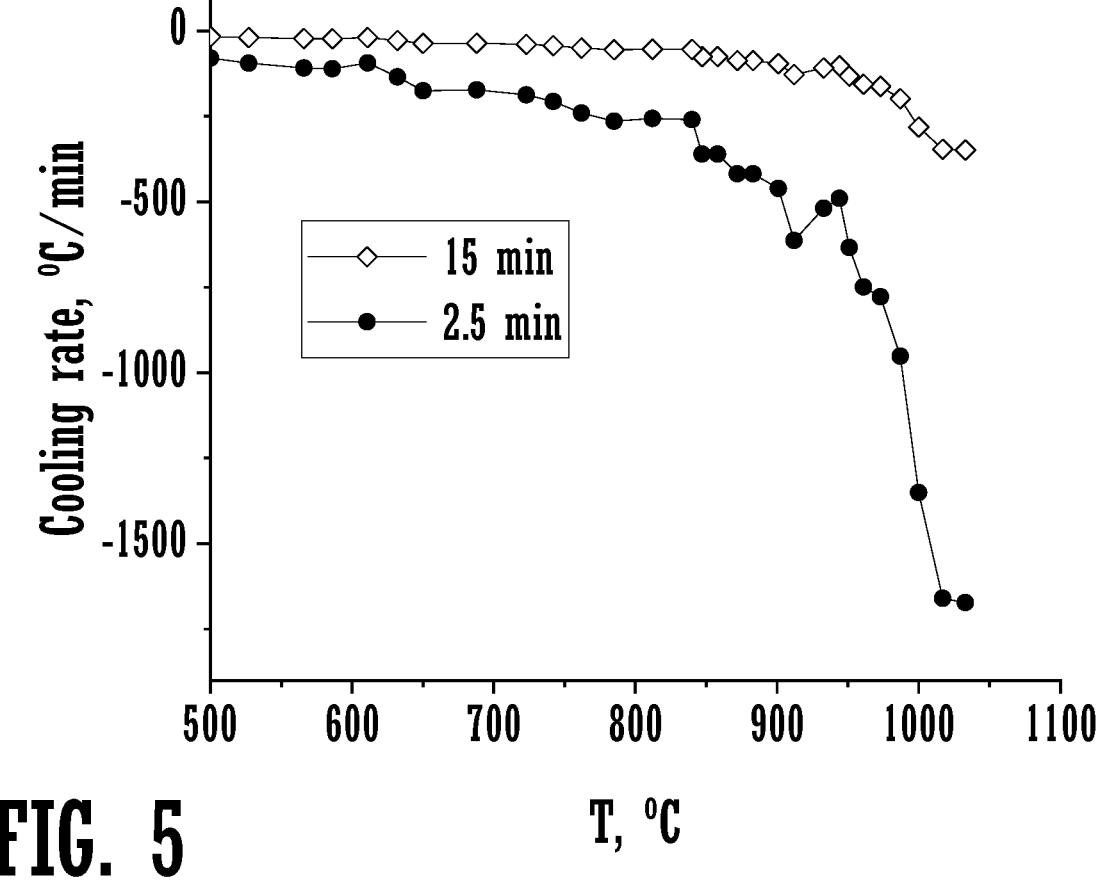
FIG. 5 is a plot of an exemplary cooling schedule according to a "15 min test" condition and a "2.5 min test" condition for some Exemplary Glasses according to an embodiment of the present disclosure.

To prepare samples for some exemplary glasses of the present disclosure, about 15 grams of the batch composition each glass (content of intended components in the batch composition was more than 99.99 wt %) was melted from the batch raw materials (components) at a temperature of about 1300° C. in platinum or platinum-rhodium crucibles (Pt:Rh=80:20) for 1 hour. One of two controlled cooling conditions was then applied to the melt. In the first cooling condition (referred to as "15 min test" or "15 min devit test"), the cooling rate was controlled so that it took about 15 min for the samples to cool from 1100° C. to 500° C. in air inside a furnace. In the second cooling condition (referred to as "2.5 min test" or "2.5 min devit test"), the cooling rate was controlled so that it took about 2.5 min for the samples to cool from 1100° C. to 500° C. in air inside a furnace. Temperature readings were obtained by direct reading of the furnace temperature or using an IR camera with calibration scaling. The first cooling condition (15 min test) approximately corresponds to the cooling rate of up to 300° C./min at a temperature of 1000° C. and the second cooling condition (2.5 min test) approximately corresponds to the cooling rate of up to 600° C./min at 1000° C. (in both tests, the cooling rate approached its maximum at about 1000° C.). When the temperature of the glass is lower, the cooling rate decreases significantly. Typical schedules of the first and second cooling conditions are shown in FIG. 5. For these samples, observations referred to as "15-min devit test" and "2.5-min devit test", are specified in Table 6 below; the observation "1" is used to denote that a glass composition passed the indicated devit test, where a composition is deemed to have passed the indicated devit test if a melt of the composition forms a glass free of crystals visible to the naked eye under an optical microscope under magnification of 500×. The observation "0" is used to denote that a glass composition failed the indicated devit test. A glass that passes the 2.5-min devit test is referred to herein as a "glass that does not crystallize".

To prepare other exemplary glasses, a one kilogram batch of the components was prepared in a pure platinum crucible. The crucible was placed in a furnace set at a temperature of 1250° C., after which, the temperature in the furnace was raised to 1300° C. and held at 1300° C. for 2 hours. The furnace temperature was then reduced to 1250° C. and the glass was allowed to equilibrate at this temperature for an hour before being poured on a steel table followed by annealing at $T_g$ for an hour.

Some exemplary glass compositions were also melted in a "one liter" platinum crucible heated by the Joule effect. In this process, batches of approximately 3700 g of raw materials (components) were used. The crucible was filled in 1.5 hours at 1250° C. The temperature was then raised to 1300° C. and held for one hour. During this step, the melt was stirred at 60 rpm for 30 minutes. Stirring was then paused for an additional 30 minutes. The temperature was then decreased to 1200° C. where the melt was allowed to equilibrate for 30 minutes and the stirring speed was continued at a rate of 20 rpm. A delivery tube was then heated above the liquidus temperature of the glass and the melt was cast on a cooled graphite table. The resulting glass was formed into a bar of approximately 25 mm in thickness, 50 mm in width, and 90 cm in length. The bars were inspected under an optical microscope to check for crystallization and were all crystal free. The glass quality observed under the optical microscope was good with the bars being free of striae and bubbles. The glass was placed at $T_g$ in a lehr oven for 1 hour for a rough annealing. The bars were then annealed in a static furnace for one hour at $T_g$ and the temperature was then lowered at 1° C./min to return the glass to room temperature.

Some samples of the exemplary glasses were bleached after melting to improve the transmittance. The bleaching process was performed at a temperature between 500° C. and the crystallization onset temperature $T_x$. When the bleaching temperature is less than about 500° C., the bleaching process may take too long time because of its slow rate. When the bleaching temperature exceeds $T_x$, the glass may crystallize when heat-treating. The higher the bleaching temperature, the faster the bleaching process, but a lower value of total transmittance can be obtained. Accordingly, the temperature and time of bleaching were selected to come to an acceptable total transmittance within a reasonable time, such as less than or equal to 24 hours, or less than or equal to 48 hours, or less than or equal to 96 hours, or like. Before bleaching, the glasses were heated from room temperature at a rate from 3 to 5° C./min. After bleaching, the glasses were cooled to the room temperature at a rate from 1 to 3° C./min.

Chemical analysis was confirmed in independent meltings by XRF (X-ray fluorescence—for all oxides, except for $B_2O_3$ and $Li_2O$), by ICP (inductively coupled plasma mass spectrometry—for $B_2O_3$) and by FES (flame emission spectrometry—for $Li_2O$). These analyses gave deviations from the as-batched compositions within ±2.0 mass % for the major components such as $Nb_2O_5$ which is equivalently less than about 1 mol %.

In Tables 6 and 7, the abbreviation "n" with a subscript refers to the refractive index at a corresponding wavelength in nm; for example, $n_{632.8\ nm}$ refers to the refractive index at wavelengths of 632.8 nm. $T_x$ refers to the crystallization onset temperature.

TABLE 6

Exemplary Glass Compositions

|  |  | Exemplary Glass | | | | | | | |
|---|---|---|---|---|---|---|---|---|---|
|  |  | 1 | 2 | 3 | 4 | 5 | 6 | 7 | 8 |
| Composition - mol. % | | | | | | | | | |
| $WO_3$ | mol. % | 10.47 | 13.16 | 15.99 | 9.81 | 9.29 | 12.10 | 14.38 | 12.77 |
| $B_2O_3$ | mol. % | 31.46 | 32.99 | 23.90 | 31.43 | 31.38 | 29.57 | 29.10 | 28.78 |
| $La_2O_3$ | mol. % | 16.95 | 15.74 | 19.99 | 16.92 | 16.85 | 13.97 | 13.42 | 12.72 |
| $Nb_2O_5$ | mol. % | 16.52 | 14.99 | 14.99 | 16.55 | 16.59 | 16.51 | 16.09 | 16.51 |
| $TiO_2$ | mol. % | 13.25 | 8.99 | 9.00 | 13.32 | 13.44 | 14.60 | 14.06 | 15.17 |
| $ZrO_2$ | mol. % | 7.00 | 7.00 | 7.00 | 6.99 | 7.00 | 7.00 | 7.00 | 7.00 |
| $TeO_2$ | mol. % | 0 | 0 | 9.09 | 0 | 0 | 0 | 0 | 0 |
| $Bi_2O_3$ | mol. % | 4.31 | 7.08 | 0 | 4.93 | 5.41 | 4.31 | 3.12 | 4.31 |
| $Y_2O_3$ | mol. % | 0 | 0 | 0 | 0 | 0 | 1.89 | 2.78 | 2.69 |
| $SiO_2$ | mol. % | 0.0307 | 0.0322 | 0.0315 | 0.031 | 0.0311 | 0.0304 | 0.0301 | 0.0303 |
| $Ta_2O_5$ | mol. % | 0.0167 | 0.0131 | 0.0128 | 0.0168 | 0.0169 | 0.0166 | 0.0164 | 0.0165 |
| Composition constraints | | | | | | | | | |
| $WO_3 + Bi_2O_3$ | mol. % | 14.78 | 20.24 | 15.99 | 14.74 | 14.70 | 16.40 | 17.50 | 17.08 |
| $RE_mO_n + ZrO_2 - Nb_2O_5$ | mol. % | 7.433 | 7.754 | 12.00 | 7.359 | 7.254 | 6.355 | 7.106 | 5.902 |
| $TiO_2 - Nb_2O_5$ | mol. % | −3.267 | −6.002 | −5.994 | −3.224 | −3.152 | −1.912 | −2.031 | −1.340 |
| $SiO_2 - B_2O_3$ | mol. % | −31.43 | −32.96 | −23.87 | −31.40 | −31.35 | −29.54 | −29.07 | −28.75 |
| $TiO_2 + ZrO_2$ | mol. % | 20.25 | 15.99 | 15.99 | 20.32 | 20.44 | 21.60 | 21.06 | 22.17 |
| $TiO_2 + Nb_2O_5$ | mol. % | 29.76 | 23.98 | 23.99 | 29.87 | 30.03 | 31.11 | 30.16 | 31.68 |
| $Nb_2O_5 - SiO_2$ | mol. % | 16.49 | 14.96 | 14.96 | 16.52 | 16.56 | 16.48 | 16.06 | 16.48 |
| Measured properties | | | | | | | | | |
| $n_d$ |  |  | 2.0607 |  |  |  | 2.0727 |  | 2.0762 |
| $d_{RT}$ | g/cm³ | 5.187 | 5.402 | 5.333 | 5.284 | 5.301 | 5.243 | 5.198 | 5.240 |
| $T_g$ | ° C. | 618 | 606 |  | 617 |  |  |  | 620 |
| $T_x$ | ° C. | 733 | 710 |  | 722 |  |  |  | 727 |
| $T_{liq}$ | ° C. | 1078 | 1061 |  | 1083 |  |  |  | 1093 |
| $Log(\eta_{liq})$ | P |  | 0.49 |  |  |  |  |  |  |
| $n_{531.9\ nm}$ |  |  | 2.0763 |  |  |  | 2.0889 |  | 2.0924 |
| $n_{632.8\ nm}$ |  |  | 2.0514 |  |  |  | 2.0630 |  | 2.0665 |
| 15-min devit test (0/1) |  | 1 | 1 | 1 |  |  | 1 | 1 | 1 |
| $LR(T_g, T_{liq})$ |  | −0.18083 | −0.18122 |  | −0.18278 |  |  |  | −0.18487 |
| Predicted and calculated properties | | | | | | | | | |
| $P_{GF}$ | mol. % | 5.7622 | 3.8528 | 6.4808 | 5.1942 | 4.8087 | 6.2270 | 6.4898 | 6.4170 |
| $P_n$ [for $n_d$] |  | 2.0379 | 2.0388 | 2.0223 | 2.0431 | 2.0472 | 2.0474 | 2.040 | 2.0514 |
| $P_d$ [for $d_{RT}$] | g/cm³ | 5.1545 | 5.3588 | 5.3988 | 5.1849 | 5.206 | 5.1308 | 5.1075 | 5.1206 |
| $P_{Tg}$ [for $T_g$] | ° C. | 630.8 | 599.9 | 611.4 | 629.3 | 628.1 | 628.6 | 630.8 | 627.7 |
| $P_n - (1.483 + 0.104 * P_d)$ |  | 0.0188 | −0.0015 | −0.0222 | 0.0208 | 0.0228 | 0.0308 | 0.0259 | 0.0358 |
| $P_n - (1.503 + 0.104 * P_d)$ |  | −0.0012 | −0.0215 | −0.0422 | 8.300E-04 | 0.0028 | 0.0108 | 0.0059 | 0.0158 |

TABLE 6-continued

| Exemplary Glass Compositions | | | | | | | | |
|---|---|---|---|---|---|---|---|---|
| $P_n - (1.47 + 0.0009 * P_{Tg})$ | 1.600E−04 | 0.0289 | 0.0020 | 0.0067 | 0.0119 | 0.0117 | 0.0024 | 0.0165 |
| $Pn - (1.49 + 0.0009 * P_{Tg})$ | −0.0198 | 0.0089 | −0.0180 | −0.0133 | −0.0081 | −0.0083 | −0.0177 | −0.0035 |

| | | Exemplary Glass | | | | | | |
|---|---|---|---|---|---|---|---|---|
| | | 9 | 10 | 11 | 12 | 13 | 14 | 15 | 16 |

| Composition - mol. % | | | | | | | | | |
|---|---|---|---|---|---|---|---|---|---|
| WO$_3$ | mol. % | 22.99 | 23.00 | 23.00 | 22.99 | 22.99 | 22.99 | 22.99 | 22.99 |
| B$_2$O$_3$ | mol. % | 26.65 | 25.60 | 25.41 | 24.53 | 25.53 | 25.37 | 25.49 | 24.46 |
| La$_2$O$_3$ | mol. % | 19.99 | 20.00 | 19.99 | 19.99 | 19.99 | 19.99 | 19.99 | 20.00 |
| Nb$_2$O$_5$ | mol. % | 11.00 | 11.00 | 11.00 | 10.99 | 13.45 | 12.29 | 11.00 | 14.52 |
| TiO$_2$ | mol. % | 10.99 | 10.98 | 10.99 | 11.00 | 11.01 | 12.33 | 13.49 | 10.98 |
| ZrO$_2$ | mol. % | 7.00 | 6.99 | 7.00 | 7.00 | 7.00 | 6.99 | 6.99 | 7.00 |
| Bi$_2$O$_3$ | mol. % | 1.35 | 2.39 | 1.25 | 3.47 | 0 | 0 | 0 | 0 |
| Y$_2$O$_3$ | mol. % | 0 | 0 | 1.32 | 0 | 0 | 0 | 0 | 0 |
| SiO$_2$ | mol. % | 0.0316 | 0.0323 | 0.0319 | 0.033 | 0.0315 | 0.0312 | 0.0308 | 0.0319 |
| Ta$_2$O$_5$ | mol. % | 0.0086 | 0.0088 | 0.0087 | 0.009 | 0.0129 | 0.0127 | 0.0084 | 0.013 |
| Composition constraints | | | | | | | | | |
| WO$_3$ + Bi$_2$O$_3$ | mol. % | 24.33 | 25.39 | 24.25 | 26.45 | 22.99 | 22.99 | 22.99 | 22.99 |
| RE$_m$O$_n$ + ZrO$_2$ − Nb$_2$O$_5$ | mol. % | 15.99 | 16.00 | 17.32 | 16.00 | 13.54 | 14.69 | 15.99 | 12.47 |
| TiO$_2$ − Nb$_2$O$_5$ | mol. % | −0.01158 | −0.01385 | −6.710E−03 | 8.620E−03 | −2.445 | 0.04475 | 2.497 | −3.538 |
| SiO$_2$ − B$_2$O$_3$ | mol. % | −26.62 | −25.56 | −25.38 | −24.50 | −25.49 | −25.34 | −25.46 | −24.43 |
| TiO$_2$ + ZrO$_2$ | mol. % | 17.98 | 17.98 | 17.99 | 18.00 | 18.00 | 19.32 | 20.49 | 17.98 |
| TiO$_2$ + Nb$_2$O$_5$ | mol. % | 21.98 | 21.98 | 21.98 | 21.99 | 24.46 | 24.62 | 24.49 | 25.51 |
| Nb$_2$O$_5$ − SiO$_2$ | mol. % | 10.97 | 10.97 | 10.96 | 10.96 | 13.42 | 12.26 | 10.97 | 14.49 |
| Measured properties | | | | | | | | | |
| d$_{RT}$ | g/cm$^3$ | 5.456 | 5.569 | 5.487 | | 5.409 | 5.414 | 5.405 | |
| T$_g$ | ° C. | | 625 | | | 635 | | 638 | |
| T$_x$ | ° C. | | 718 | | | 744 | | 756 | |
| $\alpha_{20\text{-}300} \times 10^7$ | K$^{-1}$ | 80.800 | | | 84.700 | | | | 79.900 |
| T$_{liq}$ | ° C. | | 1092.4 | | | 1090.4 | | 1082.8 | |
| 15-min devit test (0/1) | | 1 | 1 | 1 | 1 | 1 | 1 | 1 | 1 |
| LR(T$_g$, T$_{liq}$) | | | −0.18193 | | | −0.17639 | | −0.17291 | |
| Predicted and calculated properties | | | | | | | | | |
| P$_{GF}$ | mol. % | 7.0585 | 5.6687 | 5.4138 | 4.2122 | 10.464 | 7.9310 | 5.5100 | 11.205 |
| P$_n$ [for n$_d$] | | 2.0436 | 2.0592 | 2.0539 | 2.075 | 2.0456 | 2.0457 | 2.0434 | 2.055 |
| P$_d$ [for d$_{RT}$] | g/cm$^3$ | 5.5017 | 5.6066 | 5.5657 | 5.7124 | 5.4307 | 5.4219 | 5.4076 | 5.458 |
| P$_{Tg}$ [forT$_g$] | ° C. | 623.0 | 619.0 | 630.7 | 614.8 | 633.9 | 633.7 | 632.9 | 636.3 |
| P$_n$ − (1.483 + 0.104 * P$_d$) | | −0.0116 | −0.0069 | −0.0080 | −0.0021 | −0.0022 | −0.0012 | −0.0020 | 0.0043 |
| P$_n$ − (1.503 + 0.104 * P$_d$) | | −0.0316 | −0.0269 | −0.0280 | −0.0221 | −0.0222 | −0.0212 | −0.0220 | −0.0157 |
| P$_n$ − (1.47 + 0.0009 * P$_{Tg}$) | | 0.0129 | 0.0321 | 0.0162 | 0.0517 | 0.0051 | 0.0054 | 0.0038 | 0.0124 |
| P$_n$ − (1.49 + 0.0009 * P$_{Tg}$) | | −0.0071 | 0.0121 | −0.0038 | 0.0317 | −0.0149 | −0.0146 | −0.0162 | −0.0076 |

| | | Exemplary Glass | | | | | | |
|---|---|---|---|---|---|---|---|---|
| | | 17 | 18 | 19 | 20 | 21 | 22 | 23 | 24 |

| Composition - mol. % | | | | | | | | | |
|---|---|---|---|---|---|---|---|---|---|
| WO$_3$ | mol. % | 22.99 | 22.99 | 22.99 | 22.99 | 22.99 | 18.86 | 19.99 | 19.99 |
| B$_2$O$_3$ | mol. % | 24.33 | 24.34 | 24.45 | 23.00 | 23.00 | 26.54 | 24.97 | 24.55 |
| La$_2$O$_3$ | mol. % | 19.99 | 19.99 | 19.99 | 19.99 | 19.99 | 19.99 | 19.99 | 19.99 |
| Nb$_2$O$_5$ | mol. % | 13.29 | 12.29 | 11.00 | 13.45 | 12.40 | 13.56 | 14.93 | 14.08 |
| TiO$_2$ | mol. % | 12.35 | 13.35 | 14.54 | 13.54 | 14.57 | 14.02 | 13.09 | 14.36 |
| ZrO$_2$ | mol. % | 7.00 | 7.00 | 7.00 | 6.99 | 6.99 | 6.99 | 6.99 | 7.00 |
| SiO$_2$ | mol. % | 0.0315 | 0.0312 | 0.0308 | 0.0316 | 0.0313 | 0.0305 | 0.0312 | 0.031 |
| Ta$_2$O$_5$ | mol. % | 0.0129 | 0.0127 | 0.0084 | 0.0129 | 0.0128 | 0.0124 | 0.0127 | 0.0126 |
| Composition constraints | | | | | | | | | |
| WO$_3$ + Bi$_2$O$_3$ | mol. % | 22.99 | 22.99 | 22.99 | 22.99 | 22.99 | 18.86 | 19.99 | 19.99 |
| RE$_m$O$_n$ + ZrO$_2$ − Nb$_2$O$_5$ | mol. % | 13.70 | 14.70 | 15.99 | 13.53 | 14.58 | 13.43 | 12.06 | 12.90 |
| TiO$_2$ − Nb$_2$O$_5$ | mol. % | −0.9491 | 1.061 | 3.548 | 0.08399 | 2.170 | 0.4634 | −1.839 | 0.2720 |
| SiO$_2$ − B$_2$O$_3$ | mol. % | −24.30 | −24.31 | −24.41 | −22.97 | −22.97 | −26.51 | −24.94 | −24.52 |
| TiO$_2$ + ZrO$_2$ | mol. % | 19.35 | 20.35 | 21.54 | 20.53 | 21.57 | 21.01 | 20.08 | 21.35 |

TABLE 6-continued

| | | Exemplary Glass Compositions | | | | | | | |
|---|---|---|---|---|---|---|---|---|---|
| $TiO_2 + Nb_2O_5$ | mol. % | 25.64 | 25.64 | 25.54 | 26.99 | 26.98 | 27.58 | 28.02 | 28.44 |
| $Nb_2O_5 - SiO_2$ | mol. % | 13.26 | 12.26 | 10.97 | 13.42 | 12.37 | 13.53 | 14.90 | 14.05 |
| | | Measured properties | | | | | | | |
| $d_{RT}$ | g/cm$^3$ | 5.437 | 5.428 | 5.427 | 5.454 | 5.450 | 5.279 | 5.318 | 5.321 |
| $T_g$ | ° C. | 638 | | | | 638 | | | |
| $T_x$ | ° C. | 743 | | | | 751 | | | |
| $\alpha_{20\text{-}300} \times 10^7$ | K$^{-1}$ | | | | 81.900 | | | | |
| $T_{liq}$ | ° C. | | | | | 1104.0 | | | |
| 15-min devit test (0/1) | | 1 | 1 | 1 | 1 | 1 | 1 | 1 | 1 |
| LR($T_g$, $T_{liq}$) | | | | | | −0.17935 | | | |
| | | Predicted and calculated properties | | | | | | | |
| $P_{GF}$ | mol. % | 8.5696 | 6.5646 | 4.1051 | 7.0938 | 5.0142 | 3.7659 | 6.6743 | 4.4223 |
| $P_n$ [for n$_d$] | | 2.0548 | 2.0538 | 2.0517 | 2.0655 | 2.0644 | 2.0416 | 2.0542 | 2.0567 |
| $P_d$ [for d$_{RT}$] | g/cm$^3$ | 5.4482 | 5.4386 | 5.4242 | 5.4705 | 5.4607 | 5.2873 | 5.3603 | 5.3586 |
| $P_{Tg}$ [for T$_g$] | ° C. | 636.0 | 635.6 | 634.9 | 638.5 | 638.1 | 645.0 | 644.9 | 645.3 |
| $P_n$ − (1.483 + 0.104 * P$_d$) | | 0.0052 | 0.0052 | 0.0046 | 0.0135 | 0.0135 | 0.0087 | 0.0138 | 0.0164 |
| $P_n$ − (1.503 + 0.104 * P$_d$) | | −0.0148 | −0.0148 | −0.0155 | −0.0065 | −0.0065 | −0.0113 | −0.0062 | −0.0036 |
| $P_n$ − (1.47 + 0.0009 * P$_{Tg}$) | | 0.0124 | 0.0118 | 0.0103 | 0.0208 | 0.0201 | −0.0089 | 0.0038 | 0.0059 |
| $P_n$ − (1.49 + 0.0009 * P$_{Tg}$) | | −0.0076 | −0.0082 | −0.0097 | 7.800E−04 | 1.100E−04 | −0.0289 | −0.0162 | −0.0141 |

| | | Exemplary Glass | | | | | | | |
|---|---|---|---|---|---|---|---|---|---|
| | | 25 | 26 | 27 | 28 | 29 | 30 | 31 | 32 |
| | | Composition - mol. % | | | | | | | |
| $WO_3$ | mol. % | 19.99 | 19.01 | 12.90 | 12.87 | 12.97 | 12.84 | 12.93 | 13.04 |
| $B_2O_3$ | mol. % | 24.00 | 26.25 | 30.72 | 30.16 | 31.38 | 29.72 | 30.77 | 31.84 |
| $La_2O_3$ | mol. % | 19.99 | 19.99 | 14.16 | 13.74 | 14.61 | 13.43 | 14.18 | 14.95 |
| $Nb_2O_5$ | mol. % | 12.99 | 11.53 | 15.67 | 15.92 | 15.48 | 16.10 | 15.73 | 15.34 |
| $TiO_2$ | mol. % | 15.98 | 11.19 | 12.03 | 12.94 | 11.16 | 13.62 | 12.10 | 10.52 |
| $ZrO_2$ | mol. % | 7.00 | 7.00 | 6.97 | 6.97 | 6.97 | 6.99 | 6.99 | 6.98 |
| $TeO_2$ | mol. % | 0 | 0 | 0.51 | 0.35 | 0.36 | 0.24 | 0.24 | 0.25 |
| $Bi_2O_3$ | mol. % | 0 | 5.00 | 5.67 | 5.27 | 6.07 | 4.98 | 5.67 | 6.37 |
| $Y_2O_3$ | mol. % | 0 | 0 | 1.34 | 1.74 | 0.96 | 2.03 | 1.36 | 0.68 |
| $SiO_2$ | mol. % | 0.0307 | 0.0331 | 0.0312 | 0.031 | 0.0315 | 0.0308 | 0.0312 | 0.0317 |
| $Ta_2O_5$ | mol. % | 0.0125 | 0.009 | 0.0127 | 0.0168 | 0.0129 | 0.0167 | 0.0127 | 0.0129 |
| | | Composition constraints | | | | | | | |
| $WO_3 + Bi_2O_3$ | mol. % | 19.99 | 24.01 | 18.56 | 18.13 | 19.04 | 17.82 | 18.60 | 19.41 |
| $RE_mO_n + ZrO_2 - Nb_2O_5$ | mol. % | 14.00 | 15.45 | 6.802 | 6.525 | 7.067 | 6.347 | 6.803 | 7.265 |
| $TiO_2 - Nb_2O_5$ | mol. % | 2.988 | −0.3436 | −3.644 | −2.979 | −4.313 | −2.475 | −3.630 | −4.814 |
| $SiO_2 - B2O3$ | mol. % | −23.97 | −26.21 | −30.69 | −30.12 | −31.35 | −29.69 | −30.74 | −31.80 |
| $TiO_2 + ZrO_2$ | mol. % | 22.98 | 18.18 | 19.00 | 19.92 | 18.14 | 20.61 | 19.08 | 17.50 |
| $TiO_2 + Nb_2O_5$ | mol. % | 28.98 | 22.72 | 27.69 | 28.87 | 26.64 | 29.72 | 27.82 | 25.86 |
| $Nb_2O_5 - SiO_2$ | mol. % | 12.96 | 11.50 | 15.64 | 15.89 | 15.44 | 16.07 | 15.69 | 15.30 |
| | | Measured properties | | | | | | | |
| $d_{RT}$ | g/cm$^3$ | 5.333 | | 5.277 | | | 5.236 | | 5.380 |
| $T_g$ | ° C. | | | 608 | | | | | |
| $T_x$ | ° C. | | | 723 | | | | | |
| $T_{liq}$ | ° C. | 1107 | | | | | | | |
| 15-min devit test (0/1) | | 1 | 1 | 1 | 1 | 1 | 1 | 1 | 1 |
| | | Predicted and calculated properties | | | | | | | |
| $P_{GF}$ | mol. % | 1.5231 | −0.37497 | 4.7594 | 5.2478 | 4.3034 | 5.5888 | 4.7917 | 3.9624 |
| $P_n$ [for n$_d$] | | 2.0599 | 2.0764 | 2.0436 | 2.0459 | 2.0422 | 2.0477 | 2.0446 | 2.0414 |
| $P_d$ [for d$_{RT}$] | g/cm$^3$ | 5.3574 | 5.695 | 5.2399 | 5.2051 | 5.2736 | 5.1799 | 5.2385 | 5.2997 |
| $P_{Tg}$ [for T$_g$] | ° C. | 645.9 | 615.5 | 611.6 | 616.3 | 608.2 | 619.8 | 612.9 | 605.8 |
| $P_n$ − (1.483 + 0.104 * P$_d$) | | 0.0198 | 0.0011 | 0.0157 | 0.0216 | 0.0108 | 0.0259 | 0.0167 | 0.0072 |
| $P_n$ − (1.503 + 0.104 * P$_d$) | | −2.300E−04 | −0.0189 | −0.0043 | 0.0016 | −0.0092 | 0.0060 | −0.0033 | −0.0128 |
| $P_n$ − (1.47 + 0.0009 * P$_{Tg}$) | | 0.0086 | 0.0525 | 0.0232 | 0.0212 | 0.0248 | 0.0199 | 0.0229 | 0.0262 |
| $P_n$ − (1.49 + 0.0009 * P$_{Tg}$) | | −0.0114 | 0.0325 | 0.0032 | 0.0012 | 0.0048 | −1.400E−04 | 0.0029 | 0.0062 |

TABLE 6-continued

Exemplary Glass Compositions

| | | Exemplary Glass | | | | | | | |
|---|---|---|---|---|---|---|---|---|---|
| | | 33 | 34 | 35 | 36 | 37 | 38 | 39 | 40 |
| Composition - mol. % | | | | | | | | | |
| $WO_3$ | mol. % | 12.81 | 12.91 | 12.99 | 13.09 | 12.88 | 12.96 | 13.05 | 19.99 |
| $B_2O_3$ | mol. % | 29.32 | 30.37 | 31.24 | 32.32 | 29.94 | 30.82 | 31.73 | 24.55 |
| $La_2O_3$ | mol. % | 13.13 | 13.88 | 14.49 | 15.28 | 13.56 | 14.19 | 14.84 | 19.99 |
| $Nb_2O_5$ | mol. % | 16.28 | 15.90 | 15.59 | 15.19 | 16.09 | 15.77 | 15.45 | 14.08 |
| $TiO_2$ | mol. % | 14.29 | 12.75 | 11.49 | 9.87 | 13.47 | 12.16 | 10.83 | 14.36 |
| $ZrO_2$ | mol. % | 6.99 | 6.99 | 6.99 | 6.99 | 7.00 | 7.00 | 7.00 | 7.00 |
| $TeO_2$ | mol. % | 0.14 | 0.13 | 0.13 | 0.14 | 0 | 0 | 0 | 0 |
| $Bi_2O_3$ | mol. % | 4.69 | 5.38 | 5.95 | 6.67 | 5.07 | 5.66 | 6.26 | 0 |
| $Y_2O_3$ | mol. % | 2.31 | 1.64 | 1.10 | 0.39 | 1.94 | 1.38 | 0.80 | 0 |
| $SiO_2$ | mol. % | 0.0306 | 0.031 | 0.0314 | 0.0319 | 0.0308 | 0.0312 | 0.0316 | 0.031 |
| $Ta_2O_5$ | mol. % | 0.0166 | 0.0169 | 0.0128 | 0.013 | 0.0168 | 0.0127 | 0.0129 | 0.0126 |
| Composition constraints | | | | | | | | | |
| $WO_3 + Bi_2O_3$ | mol. % | 17.50 | 18.29 | 18.94 | 19.76 | 17.95 | 18.62 | 19.30 | 19.99 |
| $RE_mO_n + ZrO_2 - Nb_2O_5$ | mol. % | 6.146 | 6.610 | 6.984 | 7.474 | 6.413 | 6.801 | 7.200 | 12.90 |
| $TiO_2 - Nb_2O_5$ | mol. % | −1.983 | −3.157 | −4.104 | −5.321 | −2.623 | −3.608 | −4.619 | 0.2720 |
| $SiO_2 - B_2O_3$ | mol. % | −29.29 | −30.34 | −31.21 | −32.29 | −29.91 | −30.79 | −31.70 | −24.52 |
| $TiO_2 + ZrO_2$ | mol. % | 21.28 | 19.74 | 18.47 | 16.86 | 20.47 | 19.17 | 17.83 | 21.35 |
| $TiO_2 + Nb_2O_5$ | mol. % | 30.57 | 28.65 | 27.08 | 25.06 | 29.55 | 27.94 | 26.28 | 28.44 |
| $Nb_2O_5 - SiO_2$ | mol. % | 16.25 | 15.87 | 15.56 | 15.16 | 16.06 | 15.74 | 15.42 | 14.05 |
| Measured properties | | | | | | | | | |
| $d_{RT}$ | g/cm³ | 5.239 | | | | 5.377 | 5.318 | | 5.320 |
| $T_{liq}$ | ° C. | | | | | | 1032 | 1031 | 1096 |
| 15-min devit test (0/1) | | 1 | 1 | 1 | 1 | 1 | 1 | 1 | 1 |
| Predicted and calculated properties | | | | | | | | | |
| $P_{GF}$ | mol. % | 5.9428 | 5.1395 | 4.4806 | 3.6290 | 5.5119 | 4.8285 | 4.1352 | 4.4223 |
| $P_n$ [for $n_d$] | | 2.0492 | 2.0462 | 2.0435 | 2.0404 | 2.0479 | 2.0453 | 2.0426 | 2.0567 |
| $P_d$ [for $d_{RT}$] | g/cm³ | 5.1542 | 5.2139 | 5.262 | 5.3252 | 5.1864 | 5.2367 | 5.2883 | 5.3586 |
| $P_{Tg}$ [for $T_g$] | ° C. | 623.1 | 616.3 | 610.6 | 603.3 | 620.0 | 614.1 | 608.2 | 645.3 |
| $P_n - (1.483 + 0.104 * P_d)$ | | 0.0302 | 0.0209 | 0.0133 | 0.0036 | 0.0255 | 0.0177 | 0.0097 | 0.0164 |
| $P_n - (1.503 + 0.104 * P_d)$ | | 0.0102 | 9.200E−04 | −0.0067 | −0.0164 | 0.0055 | −0.0023 | −0.0103 | −0.0036 |
| $P_n - (1.47 + 0.0009 * P_{Tg})$ | | 0.0184 | 0.0215 | 0.0240 | 0.0274 | 0.0199 | 0.0226 | 0.0253 | 0.0059 |
| $P_n - (1.49 + 0.0009 * P_{Tg})$ | | −0.0016 | 0.0015 | 0.0040 | 0.0074 | −7.900E−05 | 0.0026 | 0.0053 | −0.0141 |

| | | Exemplary Glass | | | | | | | |
|---|---|---|---|---|---|---|---|---|---|
| | | 41 | 42 | 43 | 44 | 45 | 46 | 47 | 48 |
| Composition - mol. % | | | | | | | | | |
| $WO_3$ | mol. % | 18.83 | 18.19 | 17.95 | 17.19 | 16.77 | 16.30 | 15.80 | 15.29 |
| $B_2O_3$ | mol. % | 24.87 | 26.25 | 25.13 | 26.47 | 27.58 | 26.74 | 27.77 | 28.98 |
| $La_2O_3$ | mol. % | 17.99 | 18.87 | 16.48 | 17.04 | 17.99 | 15.53 | 16.14 | 17.07 |
| $Nb_2O_5$ | mol. % | 14.75 | 14.33 | 15.26 | 14.94 | 14.51 | 15.44 | 15.14 | 14.71 |
| $TiO_2$ | mol. % | 14.58 | 13.45 | 14.76 | 13.74 | 12.76 | 13.89 | 13.06 | 12.03 |
| $ZrO_2$ | mol. % | 7.00 | 7.00 | 6.99 | 7.00 | 6.99 | 7.00 | 6.99 | 6.99 |
| $Bi_2O_3$ | mol. % | 1.18 | 1.87 | 2.09 | 2.88 | 3.34 | 3.79 | 4.33 | 4.89 |
| $Y_2O_3$ | mol. % | 0.74 | 0 | 1.31 | 0.70 | 0 | 1.26 | 0.71 | 0 |
| $SiO_2$ | mol. % | 0.031 | 0.0313 | 0.031 | 0.0313 | 0.0316 | 0.0314 | 0.0316 | 0.0319 |
| $Ta_2O_5$ | mol. % | 0.0127 | 0.0128 | 0.0127 | 0.0128 | 0.0129 | 0.0128 | 0.0129 | 0.013 |
| Composition constraints | | | | | | | | | |
| $WO_3 + Bi_2O_3$ | mol. % | 20.02 | 20.06 | 20.03 | 20.07 | 20.11 | 20.09 | 20.13 | 20.18 |
| $RE_mO_n + ZrO_2 - Nb_2O_5$ | mol. % | 10.99 | 11.54 | 9.512 | 9.797 | 10.47 | 8.350 | 8.708 | 9.346 |
| $TiO_2 - Nb_2O_5$ | mol. % | −0.1697 | −0.8772 | −0.5046 | −1.204 | −1.757 | −1.552 | −2.076 | −2.683 |
| $SiO_2 - B_2O_3$ | mol. % | −24.84 | −26.22 | −25.10 | −26.44 | −27.55 | −26.70 | −27.74 | −28.95 |
| $TiO_2 + ZrO_2$ | mol. % | 21.58 | 20.45 | 21.75 | 20.73 | 19.75 | 20.89 | 20.06 | 19.02 |
| $TiO_2 + Nb_2O_5$ | mol. % | 29.33 | 27.78 | 30.02 | 28.68 | 27.27 | 29.33 | 28.20 | 26.74 |
| $Nb_2O_5 - SiO_2$ | mol. % | 14.72 | 14.30 | 15.23 | 14.91 | 14.48 | 15.41 | 15.11 | 14.68 |

TABLE 6-continued

Exemplary Glass Compositions

Measured properties

|  |  |  |  |  |  |  |  | 2.0786 |  |
|---|---|---|---|---|---|---|---|---|---|
| $n_d$ |  |  |  |  |  |  |  | 2.0786 |  |
| $d_{RT}$ | g/cm³ | 5.300 | 5.335 | 5.296 | 5.336 | 5.348 | 5.328 | 5.349 | 5.365 |
| $T_{liq}$ | °C. |  |  | 1075 |  |  | 1051 |  |  |
| $n_{531.9\ nm}$ |  |  |  |  |  |  |  | 2.0957 |  |
| $n_{632.8\ nm}$ |  |  |  |  |  |  |  | 2.0684 |  |
| 15-min devit test (0/1) |  | 1 | 1 | 1 | 1 | 1 | 1 | 1 | 1 |

Predicted and calculated properties

| | | | | | | | | | |
|---|---|---|---|---|---|---|---|---|---|
| $P_{GF}$ | mol. % | 3.8820 | 3.5872 | 3.7850 | 3.1539 | 2.9012 | 3.7850 | 3.2240 | 2.4332 |
| $P_n$ [for $n_d$] |  | 2.0611 | 2.0561 | 2.0643 | 2.0602 | 2.0557 | 2.0634 | 2.0598 | 2.0554 |
| $P_d$ [for $d_{RT}$] | g/cm³ | 5.3327 | 5.3675 | 5.3121 | 5.3412 | 5.3743 | 5.3217 | 5.3469 | 5.3817 |
| $P_{Tg}$ [for $T_g$] | °C. | 639.4 | 634.3 | 634.9 | 629.4 | 625.6 | 624.8 | 620.8 | 616.6 |
| $P_n - (1.483 + 0.104 * P_d)$ |  | 0.0235 | 0.0149 | 0.0288 | 0.0217 | 0.0138 | 0.0270 | 0.0208 | 0.0127 |
| $P_n - (1.503 + 0.104 * P_d)$ |  | 0.0035 | −0.0051 | 0.0088 | 0.0017 | −0.0062 | 0.0070 | 7.700E−04 | −0.0073 |
| $P_n - (1.47 + 0.0009 * P_{Tg})$ |  | 0.0156 | 0.0153 | 0.0228 | 0.0238 | 0.0227 | 0.0311 | 0.0311 | 0.0305 |
| $P_n - (1.49 + 0.0009 * P_{Tg})$ |  | −0.0044 | −0.0047 | 0.0028 | 0.0038 | 0.0027 | 0.0111 | 0.0111 | 0.0105 |

|  |  | Exemplary Glass | | | | | | | |
|---|---|---|---|---|---|---|---|---|---|
|  |  | 49 | 50 | 51 | 52 | 53 | 54 | 55 | 56 |

Composition - mol. %

| | | | | | | | | | |
|---|---|---|---|---|---|---|---|---|---|
| $WO_3$ | mol. % | 15.04 | 14.50 | 13.94 | 14.50 | 14.50 | 14.50 | 14.50 | 14.51 |
| $B_2O_3$ | mol. % | 27.22 | 28.31 | 29.43 | 28.31 | 27.75 | 27.77 | 27.33 | 27.27 |
| $La_2O_3$ | mol. % | 13.56 | 14.19 | 14.84 | 14.20 | 14.19 | 14.47 | 14.19 | 14.45 |
| $Nb_2O_5$ | mol. % | 16.09 | 15.77 | 15.45 | 15.78 | 15.77 | 15.91 | 15.78 | 15.90 |
| $TiO_2$ | mol. % | 14.01 | 13.15 | 12.24 | 13.12 | 13.13 | 13.27 | 13.12 | 13.26 |
| $ZrO_2$ | mol. % | 7.00 | 6.99 | 7.00 | 7.00 | 7.00 | 6.72 | 7.00 | 6.74 |
| $Bi_2O_3$ | mol. % | 5.08 | 5.66 | 6.26 | 5.67 | 6.23 | 5.86 | 6.65 | 6.37 |
| $Y_2O_3$ | mol. % | 1.95 | 1.38 | 0.80 | 1.38 | 1.38 | 1.46 | 1.38 | 1.46 |
| $SiO_2$ | mol. % | 0.0314 | 0.0317 | 0.0319 | 0.0317 | 0.032 | 0.032 | 0.0323 | 0.0323 |
| $Ta_2O_5$ | mol. % | 0.0171 | 0.0129 | 0.013 | 0.0129 | 0.0131 | 0.013 | 0.0132 | 0.0132 |

Composition constraints

| | | | | | | | | | |
|---|---|---|---|---|---|---|---|---|---|
| $WO_3 + Bi_2O_3$ | mol. % | 20.12 | 20.16 | 20.20 | 20.17 | 20.73 | 20.36 | 21.16 | 20.88 |
| $RE_mO_n + ZrO_2 - Nb_2O_5$ | mol. % | 6.419 | 6.796 | 7.195 | 6.797 | 6.803 | 6.738 | 6.789 | 6.751 |
| $TiO_2 - Nb_2O_5$ | mol. % | −2.078 | −2.627 | −3.208 | −2.652 | −2.638 | −2.644 | −2.652 | −2.642 |
| $SiO_2 - B_2O_3$ | mol. % | −27.19 | −28.28 | −29.40 | −28.28 | −27.72 | −27.74 | −27.30 | −27.24 |
| $TiO_2 + ZrO_2$ | mol. % | 21.01 | 20.14 | 19.24 | 20.12 | 20.13 | 19.98 | 20.12 | 19.99 |
| $TiO_2 + Nb_2O_5$ | mol. % | 30.10 | 28.92 | 27.68 | 28.90 | 28.90 | 29.18 | 28.90 | 29.16 |
| $Nb_2O5 - SiO_2$ | mol. % | 16.06 | 15.74 | 15.41 | 15.74 | 15.74 | 15.88 | 15.74 | 15.87 |

Measured properties

|  |  |  |  |  |  | 2.0956 |  |  |  |
|---|---|---|---|---|---|---|---|---|---|
| $n_d$ |  |  |  |  |  | 2.0956 |  |  |  |
| $d_{RT}$ | g/cm³ | 5.329 |  | 5.375 | 5.380 | 5.430 | 5.394 | 5.439 | 5.432 |
| $T_g$ | °C. |  |  |  |  | 607 |  |  |  |
| $T_x$ | °C. |  |  |  |  | 722 |  |  |  |
| $T_{liq}$ | °C. |  | 1049 |  | 1046 |  |  |  | 1055 |
| $n_{531.9\ nm}$ |  |  |  |  |  | 2.1136 |  |  |  |
| $n_{632.8\ nm}$ |  |  |  |  |  | 2.0849 |  |  |  |
| 15-min devit test (0/1) |  | 1 | 1 | 1 | 1 | 1 | 1 | 1 | 1 |

Predicted and calculated properties

| | | | | | | | | | |
|---|---|---|---|---|---|---|---|---|---|
| $P_{GF}$ | mol. % | 4.5916 | 3.9839 | 3.3718 | 3.9806 | 3.2301 | 3.3831 | 2.6764 | 2.7179 |
| $P_n$ [for $n_d$] |  | 2.0673 | 2.0637 | 2.0599 | 2.0637 | 2.072 | 2.0706 | 2.0783 | 2.0779 |
| $P_d$ [for $d_{RT}$] | g/cm³ | 5.2978 | 5.3247 | 5.3523 | 5.3253 | 5.3809 | 5.3669 | 5.4232 | 5.4166 |
| $P_{Tg}$ [for $T_g$] | °C. | 618.2 | 614.0 | 609.6 | 613.9 | 611.7 | 615.1 | 610.0 | 613.0 |
| $P_n - (1.483 + 0.104 * P_d)$ |  | 0.0334 | 0.0269 | 0.0202 | 0.0269 | 0.0294 | 0.0294 | 0.0312 | 0.0316 |
| $P_n - (1.503 + 0.104 * P_d)$ |  | 0.0134 | 0.0069 | 2.300E−04 | 0.0069 | 0.0094 | 0.0094 | 0.0112 | 0.0116 |
| $P_n - (1.47 + 0.0009 * P_{Tg})$ |  | 0.0409 | 0.0411 | 0.0412 | 0.0412 | 0.0514 | 0.0470 | 0.0592 | 0.0562 |
| $P_n - (1.49 + 0.0009 * P_{Tg})$ |  | 0.0209 | 0.0211 | 0.0212 | 0.0212 | 0.0314 | 0.0270 | 0.0392 | 0.0362 |

TABLE 6-continued

Exemplary Glass Compositions

| | | Exemplary Glass | | | | | | | |
|---|---|---|---|---|---|---|---|---|---|
| | | 57 | 58 | 59 | 60 | 61 | 62 | 63 | 64 |
| Composition - mol. % | | | | | | | | | |
| WO$_3$ | mol. % | 14.50 | 14.50 | 14.50 | 14.50 | 14.50 | 22.99 | 20.71 | 20.59 |
| B$_2$O$_3$ | mol. % | 27.32 | 26.89 | 26.86 | 26.86 | 26.90 | 23.00 | 24.05 | 23.25 |
| La$_2$O$_3$ | mol. % | 14.69 | 14.19 | 14.46 | 14.66 | 14.90 | 19.99 | 18.43 | 19.99 |
| Nb$_2$O$_5$ | mol. % | 16.01 | 15.77 | 15.90 | 16.00 | 16.13 | 13.45 | 14.08 | 14.14 |
| TiO$_2$ | mol. % | 13.38 | 13.14 | 13.27 | 13.37 | 13.48 | 13.54 | 13.41 | 14.45 |
| ZrO$_2$ | mol. % | 6.51 | 6.99 | 6.73 | 6.53 | 6.29 | 6.99 | 7.00 | 5.93 |
| Bi$_2$O$_3$ | mol. % | 6.01 | 7.08 | 6.78 | 6.52 | 6.16 | 0 | 1.91 | 0.80 |
| Y$_2$O$_3$ | mol. % | 1.52 | 1.38 | 1.46 | 1.52 | 1.60 | 0 | 0.37 | 0.80 |
| SiO$_2$ | mol. % | 0.0322 | 0.0326 | 0.0326 | 0.0326 | 0.0324 | 0.0316 | 0.0318 | 0.0318 |
| Ta$_2$O$_5$ | mol. % | 0.0131 | 0.0133 | 0.0133 | 0.0133 | 0.0132 | 0.0129 | 0.013 | 0.013 |
| Composition constraints | | | | | | | | | |
| WO$_3$ + Bi$_2$O$_3$ | mol. % | 20.51 | 21.58 | 21.28 | 21.02 | 20.67 | 22.99 | 22.61 | 21.39 |
| RE$_m$O$_n$ + ZrO$_2$ − Nb$_2$O$_5$ | mol. % | 6.705 | 6.789 | 6.740 | 6.701 | 6.652 | 13.53 | 11.72 | 12.59 |
| TiO$_2$ − Nb$_2$O$_5$ | mol. % | −2.631 | −2.633 | −2.630 | −2.635 | −2.650 | 0.08399 | −0.6659 | 0.3157 |
| SiO$_2$ − B$_2$O$_3$ | mol. % | −27.29 | −26.86 | −26.82 | −26.83 | −26.87 | −22.97 | −24.02 | −23.22 |
| TiO$_2$ + ZrO$_2$ | mol. % | 19.89 | 20.13 | 20.00 | 19.89 | 19.77 | 20.53 | 20.42 | 20.38 |
| TiO$_2$ + Nb$_2$O$_5$ | mol. % | 29.40 | 28.91 | 29.17 | 29.37 | 29.61 | 26.99 | 27.49 | 28.59 |
| Nb$_2$O$_5$ − SiO$_2$ | mol. % | 15.98 | 15.74 | 15.87 | 15.97 | 16.10 | 13.42 | 14.05 | 14.10 |
| Measured properties | | | | | | | | | |
| n$_d$ | | | | | 2.1036 | | | 2.0727 | |
| d$_{RT}$ | g/cm$^3$ | 5.415 | 5.461 | 5.451 | 5.430 | 5.401 | 5.419 | 5.435 | 5.397 |
| T$_g$ | ° C. | | | | 607 | | | | |
| T$_x$ | ° C. | | | | 719 | | | | |
| T$_{liq}$ | ° C. | | 1060 | | | | | | |
| n$_{531.9\,nm}$ | | | | | 2.1217 | | | 2.0880 | |
| n$_{632.8\,nm}$ | | | | | 2.0929 | | | 2.0635 | |
| 15-min devit test (0/1) | | 1 | 1 | 1 | 1 | 1 | 1 | 1 | 1 |
| Predicted and calculated properties | | | | | | | | | |
| P$_{GF}$ | mol. % | 2.9155 | 2.0997 | 2.1745 | 2.2741 | 2.4546 | 7.0938 | 5.1943 | 3.4804 |
| P$_n$ [for n$_d$] | | 2.076 | 2.0847 | 2.084 | 2.083 | 2.0813 | 2.0655 | 2.0706 | 2.0745 |
| P$_d$ [for d$_{RT}$] | g/cm$^3$ | 5.3995 | 5.4658 | 5.4573 | 5.4475 | 5.4321 | 5.4705 | 5.4695 | 5.4808 |
| P$_{Tg}$ [for T$_g$] | ° C. | 616.0 | 608.4 | 611.4 | 613.8 | 616.9 | 638.5 | 630.4 | 645.0 |
| P$_n$ − (1.483 + 0.104 * P$_d$) | | 0.0314 | 0.0332 | 0.0335 | 0.0335 | 0.0334 | 0.0135 | 0.0188 | 0.0215 |
| P$_n$ − (1.503 + 0.104 * P$_d$) | | 0.0114 | 0.0132 | 0.0135 | 0.0135 | 0.0134 | −0.0065 | −0.0012 | 0.0015 |
| P$_n$ − (1.47 + 0.0009 * P$_{Tg}$) | | 0.0516 | 0.0671 | 0.0638 | 0.0606 | 0.0561 | 0.0208 | 0.0332 | 0.0241 |
| P$_n$ − (1.49 + 0.0009 * P$_{Tg}$) | | 0.0316 | 0.0471 | 0.0438 | 0.0406 | 0.0361 | 7.800E−04 | 0.0132 | 0.0041 |

| | | Exemplary Glass | | | | | | | |
|---|---|---|---|---|---|---|---|---|---|
| | | 65 | 66 | 67 | 68 | 69 | 70 | 71 | 72 |
| Composition - mol. % | | | | | | | | | |
| WO$_3$ | mol. % | 18.94 | 18.56 | 18.72 | 17.10 | 14.50 | 19.01 | 16.25 | 14.15 |
| B$_2$O$_3$ | mol. % | 24.85 | 24.23 | 23.46 | 25.71 | 26.89 | 26.25 | 27.07 | 27.69 |
| La$_2$O$_3$ | mol. % | 17.23 | 18.52 | 19.99 | 15.97 | 14.20 | 19.99 | 19.99 | 19.99 |
| Nb$_2$O$_5$ | mol. % | 14.56 | 14.69 | 14.66 | 15.06 | 15.77 | 11.53 | 12.64 | 13.48 |
| TiO$_2$ | mol. % | 13.34 | 14.30 | 15.18 | 13.26 | 13.14 | 11.19 | 12.29 | 13.13 |
| ZrO$_2$ | mol. % | 7.00 | 5.99 | 5.10 | 7.00 | 6.99 | 7.00 | 6.72 | 6.52 |
| Bi$_2$O$_3$ | mol. % | 3.38 | 2.56 | 1.42 | 4.91 | 7.08 | 5.00 | 5.00 | 5.00 |
| Y$_2$O$_3$ | mol. % | 0.66 | 1.11 | 1.42 | 0.95 | 1.38 | 0 | 0 | 0 |
| SiO$_2$ | mol. % | 0.0321 | 0.0321 | 0.032 | 0.0323 | 0.0326 | 0.0331 | 0.0327 | 0.0324 |
| Ta$_2$O$_5$ | mol. % | 0.0131 | 0.0131 | 0.0131 | 0.0132 | 0.0133 | 0.009 | 0.0134 | 0.0132 |
| Composition constraints | | | | | | | | | |
| WO$_3$ + Bi$_2$O$_3$ | mol. % | 22.32 | 21.12 | 20.14 | 22.01 | 21.58 | 24.01 | 21.25 | 19.15 |
| RE$_m$O$_n$ + ZrO$_2$ − Nb$_2$O$_5$ | mol. % | 10.33 | 10.93 | 11.85 | 8.868 | 6.795 | 15.45 | 14.07 | 13.03 |
| TiO$_2$ − Nb$_2$O$_5$ | mol. % | −1.223 | −0.3891 | 0.5188 | −1.803 | −2.633 | −0.3436 | −0.3515 | −0.3499 |
| SiO$_2$ − B$_2$O$_3$ | mol. % | −24.82 | −24.20 | −23.43 | −25.68 | −26.86 | −26.21 | −27.04 | −27.66 |
| TiO$_2$ + ZrO$_2$ | mol. % | 20.34 | 20.29 | 20.28 | 20.26 | 20.13 | 18.18 | 19.01 | 19.65 |
| TiO$_2$ + Nb$_2$O$_5$ | mol. % | 27.90 | 28.99 | 29.84 | 28.31 | 28.91 | 22.72 | 24.93 | 26.61 |
| Nb$_2$O$_5$ − SiO$_2$ | mol. % | 14.53 | 14.66 | 14.63 | 15.03 | 15.74 | 11.50 | 12.61 | 13.45 |

TABLE 6-continued

Exemplary Glass Compositions

Measured properties

| | | | | | | | | | |
|---|---|---|---|---|---|---|---|---|---|
| $n_d$ | | 2.0801 | | | | | | | |
| $d_{RT}$ | g/cm³ | 5.444 | 5.440 | | 5.461 | 5.485 | | | |
| $T_g$ | °C. | | | | | 603 | | | |
| $T_x$ | °C. | | | | | 724 | | | |
| $T_{liq}$ | °C. | | | | 1057 | 1049 | | | |
| $n_{531.9\,nm}$ | | 2.0959 | | | | | | | |
| $n_{632.8\,nm}$ | | 2.0707 | | | | | | | |
| 15-min devit test (0/1) | | 1 | 1 | 1 | 1 | 1 | 1 | 1 | 1 |
| LR($T_g$, $T_{liq}$) | | | | | | −0.17889 | | | |

Predicted and calculated properties

| | | | | | | | | | |
|---|---|---|---|---|---|---|---|---|---|
| $P_{GF}$ | mol. % | 3.6871 | 1.8553 | 0.64619 | 2.1471 | 2.0978 | −0.37497 | −2.7140 | −2.2658 |
| $P_n$ [for $n_d$] | | 2.0746 | 2.0789 | 2.0815 | 2.0787 | 2.0847 | 2.0764 | 2.0741 | 2.0724 |
| $P_d$ [for $d_{RT}$] | g/cm³ | 5.4686 | 5.4788 | 5.4876 | 5.4669 | 5.4658 | 5.695 | 5.6028 | 5.5325 |
| $P_{Tg}$ [for $T_g$] | °C. | 624.2 | 636.9 | 649.9 | 617.6 | 608.5 | 615.5 | 623.3 | 629.2 |
| $P_n$ − (1.483 + 0.104 * $P_d$) | | 0.0229 | 0.0261 | 0.0278 | 0.0271 | 0.0332 | 0.0011 | 0.0085 | 0.0140 |
| $P_n$ − (1.503 + 0.104 * $P_d$) | | 0.0029 | 0.0061 | 0.0078 | 0.0071 | 0.0132 | −0.0189 | −0.0116 | −0.0060 |
| $P_n$ − (1.47 + 0.0009 * $P_{Tg}$) | | 0.0429 | 0.0356 | 0.0265 | 0.0528 | 0.0671 | 0.0525 | 0.0432 | 0.0361 |
| $P_n$ − (1.49 + 0.0009 * $P_{Tg}$) | | 0.0229 | 0.0156 | 0.0066 | 0.0328 | 0.0471 | 0.0325 | 0.0232 | 0.0161 |

| | | Exemplary Glass | | | | | | | |
|---|---|---|---|---|---|---|---|---|---|
| | | 73 | 74 | 75 | 76 | 77 | 78 | 79 | 80 |

Composition - mol. %

| | | | | | | | | | |
|---|---|---|---|---|---|---|---|---|---|
| $WO_3$ | mol. % | 22.99 | 20.74 | 22.99 | 18.98 | 20.89 | 22.99 | 17.14 | 19.21 |
| $B_2O_3$ | mol. % | 23.00 | 24.02 | 23.34 | 24.84 | 24.29 | 23.62 | 25.68 | 25.09 |
| $La_2O_3$ | mol. % | 19.99 | 18.46 | 18.37 | 17.26 | 17.02 | 17.15 | 15.99 | 15.83 |
| $Nb_2O_5$ | mol. % | 13.45 | 14.06 | 13.38 | 14.55 | 13.96 | 13.33 | 15.05 | 14.42 |
| $TiO_2$ | mol. % | 13.54 | 13.44 | 12.49 | 13.33 | 12.44 | 11.70 | 13.26 | 12.33 |
| $ZrO_2$ | mol. % | 6.99 | 7.00 | 7.84 | 7.00 | 7.80 | 8.47 | 7.00 | 7.82 |
| $Bi_2O_3$ | mol. % | 0 | 1.87 | 1.26 | 3.34 | 2.94 | 2.21 | 4.88 | 4.38 |
| $Y_2O_3$ | mol. % | 0 | 0.36 | 0.28 | 0.65 | 0.61 | 0.49 | 0.95 | 0.88 |
| $SiO_2$ | mol. % | 0.0316 | 0.0318 | 0.0318 | 0.0321 | 0.0321 | 0.032 | 0.0323 | 0.0323 |
| $Ta_2O_5$ | mol. % | 0.0129 | 0.013 | 0.013 | 0.0131 | 0.0131 | 0.0131 | 0.0132 | 0.0132 |

Composition constraints

| | | | | | | | | | |
|---|---|---|---|---|---|---|---|---|---|
| $WO_3$ + $Bi_2O_3$ | mol. % | 22.99 | 22.61 | 24.25 | 22.32 | 23.84 | 25.20 | 22.02 | 23.58 |
| $RE_mO_n$ + $ZrO_2$ − $Nb_2O_5$ | mol. % | 13.53 | 11.76 | 13.10 | 10.36 | 11.47 | 12.79 | 8.899 | 10.11 |
| $TiO_2$ − $Nb_2O_5$ | mol. % | 0.08399 | −0.6275 | −0.8845 | −1.216 | −1.514 | −1.626 | −1.795 | −2.090 |
| $SiO_2$ − $B_2O_3$ | mol. % | −22.97 | −23.99 | −23.31 | −24.81 | −24.26 | −23.58 | −25.65 | −25.06 |
| $TiO_2$ + $ZiO_2$ | mol. % | 20.53 | 20.44 | 20.33 | 20.34 | 20.24 | 20.17 | 20.26 | 20.15 |
| $TiO_2$ + $Nb_2O_5$ | mol. % | 26.99 | 27.50 | 25.87 | 27.88 | 26.40 | 25.03 | 28.31 | 26.75 |
| $Nb_2O_5$ − $SiO_2$ | mol. % | 13.42 | 14.03 | 13.35 | 14.52 | 13.92 | 13.29 | 15.02 | 14.39 |

Measured properties

| | | | | | | | | | |
|---|---|---|---|---|---|---|---|---|---|
| $n_d$ | | | | | | | 2.0713 | | 2.0873 |
| $d_{RT}$ | g/cm³ | 5.486 | | | | | 5.492 | 5.477 | 5.506 |
| $T_{liq}$ | °C. | | | | | | | 1068 | |
| $n_{531.9\,nm}$ | | | | | | | 2.0868 | | 2.1037 |
| $n_{632.8\,nm}$ | | | | | | | 2.0620 | | 2.0775 |
| 15-min devit test (0/1) | | 1 | 1 | 1 | 1 | 1 | 1 | 1 | 1 |

Predicted and calculated properties

| | | | | | | | | | |
|---|---|---|---|---|---|---|---|---|---|
| $P_{GF}$ | mol. % | 7.0938 | 5.1881 | 7.8427 | 3.7449 | 6.0491 | 8.4178 | 2.1802 | 4.6729 |
| $P_n$ [for $n_d$] | | 2.0655 | 2.0706 | 2.0671 | 2.0744 | 2.0718 | 2.0683 | 2.0787 | 2.0755 |
| $P_d$ [for $d_{RT}$] | g/cm³ | 5.4705 | 5.4694 | 5.4967 | 5.4682 | 5.4941 | 5.516 | 5.4672 | 5.493 |
| $P_{Tg}$ [for $T_g$] | °C. | 638.5 | 630.6 | 626.9 | 624.3 | 620.1 | 618.1 | 617.8 | 613.8 |
| $P_n$ − (1.483 + 0.104 * $P_d$) | | 0.0135 | 0.0188 | 0.0125 | 0.0227 | 0.0174 | 0.0116 | 0.0271 | 0.0212 |
| $P_n$ − (1.503 + 0.104 * $P_d$) | | −0.0065 | −0.0012 | −0.0075 | 0.0028 | −0.0026 | −0.0084 | 0.0071 | 0.0012 |
| $P_n$ − (1.47 + 0.0009 * $P_{Tg}$) | | 0.0208 | 0.0331 | 0.0329 | 0.0426 | 0.0437 | 0.0420 | 0.0526 | 0.0531 |
| $P_n$ − (1.49 + 0.0009 * $P_{Tg}$) | | 7.800E−04 | 0.0131 | 0.0129 | 0.0226 | 0.0237 | 0.0220 | 0.0326 | 0.0331 |

TABLE 6-continued

Exemplary Glass Compositions

| | | Exemplary Glass | | | | | | | |
|---|---|---|---|---|---|---|---|---|---|
| | | 81 | 82 | 83 | 84 | 85 | 86 | 87 | 88 |
| Composition - mol. % | | | | | | | | | |
| WO$_3$ | mol. % | 20.89 | 22.99 | 17.08 | 18.91 | 17.08 | 17.60 | 16.43 | 17.99 |
| B$_2$O$_3$ | mol. % | 24.57 | 23.91 | 26.10 | 25.54 | 24.93 | 24.82 | 25.31 | 24.75 |
| La$_2$O$_3$ | mol. % | 15.81 | 15.90 | 14.20 | 14.19 | 16.26 | 16.06 | 15.47 | 15.92 |
| Nb$_2$O$_5$ | mol. % | 13.91 | 13.27 | 14.99 | 14.44 | 15.18 | 14.98 | 15.30 | 14.85 |
| TiO$_2$ | mol. % | 11.67 | 10.89 | 12.12 | 11.40 | 12.33 | 12.40 | 12.11 | 12.44 |
| ZrO$_2$ | mol. % | 8.41 | 9.12 | 7.90 | 8.56 | 7.99 | 8.05 | 8.07 | 8.09 |
| Bi$_2$O$_3$ | mol. % | 3.89 | 3.17 | 6.30 | 5.74 | 5.22 | 4.98 | 6.20 | 4.80 |
| Y$_2$O$_3$ | mol. % | 0.82 | 0.70 | 1.27 | 1.19 | 0.97 | 1.05 | 1.05 | 1.11 |
| SiO$_2$ | mol. % | 0.0322 | 0.0322 | 0.0326 | 0.0325 | 0.0327 | 0.0326 | 0.0329 | 0.0325 |
| Ta$_2$O$_5$ | mol. % | 0.0132 | 0.0131 | 0.0133 | 0.0133 | 0.0134 | 0.0133 | 0.0134 | 0.0133 |
| Composition constraints | | | | | | | | | |
| WO$_3$ + Bi$_2$O$_3$ | mol. % | 24.78 | 26.16 | 23.38 | 24.64 | 22.29 | 22.58 | 22.63 | 22.79 |
| RE$_m$O$_n$ + ZrO$_2$ − Nb$_2$O$_5$ | mol. % | 11.13 | 12.45 | 8.370 | 9.505 | 10.04 | 10.18 | 9.301 | 10.27 |
| TiO$_2$ − Nb$_2$O$_5$ | mol. % | −2.240 | −2.376 | −2.875 | −3.038 | −2.853 | −2.586 | −3.191 | −2.417 |
| SiO$_2$ − B$_2$O$_3$ | mol. % | −24.54 | −23.88 | −26.06 | −25.50 | −24.90 | −24.79 | −25.28 | −24.72 |
| TiO$_2$ + ZrO$_2$ | mol. % | 20.08 | 20.01 | 20.02 | 19.96 | 20.32 | 20.45 | 20.18 | 20.53 |
| TiO$_2$ + Nb$_2$O$_5$ | mol. % | 25.57 | 24.16 | 27.11 | 25.83 | 27.51 | 27.38 | 27.41 | 27.29 |
| Nb$_2$O$_5$ − SiO$_2$ | mol. % | 13.87 | 13.24 | 14.96 | 14.40 | 15.15 | 14.95 | 15.27 | 14.82 |
| Measured properties | | | | | | | | | |
| n$_d$ | | | | 2.0963 | | | 2.0942 | | |
| d$_{RT}$ | g/cm$^3$ | | 5.529 | 5.509 | 5.499 | 5.529 | 5.494 | 5.546 | 5.424 |
| T$_g$ | °C. | | | | | | 614 | | 613 |
| T$_x$ | °C. | | | | | | | | 736 |
| T$_{liq}$ | °C. | | | | | 1112 | | | |
| n$_{531.9\ nm}$ | | | | 2.1132 | | | 2.1108 | | |
| n$_{632.8\ nm}$ | | | | 2.0862 | | | 2.0843 | | |
| 15-min devit test (0/1) | | 1 | 1 | 1 | 1 | 1 | 1 | 1 | 1 |
| Predicted and calculated properties | | | | | | | | | |
| P$_{GF}$ | mol. % | 6.6147 | 9.0156 | 2.9607 | 5.0770 | 1.8096 | 2.3589 | 1.3085 | 2.7912 |
| P$_n$ [for n$_d$] | | 2.0729 | 2.0693 | 2.0806 | 2.0776 | 2.0858 | 2.0839 | 2.0888 | 2.0825 |
| P$_d$ [for d$_{RT}$] | g/cm$^3$ | 5.513 | 5.5345 | 5.4953 | 5.5157 | 5.5386 | 5.5271 | 5.5534 | 5.5188 |
| P$_{Tg}$ [for T$_g$] | °C. | 611.4 | 609.2 | 604.9 | 602.5 | 617.5 | 617.1 | 611.5 | 616.8 |
| P$_n$ − (1.483 + 0.104 * P$_d$) | | 0.0166 | 0.0107 | 0.0261 | 0.0209 | 0.0268 | 0.0261 | 0.0283 | 0.0255 |
| P$_n$ − (1.503 + 0.104 * P$_d$) | | −0.0035 | −0.0093 | 0.0061 | 9.400E−04 | 0.0068 | 0.0061 | 0.0083 | 0.0056 |
| P$_n$ − (1.47 + 0.0009 * P$_{Tg}$) | | 0.0527 | 0.0511 | 0.0661 | 0.0653 | 0.0601 | 0.0585 | 0.0685 | 0.0574 |
| P$_n$ − (1.49 + 0.0009 * P$_{Tg}$) | | 0.0327 | 0.0311 | 0.0461 | 0.0453 | 0.0401 | 0.0385 | 0.0485 | 0.0374 |

| | | Exemplary Glass | | | | | | | |
|---|---|---|---|---|---|---|---|---|---|
| | | 89 | 90 | 91 | 92 | 93 | 94 | 95 | 96 |
| Composition - mol. % | | | | | | | | | |
| WO$_3$ | mol. % | 16.99 | 15.93 | 18.36 | 17.38 | 16.53 | 15.43 | 17.78 | 16.92 |
| B$_2$O$_3$ | mol. % | 25.17 | 25.60 | 24.68 | 25.10 | 25.45 | 25.90 | 25.05 | 25.41 |
| La$_2$O$_3$ | mol. % | 15.36 | 14.87 | 15.79 | 15.23 | 14.79 | 14.24 | 15.01 | 14.55 |
| Nb$_2$O$_5$ | mol. % | 15.11 | 15.39 | 14.72 | 14.97 | 15.19 | 15.48 | 14.82 | 15.04 |
| TiO$_2$ | mol. % | 12.20 | 11.96 | 12.47 | 12.24 | 12.06 | 11.80 | 12.28 | 12.07 |
| ZrO$_2$ | mol. % | 8.12 | 8.13 | 8.15 | 8.16 | 8.17 | 8.18 | 8.21 | 8.23 |
| Bi$_2$O$_3$ | mol. % | 5.89 | 6.96 | 4.63 | 5.71 | 6.59 | 7.73 | 5.57 | 6.48 |
| Y$_2$O$_3$ | mol. % | 1.12 | 1.12 | 1.16 | 1.17 | 1.17 | 1.18 | 1.24 | 1.25 |
| SiO$_2$ | mol. % | 0.0328 | 0.0331 | 0.0324 | 0.0327 | 0.0329 | 0.0332 | 0.0326 | 0.0328 |
| Ta$_2$O$_5$ | mol. % | 0.0134 | 0.0135 | 0.0132 | 0.0133 | 0.0134 | 0.0136 | 0.0133 | 0.0134 |
| Composition constraints | | | | | | | | | |
| WO$_3$ + Bi$_2$O$_3$ | mol. % | 22.88 | 22.89 | 23.00 | 23.08 | 23.12 | 23.17 | 23.35 | 23.40 |
| RE$_m$O$_n$ + ZrO$_2$ − Nb$_2$O$_5$ | mol. % | 9.487 | 8.721 | 10.37 | 9.588 | 8.936 | 8.121 | 9.641 | 8.988 |
| TiO$_2$ − Nb$_2$O$_5$ | mol. % | −2.903 | −3.426 | −2.242 | −2.732 | −3.135 | −3.684 | −2.546 | −2.966 |
| SiO$_2$ − B$_2$O$_3$ | mol. % | −25.14 | −25.57 | −24.65 | −25.07 | −25.42 | −25.87 | −25.01 | −25.38 |
| TiO$_2$ + ZrO$_2$ | mol. % | 20.32 | 20.09 | 20.62 | 20.40 | 20.23 | 19.98 | 20.49 | 20.30 |
| TiO$_2$ + Nb$_2$O$_5$ | mol. % | 27.31 | 27.36 | 27.19 | 27.21 | 27.25 | 27.28 | 27.10 | 27.11 |
| Nb$_2$O$_5$ − SiO$_2$ | mol. % | 15.07 | 15.36 | 14.68 | 14.94 | 15.16 | 15.45 | 14.79 | 15.01 |

TABLE 6-continued

Exemplary Glass Compositions

Measured properties

|  |  |  |  |  |  |  |  |  |
|---|---|---|---|---|---|---|---|---|
| $n_d$ |  |  |  |  | 2.1033 |  |  |  |
| $d_{RT}$ | g/cm³ | 5.559 | 5.442 |  | 5.545 | 5.594 | 5.472 | 5.519 |
| $T_{liq}$ | ° C. | 1111 |  |  |  |  |  | 1096 |
| $n_{531.9\ nm}$ |  |  |  |  | 2.1206 |  |  |  |
| $n_{632.8\ nm}$ |  |  |  |  | 2.0931 |  |  |  |
| 15-min devit test (0/1) |  | 1 | 1 | 1 | 1 | 1 | 1 | 1 | 1 |

Predicted and calculated properties

|  |  |  |  |  |  |  |  |  |  |
|---|---|---|---|---|---|---|---|---|---|
| $P_{GF}$ | mol. % | 1.8824 | 0.99748 | 3.1975 | 2.3024 | 1.5281 | 0.98095 | 2.7604 | 1.9731 |
| $P_n$ [for $n_d$] |  | 2.0868 | 2.0912 | 2.0811 | 2.0854 | 2.0889 | 2.0936 | 2.0839 | 2.0875 |
| $P_d$ [for $d_{RT}$] | g/cm³ | 5.5412 | 5.5642 | 5.5105 | 5.5329 | 5.5509 | 5.5756 | 5.5238 | 5.5427 |
| $P_{Tg}$ [for $T_g$] | ° C. | 611.6 | 606.9 | 616.5 | 611.4 | 607.2 | 602.0 | 610.6 | 606.3 |
| $P_n - (1.483 + 0.104 * P_d)$ |  | 0.0275 | 0.0295 | 0.0250 | 0.0270 | 0.0286 | 0.0307 | 0.0264 | 0.0281 |
| $P_n - (1.503 + 0.104 * P_d)$ |  | 0.0075 | 0.0095 | 0.0050 | 0.0070 | 0.0086 | 0.0107 | 0.0064 | 0.0081 |
| $P_n - (1.47 + 0.0009 * P_{Tg})$ |  | 0.0664 | 0.0750 | 0.0562 | 0.0651 | 0.0724 | 0.0818 | 0.0644 | 0.0718 |
| $P_n - (1.49 + 0.0009 * P_{Tg})$ |  | 0.0464 | 0.0550 | 0.0362 | 0.0451 | 0.0524 | 0.0618 | 0.0444 | 0.0518 |

Exemplary Glass

|  |  | 97 | 98 | 99 | 100 | 101 | 102 | 103 | 104 |
|---|---|---|---|---|---|---|---|---|---|

Composition - mol. %

|  |  | 97 | 98 | 99 | 100 | 101 | 102 | 103 | 104 |
|---|---|---|---|---|---|---|---|---|---|
| $WO_3$ | mol. % | 16.02 | 16.89 | 16.64 | 16.78 | 16.45 | 16.55 | 16.70 | 16.26 |
| $B_2O_3$ | mol. % | 25.78 | 25.33 | 25.29 | 24.86 | 25.26 | 24.85 | 24.47 | 25.23 |
| $La_2O_3$ | mol. % | 14.07 | 14.54 | 14.64 | 14.66 | 14.72 | 14.75 | 14.77 | 14.79 |
| $Nb_2O_5$ | mol. % | 15.28 | 15.04 | 15.14 | 15.09 | 15.22 | 15.17 | 15.12 | 15.29 |
| $TiO_2$ | mol. % | 11.87 | 12.10 | 12.06 | 12.15 | 12.01 | 12.10 | 12.18 | 11.99 |
| $ZrO_2$ | mol. % | 8.24 | 8.29 | 8.30 | 8.30 | 8.30 | 8.30 | 8.30 | 8.29 |
| $Bi_2O_3$ | mol. % | 7.44 | 6.50 | 6.64 | 6.86 | 6.75 | 6.97 | 7.13 | 6.85 |
| $Y_2O_3$ | mol. % | 1.26 | 1.25 | 1.25 | 1.26 | 1.25 | 1.26 | 1.28 | 1.25 |
| $SiO_2$ | mol. % | 0.0331 | 0.0328 | 0.0329 | 0.0331 | 0.033 | 0.0332 | 0.0333 | 0.0331 |
| $Ta_2O_5$ | mol. % | 0.0135 | 0.0134 | 0.0134 | 0.0135 | 0.0135 | 0.0135 | 0.0136 | 0.0135 |

Composition constraints

|  |  | 97 | 98 | 99 | 100 | 101 | 102 | 103 | 104 |
|---|---|---|---|---|---|---|---|---|---|
| $WO_3 + Bi_2O_3$ | mol. % | 23.45 | 23.39 | 23.27 | 23.64 | 23.19 | 23.52 | 23.83 | 23.11 |
| $RE_mO_n + ZrO_2 - Nb_2O_5$ | mol. % | 8.293 | 9.043 | 9.054 | 9.135 | 9.048 | 9.141 | 9.229 | 9.041 |
| $TiO_2 - Nb_2O_5$ | mol. % | -3.408 | -2.942 | -3.077 | -2.934 | -3.203 | -3.068 | -2.936 | -3.298 |
| $SiO_2 - B_2O_3$ | mol. % | -25.75 | -25.30 | -25.26 | -24.82 | -25.23 | -24.82 | -24.44 | -25.20 |
| $TiO_2 + ZrO_2$ | mol. % | 20.11 | 20.39 | 20.36 | 20.45 | 20.32 | 20.40 | 20.48 | 20.28 |
| $TiO_2 + Nb_2O_5$ | mol. % | 27.15 | 27.15 | 27.20 | 27.24 | 27.23 | 27.27 | 27.30 | 27.28 |
| $Nb_2O_5 - SiO_2$ | mol. % | 15.25 | 15.01 | 15.10 | 15.05 | 15.18 | 15.14 | 15.08 | 15.26 |

Measured properties

|  |  | 97 | 98 | 99 | 100 | 101 | 102 | 103 | 104 |
|---|---|---|---|---|---|---|---|---|---|
| $n_d$ |  | 2.1057 |  |  |  |  |  |  |  |
| $d_{RT}$ | g/cm³ | 5.549 | 5.523 | 5.540 | 5.563 | 5.562 | 5.590 | 5.603 | 5.569 |
| $T_{liq}$ | ° C. |  | 1108 |  |  | 1110 |  | 1118 |  |
| $n_{531.9\ nm}$ |  | 2.1233 |  |  |  |  |  |  |  |
| $n_{632.8\ nm}$ |  | 2.0953 |  |  |  |  |  |  |  |
| 15-min devit test (0/1) |  | 1 | 1 | 1 | 1 | 1 | 1 | 1 | 1 |

Predicted and calculated properties

|  |  | 97 | 98 | 99 | 100 | 101 | 102 | 103 | 104 |
|---|---|---|---|---|---|---|---|---|---|
| $P_{GF}$ | mol. % | 1.1444 | 1.8497 | 1.4808 | 1.0860 | 1.2248 | 0.78885 | 0.48057 | 0.94707 |
| $P_n$ [for $n_d$] |  | 2.0914 | 2.0881 | 2.0899 | 2.0947 | 2.0913 | 2.096 | 2.100 | 2.0926 |
| $P_d$ [for $d_{RT}$] | g/cm³ | 5.5625 | 5.5451 | 5.5563 | 5.5873 | 5.5651 | 5.5954 | 5.6212 | 5.5736 |
| $P_{Tg}$ [for $T_g$] | ° C. | 601.8 | 606.4 | 606.7 | 605.9 | 607.0 | 606.3 | 605.6 | 607.2 |
| $P_n - (1.483 + 0.104 * P_d)$ |  | 0.0299 | 0.0284 | 0.0291 | 0.0306 | 0.0295 | 0.0310 | 0.0323 | 0.0300 |
| $P_n - (1.503 + 0.104 * P_d)$ |  | 0.0099 | 0.0084 | 0.0091 | 0.0106 | 0.0095 | 0.0110 | 0.0123 | 0.0100 |
| $P_n - (1.47 + 0.0009 * P_{Tg})$ |  | 0.0797 | 0.0724 | 0.0739 | 0.0794 | 0.0750 | 0.0803 | 0.0849 | 0.0761 |
| $P_n - (1.49 + 0.0009 * P_{Tg})$ |  | 0.0597 | 0.0524 | 0.0539 | 0.0594 | 0.0550 | 0.0603 | 0.0649 | 0.0561 |

TABLE 6-continued

Exemplary Glass Compositions

| | | Exemplary Glass | | | | | | | |
|---|---|---|---|---|---|---|---|---|---|
| | | 105 | 106 | 107 | 108 | 109 | 110 | 111 | 112 |
| Composition - mol. % | | | | | | | | | |
| WO$_3$ | mol. % | 16.36 | 16.46 | 16.61 | 15.99 | 37.24 | 35.95 | 36.61 | 30.20 |
| B$_2$O$_3$ | mol. % | 24.82 | 24.49 | 24.11 | 25.19 | 25.86 | 24.86 | 25.08 | 28.30 |
| La$_2$O$_3$ | mol. % | 14.82 | 14.84 | 14.86 | 14.89 | 17.99 | 17.99 | 15.99 | 15.99 |
| Nb$_2$O$_5$ | mol. % | 15.24 | 15.21 | 15.15 | 15.39 | 10.54 | 7.12 | 7.64 | 13.09 |
| TiO$_2$ | mol. % | 12.08 | 12.15 | 12.24 | 11.95 | 1.33 | 7.04 | 7.64 | 5.37 |
| ZrO$_2$ | mol. % | 8.30 | 8.30 | 8.29 | 8.30 | 6.99 | 7.00 | 7.00 | 7.00 |
| Bi$_2$O$_3$ | mol. % | 7.07 | 7.23 | 7.41 | 7.00 | 0 | 0 | 0 | 0 |
| Y$_2$O$_3$ | mol. % | 1.27 | 1.27 | 1.29 | 1.25 | 0 | 0 | 0 | 0 |
| SiO$_2$ | mol. % | 0.0333 | 0.0334 | 0.0335 | 0.0332 | 0.0334 | 0.032 | 0.0316 | 0.0316 |
| Ta$_2$O$_5$ | mol. % | 0.0136 | 0.0136 | 0.0137 | 0.0135 | 0.0091 | 0.0087 | 0.0086 | 0.0129 |
| Composition constraints | | | | | | | | | |
| WO$_3$ + Bi$_2$O$_3$ | mol. % | 23.43 | 23.69 | 24.02 | 22.98 | 37.24 | 35.95 | 36.61 | 30.20 |
| RE$_m$O$_n$ + ZrO$_2$ − Nb$_2$O$_5$ | mol. % | 9.143 | 9.210 | 9.292 | 9.046 | 14.44 | 17.87 | 15.36 | 9.905 |
| TiO$_2$ − Nb$_2$O$_5$ | mol. % | −3.162 | −3.052 | −2.912 | −3.442 | −9.211 | −0.08201 | 3.622E−03 | −7.726 |
| SiO$_2$ − B$_2$O$_3$ | mol. % | −24.79 | −24.46 | −24.08 | −25.16 | −25.83 | −24.83 | −25.04 | −28.27 |
| TiO$_2$ + ZiO$_2$ | mol. % | 20.38 | 20.46 | 20.53 | 20.25 | 8.321 | 14.04 | 14.64 | 12.37 |
| TiO$_2$ + Nb$_2$O$_5$ | mol. % | 27.32 | 27.36 | 27.38 | 27.34 | 11.87 | 14.16 | 15.28 | 18.46 |
| Nb$_2$O$_5$ − SiO$_2$ | mol. % | 15.21 | 15.17 | 15.11 | 15.36 | 10.51 | 7.088 | 7.606 | 13.06 |
| Measured properties | | | | | | | | | |
| n$_d$ | | | | 2.1198 | | | | | |
| d$_{RT}$ | g/cm$^3$ | 5.589 | 5.610 | 5.645 | 5.574 | | | | |
| T$_{liq}$ | ° C. | | 1125 | | 1117 | | | | |
| 15-min devit test (0/1) | | 1 | 1 | 1 | 1 | 1 | 1 | 1 | 1 |
| n$_{531.9\ nm}$ | | | | 2.1384 | | | | | |
| n$_{632.8\ nm}$ | | | | 2.1087 | | | | | |
| Predicted and calculated properties | | | | | | | | | |
| P$_{GF}$ | mol. % | 0.50672 | 0.20037 | −0.13358 | 0.66304 | 33.595 | 22.833 | 25.482 | 27.882 |
| P$_n$ [for n$_d$] | | 2.0973 | 2.1009 | 2.1051 | 2.0945 | 2.0231 | 2.0288 | 2.0233 | 2.0093 |
| P$_d$ [for d$_{RT}$] | g/cm$^3$ | 5.6037 | 5.6266 | 5.6537 | 5.5851 | 5.7207 | 5.6641 | 5.5663 | 5.3681 |
| P$_{Tg}$[for T$_g$] | ° C. | 606.5 | 606.0 | 605.2 | 607.6 | 582.3 | 586.8 | 579.5 | 595.8 |
| P$_n$ − (1.483 + 0.104 * P$_d$) | | 0.0315 | 0.0328 | 0.0341 | 0.0307 | −0.0549 | −0.0433 | −0.0386 | −0.0320 |
| P$_n$ − (1.503 + 0.104 * P$_d$) | | 0.0115 | 0.0128 | 0.0141 | 0.0107 | −0.0749 | −0.0633 | −0.0586 | −0.0520 |
| P$_n$ − (1.47 + 0.0009 * P$_{Tg}$) | | 0.0814 | 0.0856 | 0.0903 | 0.0777 | 0.0290 | 0.0307 | 0.0318 | 0.0031 |
| P$_n$ − (1.49 + 0.0009 * P$_{Tg}$) | | 0.0614 | 0.0656 | 0.0703 | 0.0577 | 0.0090 | 0.0107 | 0.0118 | −0.0169 |

| | | Exemplary Glass | | | | | | | |
|---|---|---|---|---|---|---|---|---|---|
| | | 113 | 114 | 115 | 116 | 117 | 118 | 119 | 120 |
| Composition - mol. % | | | | | | | | | |
| WO$_3$ | mol. % | 41.23 | 34.38 | 29.19 | 17.05 | 17.05 | 32.93 | 31.85 | 34.93 |
| B$_2$O$_3$ | mol. % | 23.61 | 25.45 | 27.46 | 24.37 | 24.37 | 27.93 | 25.91 | 26.49 |
| La$_2$O$_3$ | mol. % | 13.99 | 14.00 | 14.00 | 16.48 | 16.48 | 22.96 | 22.00 | 19.99 |
| Nb$_2$O$_5$ | mol. % | 6.71 | 8.13 | 10.90 | 15.27 | 15.27 | 8.98 | 7.03 | 10.24 |
| TiO$_2$ | mol. % | 7.42 | 11.01 | 11.42 | 13.37 | 13.37 | 0.0255 | 6.18 | 1.31 |
| ZrO$_2$ | mol. % | 7.00 | 6.99 | 6.99 | 7.00 | 7.00 | 6.98 | 6.99 | 7.00 |
| Bi$_2$O$_3$ | mol. % | 0 | 0 | 0 | 5.44 | 5.44 | 0 | 0 | 0 |
| Y$_2$O$_3$ | mol. % | 0 | 0 | 0 | 0.98 | 0.98 | 0 | 0 | 0 |
| SiO$_2$ | mol. % | 0.0316 | 0.0303 | 0.0298 | 0.0329 | 0.0329 | 0 | 0.0326 | 0.0335 |
| CeO$_2$ | mol. % | 0 | 0 | 0 | 0 | 0 | 0.14 | 0 | 0 |
| CaO | mol. % | 0 | 0 | 0 | 0 | 0 | 0.0363 | 0 | 0 |
| Ta$_2$O$_5$ | mol. % | 0.0043 | 0.0082 | 0.0081 | 0.0134 | 0.0134 | 0.0092 | 0.0044 | 0.0091 |
| Composition constraints | | | | | | | | | |
| WO$_3$ + Bi$_2$O$_3$ | mol. % | 41.23 | 34.38 | 29.19 | 22.49 | 22.49 | 32.96 | 31.85 | 34.93 |
| RE$_m$O$_n$ + ZrO$_2$ − Nb$_2$O$_5$ | mol. % | 14.29 | 12.86 | 10.10 | 9.182 | 9.182 | 21.04 | 21.96 | 16.75 |
| TiO$_2$ − Nb$_2$O$_5$ | mol. % | 0.7166 | 2.886 | 0.5176 | −1.905 | −1.905 | −8.965 | −0.8506 | −8.931 |
| SiO$_2$ − B$_2$O$_3$ | mol. % | −23.58 | −25.42 | −27.43 | −24.34 | −24.34 | −27.95 | −25.88 | −26.45 |
| TiO$_2$ + ZrO$_2$ | mol. % | 14.42 | 18.00 | 18.41 | 20.36 | 20.36 | 7.013 | 13.17 | 8.312 |
| TiO$_2$ + Nb$_2$O$_5$ | mol. % | 14.13 | 19.14 | 22.32 | 28.64 | 28.64 | 9.016 | 13.21 | 11.55 |
| Nb$_2$O$_5$ − SiO$_2$ | mol. % | 6.675 | 8.096 | 10.87 | 15.24 | 15.24 | 8.990 | 6.997 | 10.21 |

TABLE 6-continued

Exemplary Glass Compositions

| Measured properties | | | | | | | | | |
|---|---|---|---|---|---|---|---|---|---|
| $d_{RT}$ | g/cm³ | | | | | | 5.564 | | |
| $T_{liq}$ | ° C. | | | | 1071 | 1079 | | | |
| 15-min devit test (0/1) | | 1 | 1 | 1 | | | | 1 | 1 |

| Predicted and calculated properties | | | | | | | | | |
|---|---|---|---|---|---|---|---|---|---|
| $P_{GF}$ | mol. % | 30.894 | 22.497 | 20.331 | 0.68896 | 0.68896 | 24.624 | 15.848 | 29.203 |
| $P_n$ [for $n_d$] | | 2.0259 | 2.0192 | 2.011 | 2.0942 | 2.0942 | 2.0183 | 2.0317 | 2.0237 |
| $P_d$ [for $d_{RT}$] | g/cm³ | 5.604 | 5.3756 | 5.209 | 5.5648 | 5.5648 | 5.8397 | 5.759 | 5.7562 |
| $P_{Tg}$ [for $T_g$] | ° C. | 562.2 | 580.8 | 594.5 | 618.7 | 618.7 | 603.9 | 607.9 | 593.4 |
| $P_n - (1.483 + 0.104 * P_d)$ | | −0.0399 | −0.0228 | −0.0137 | 0.0324 | 0.0324 | −0.0720 | −0.0503 | −0.0579 |
| $P_n - (1.503 + 0.104 * P_d)$ | | −0.0599 | −0.0428 | −0.0337 | 0.0124 | 0.0124 | −0.0920 | −0.0703 | −0.0779 |
| $P_n - (1.47 + 0.0009 * P_{Tg})$ | | 0.0499 | 0.0265 | 0.0060 | 0.0673 | 0.0673 | 0.0048 | 0.0145 | 0.0197 |
| $P_n - (1.49 + 0.0009 * P_{Tg})$ | | 0.0299 | 0.0065 | −0.0140 | 0.0473 | 0.0473 | −0.0152 | −0.0055 | −3.400E-04 |

| | | Exemplary Glass | | | | | | | |
|---|---|---|---|---|---|---|---|---|---|
| | | 121 | 122 | 123 | 124 | 125 | 126 | 127 | 128 |
| Composition - mol. % | | | | | | | | | |
| $WO_3$ | mol. % | 33.91 | 29.87 | 33.13 | 16.37 | 16.37 | 14.50 | 36.22 | 38.23 |
| $B_2O_3$ | mol. % | 25.55 | 27.94 | 24.67 | 24.75 | 24.75 | 26.89 | 23.97 | 23.76 |
| $La_2O_3$ | mol. % | 20.00 | 17.99 | 14.00 | 15.99 | 15.99 | 14.20 | 21.99 | 20.00 |
| $Nb_2O_5$ | mol. % | 6.97 | 12.18 | 5.43 | 15.44 | 15.44 | 15.77 | 4.37 | 4.29 |
| $TiO_2$ | mol. % | 6.53 | 4.99 | 15.75 | 13.34 | 13.34 | 13.14 | 6.41 | 6.69 |
| $ZrO_2$ | mol. % | 7.01 | 6.99 | 7.00 | 6.99 | 6.99 | 6.99 | 7.00 | 6.99 |
| $Bi_2O_3$ | mol. % | 0 | 0 | 0 | 5.98 | 5.98 | 7.08 | 0 | 0 |
| $Y_2O_3$ | mol. % | 0 | 0 | 0 | 1.09 | 1.09 | 1.38 | 0 | 0 |
| $SiO_2$ | mol. % | 0.0323 | 0.032 | 0.0292 | 0.033 | 0.033 | 0.0326 | 0.0329 | 0.0326 |
| $Ta_2O_5$ | mol. % | 0.0044 | 0.0131 | 0.004 | 0.0134 | 0.0134 | 0.0133 | 0.0045 | 0.0044 |
| Composition constraints | | | | | | | | | |
| $WO_3 + Bi_2O_3$ | mol. % | 33.91 | 29.87 | 33.13 | 22.35 | 22.35 | 21.58 | 36.22 | 38.23 |
| $RE_mO_n + ZrO_2 - Nb_2O_5$ | mol. % | 20.03 | 12.80 | 15.57 | 8.626 | 8.626 | 6.795 | 24.62 | 22.69 |
| $TiO_2 - Nb_2O_5$ | mol. % | −0.4368 | −7.195 | 10.33 | −2.106 | −2.106 | −2.633 | 2.045 | 2.397 |
| $SiO_2 - B_2O_3$ | mol. % | −25.52 | −27.90 | −24.64 | −24.71 | −24.71 | −26.86 | −23.94 | −23.73 |
| $TiO_2 + ZrO_2$ | mol. % | 13.54 | 11.98 | 22.75 | 20.33 | 20.33 | 20.13 | 13.41 | 13.68 |
| $TiO_2 + Nb_2O_5$ | mol. % | 13.50 | 17.17 | 21.18 | 28.78 | 28.78 | 28.91 | 10.78 | 10.98 |
| $Nb_2O_5 - SiO_2$ | mol. % | 6.937 | 12.15 | 5.397 | 15.41 | 15.41 | 15.74 | 4.334 | 4.261 |
| Measured properties | | | | | | | | | |
| $d_{RT}$ | g/cm³ | | | | | 5.577 | 5.517 | | |
| $T_{liq}$ | ° C. | | | | 1061 | 1082 | 1058 | | |
| 15-min devit test (0/1) | | 1 | 1 | 1 | | | | 1 | 1 |
| Predicted and calculated properties | | | | | | | | | |
| $P_{GF}$ | mol. % | 19.364 | 24.902 | 13.536 | 0.64861 | 0.64861 | 2.0978 | 16.679 | 20.270 |
| $P_n$ [for $n_d$] | | 2.0288 | 2.0153 | 2.0239 | 2.0949 | 2.0949 | 2.0847 | 2.0402 | 2.0363 |
| $P_d$ [for $d_{RT}$] | g/cm³ | 5.7085 | 5.4745 | 5.3231 | 5.5592 | 5.5592 | 5.4658 | 5.9003 | 5.8455 |
| $P_{Tg}$ [for $T_g$] | ° C. | 597.0 | 602.2 | 585.1 | 616.2 | 616.2 | 608.5 | 596.7 | 585.7 |
| $P_n - (1.483 + 0.104 * P_d)$ | | −0.0479 | −0.0371 | −0.0127 | 0.0337 | 0.0337 | 0.0332 | −0.0564 | −0.0547 |
| $P_n - (1.503 + 0.104 * P_d)$ | | −0.0679 | −0.0571 | −0.0327 | 0.0137 | 0.0137 | 0.0132 | −0.0764 | −0.0747 |
| $P_n - (1.47 + 0.0009 * P_{Tg})$ | | 0.0215 | 0.0033 | 0.0273 | 0.0703 | 0.0703 | 0.0671 | 0.0332 | 0.0391 |
| $P_n - (1.49 + 0.0009 * P_{Tg})$ | | 0.0015 | −0.0167 | 0.0073 | 0.0503 | 0.0503 | 0.0471 | 0.0132 | 0.0191 |

| | | Exemplary Glass | | | | | | | |
|---|---|---|---|---|---|---|---|---|---|
| | | 129 | 130 | 131 | 132 | 133 | 134 | 135 | 136 |
| Composition - mol. % | | | | | | | | | |
| $WO_3$ | mol. % | 30.71 | 33.23 | 26.75 | 28.94 | 29.21 | 28.12 | 30.95 | 33.45 |
| $B_2O_3$ | mol. % | 26.84 | 26.78 | 26.47 | 26.85 | 27.04 | 26.53 | 26.01 | 25.90 |
| $La_2O_3$ | mol. % | 22.77 | 23.55 | 20.00 | 17.99 | 16.00 | 14.00 | 23.19 | 23.98 |
| $Nb_2O_5$ | mol. % | 6.47 | 6.34 | 5.43 | 8.69 | 9.30 | 7.83 | 4.62 | 4.39 |

TABLE 6-continued

| | | Exemplary Glass Compositions | | | | | | | |
|---|---|---|---|---|---|---|---|---|---|
| TiO$_2$ | mol. % | 5.29 | 2.94 | 14.32 | 10.49 | 11.41 | 16.49 | 7.34 | 5.12 |
| ZrO$_2$ | mol. % | 6.99 | 6.98 | 7.00 | 7.00 | 7.00 | 6.99 | 6.98 | 6.99 |
| SiO$_2$ | mol. % | 0.75 | 0 | 0.03 | 0.0307 | 0.0302 | 0.0286 | 0.74 | 0 |
| CeO$_2$ | mol. % | 0.14 | 0.14 | 0 | 0 | 0 | 0 | 0.13 | 0.14 |
| CaO | mol. % | 0.0348 | 0.0358 | 0 | 0 | 0 | 0 | 0.0344 | 0.0354 |
| Ta$_2$O$_5$ | mol. % | 0.0044 | 0.0045 | 0.0041 | 0.0084 | 0.0082 | 0.0078 | 0.0044 | 0.0045 |
| | | Composition constraints | | | | | | | |
| WO$_3$ + Bi$_2$O$_3$ | mol. % | 30.73 | 33.26 | 26.75 | 28.94 | 29.21 | 28.12 | 30.97 | 33.48 |
| RE$_m$O$_n$ + ZrO$_2$ − Nb$_2$O$_5$ | mol. % | 23.37 | 24.28 | 21.57 | 16.29 | 13.70 | 13.15 | 25.64 | 26.67 |
| TiO$_2$ − Nb$_2$O$_5$ | mol. % | −1.180 | −3.402 | 8.891 | 1.797 | 2.112 | 8.656 | 2.727 | 0.7281 |
| SiO$_2$ − B$_2$O$_3$ | mol. % | −26.11 | −26.80 | −26.44 | −26.82 | −27.01 | −26.50 | −25.29 | −25.92 |
| TiO$_2$ + ZiO$_2$ | mol. % | 12.29 | 9.924 | 21.32 | 17.48 | 18.41 | 23.48 | 14.33 | 12.11 |
| TiO$_2$ + Nb$_2$O$_5$ | mol. % | 11.77 | 9.279 | 19.75 | 19.18 | 20.71 | 24.32 | 11.96 | 9.510 |
| Nb$_2$O$_5$ − SiO$_2$ | mol. % | 5.731 | 6.340 | 5.398 | 8.663 | 9.268 | 7.806 | 3.879 | 4.391 |
| | | Measured properties | | | | | | | |
| d$_{RT}$ | g/cm$^3$ | 5.627 | 5.710 | | | | | 5.695 | |
| 15-min devit test (0/1) | | | | 1 | 1 | 1 | 1 | | |
| | | Predicted and calculated properties | | | | | | | |
| P$_{GF}$ | mol. % | 14.444 | 18.385 | 3.1850 | 14.611 | 16.627 | 10.823 | 10.076 | 13.750 |
| P$_n$ [for n$_d$] | | 2.0207 | 2.0256 | 2.0268 | 2.0212 | 2.0164 | 2.0164 | 2.026 | 2.0312 |
| P$_d$ [for d$_{RT}$] | g/cm$^3$ | 5.7421 | 5.8774 | 5.4563 | 5.4291 | 5.3209 | 5.1611 | 5.7702 | 5.9055 |
| P$_{Tg}$ [for T$_g$] | ° C. | 610.7 | 605.5 | 617.1 | 605.7 | 599.7 | 598.3 | 611.8 | 606.8 |
| P$_n$ − (1.483 + 0.104 * P$_d$) | | −0.0595 | −0.0687 | −0.0237 | −0.0264 | −0.0200 | −0.0034 | −0.0571 | −0.0660 |
| P$_n$ − (1.503 + 0.104 * P$_d$) | | −0.0795 | −0.0887 | −0.0437 | −0.0464 | −0.0400 | −0.0234 | −0.0771 | −0.0860 |
| P$_n$ − (1.47 + 0.0009 * P$_{Tg}$) | | 0.0011 | 0.0106 | 0.0014 | 0.0061 | 0.0067 | 0.0079 | 0.0054 | 0.0151 |
| P$_n$ − (1.49 + 0.0009 * P$_{Tg}$) | | −0.0189 | −0.0094 | −0.0186 | −0.0139 | −0.0133 | −0.0121 | −0.0146 | −0.0049 |

| | | Exemplary Glass | | | | | | | |
|---|---|---|---|---|---|---|---|---|---|
| | | 137 | 138 | 139 | 140 | 141 | 142 | 143 | 144 |
| | | Composition - mol. % | | | | | | | |
| WO$_3$ | mol. % | 31.24 | 32.96 | 12.40 | 13.09 | 14.98 | 13.74 | 16.82 | 15.53 |
| B$_2$O$_3$ | mol. % | 24.92 | 24.71 | 31.49 | 30.79 | 30.31 | 29.84 | 29.84 | 29.41 |
| La$_2$O$_3$ | mol. % | 22.00 | 19.99 | 17.00 | 16.10 | 15.48 | 14.60 | 14.88 | 14.03 |
| Nb$_2$O$_5$ | mol. % | 4.00 | 3.95 | 16.49 | 16.05 | 15.73 | 16.09 | 15.41 | 15.78 |
| TiO$_2$ | mol. % | 10.81 | 11.35 | 13.18 | 12.77 | 12.43 | 13.53 | 12.10 | 13.19 |
| ZrO$_2$ | mol. % | 6.99 | 7.00 | 7.00 | 7.00 | 7.00 | 7.00 | 7.00 | 7.00 |
| Bi$_2$O$_3$ | mol. % | 0 | 0 | 2.40 | 3.01 | 2.08 | 3.12 | 1.18 | 2.23 |
| Y$_2$O$_3$ | mol. % | 0 | 0 | 0 | 1.13 | 1.94 | 2.04 | 2.72 | 2.79 |
| SiO$_2$ | mol. % | 0.0315 | 0.0311 | 0.03 | 0.0304 | 0.0301 | 0.0302 | 0.0298 | 0.03 |
| Ta$_2$O$_5$ | mol. % | 0.0043 | 0.0042 | 0.0163 | 0.0165 | 0.0164 | 0.0164 | 0.0162 | 0.0163 |
| | | Composition constraints | | | | | | | |
| WO$_3$ + Bi$_2$O$_3$ | mol. % | 31.24 | 32.96 | 14.80 | 16.11 | 17.07 | 16.86 | 18.00 | 17.76 |
| RE$_m$O$_n$ + ZrO$_2$ − Nb$_2$O$_5$ | mol. % | 24.99 | 23.03 | 7.500 | 8.179 | 8.689 | 7.544 | 9.194 | 8.046 |
| TiO$_2$ − Nb$_2$O$_5$ | mol. % | 6.808 | 7.401 | −3.308 | −3.287 | −3.300 | −2.562 | −3.314 | −2.590 |
| SiO$_2$ − B$_2$O$_3$ | mol. % | −24.89 | −24.68 | −31.46 | −30.76 | −30.28 | −29.81 | −29.81 | −29.38 |
| TiO$_2$ + ZrO$_2$ | mol. % | 17.81 | 18.35 | 20.18 | 19.77 | 19.43 | 20.53 | 19.09 | 20.19 |
| TiO$_2$ + Nb$_2$O$_5$ | mol. % | 14.82 | 15.31 | 29.67 | 28.82 | 28.16 | 29.62 | 27.51 | 28.97 |
| Nb$_2$O$_5$ − SiO$_2$ | mol. % | 3.973 | 3.923 | 16.46 | 16.02 | 15.70 | 16.06 | 15.38 | 15.75 |
| | | Measured properties | | | | | | | |
| d$_{RT}$ | g/cm$^3$ | | | 5.163 | 5.214 | 5.142 | 5.194 | 5.120 | 5.159 |
| 15-min devit test (0/1) | | 1 | 1 | 1 | 1 | 1 | 1 | 1 | 1 |
| | | Predicted and calculated properties | | | | | | | |
| P$_{GF}$ | mol. % | 7.2478 | 10.310 | 7.6093 | 6.0928 | 6.3468 | 6.3026 | 7.8065 | 6.5431 |
| P$_n$ [for n$_d$] | | 2.0371 | 2.0334 | 2.0227 | 2.0306 | 2.0255 | 2.0363 | 2.0204 | 2.0312 |
| P$_d$ [for d$_{RT}$] | g/cm$^3$ | 5.7268 | 5.6628 | 5.0568 | 5.1274 | 5.1075 | 5.1172 | 5.0884 | 5.098 |
| P$_{Tg}$ [for T$_g$] | ° C. | 610.5 | 600.3 | 635.8 | 633.1 | 634.6 | 631.7 | 636.2 | 633.2 |
| P$_n$ − (1.483 + 0.104 * P$_d$) | | −0.0415 | −0.0386 | 0.0137 | 0.0144 | 0.0113 | 0.0211 | 0.0082 | 0.0180 |
| P$_n$ − (1.503 + 0.104 * P$_d$) | | −0.0615 | −0.0586 | −0.0063 | −0.0056 | −0.0087 | 0.0011 | −0.0118 | −0.0020 |

TABLE 6-continued

Exemplary Glass Compositions

| | | | | | | | | |
|---|---|---|---|---|---|---|---|---|
| $P_n - (1.47 + 0.0009 * P_{Tg})$ | 0.0177 | 0.0231 | −0.0195 | −0.0091 | −0.0157 | −0.0022 | −0.0221 | −0.0087 |
| $P_n - (1.49 + 0.0009 * P_{Tg})$ | −0.0023 | 0.0031 | −0.0395 | −0.0291 | −0.0357 | −0.0222 | −0.0421 | −0.0287 |

Exemplary Glass

| | | 145 | 146 | 147 | 148 | 149 | 150 | 151 | 152 |
|---|---|---|---|---|---|---|---|---|---|
| Composition - mol. % | | | | | | | | | |
| $WO_3$ | mol. % | 15.76 | 17.07 | 14.50 | 15.76 | 17.07 | 20.36 | 20.92 | 18.52 |
| $B_2O_3$ | mol. % | 24.92 | 24.93 | 26.89 | 24.92 | 24.93 | 24.23 | 23.00 | 25.09 |
| $La_2O_3$ | mol. % | 15.61 | 16.26 | 14.20 | 15.61 | 16.26 | 17.83 | 18.25 | 16.32 |
| $Nb_2O_5$ | mol. % | 15.63 | 15.18 | 15.77 | 15.63 | 15.18 | 14.57 | 14.10 | 15.33 |
| $TiO_2$ | mol. % | 13.31 | 13.33 | 13.14 | 13.31 | 13.33 | 12.73 | 13.00 | 12.18 |
| $ZrO_2$ | mol. % | 7.00 | 7.00 | 6.99 | 7.00 | 7.00 | 7.45 | 7.76 | 7.79 |
| $Bi_2O_3$ | mol. % | 6.53 | 5.21 | 7.08 | 6.53 | 5.21 | 2.31 | 2.47 | 3.94 |
| $Y_2O3$ | mol. % | 1.19 | 0.97 | 1.38 | 1.19 | 0.97 | 0.46 | 0.46 | 0.79 |
| $SiO_2$ | mol. % | 0.0331 | 0.0326 | 0.0326 | 0.0331 | 0.0326 | 0.032 | 0.0323 | 0.0323 |
| $Ta_2O_5$ | mol. % | 0.0135 | 0.0133 | 0.0133 | 0.0135 | 0.0133 | 0.0131 | 0.0132 | 0.0132 |
| Composition constraints | | | | | | | | | |
| $WO_3 + Bi_2O_3$ | mol. % | 22.29 | 22.28 | 21.58 | 22.29 | 22.28 | 22.68 | 23.39 | 22.46 |
| $RE_mO_n + ZrO_2 - Nb_2O_5$ | mol. % | 8.171 | 9.049 | 6.795 | 8.171 | 9.049 | 11.17 | 12.36 | 9.562 |
| $TiO_2 - Nb_2O_5$ | mol. % | −2.316 | −1.852 | −2.633 | −2.316 | −1.852 | −1.848 | −1.107 | −3.147 |
| $SiO_2 - B_2O_3$ | mol. % | −24.89 | −24.89 | −26.86 | −24.89 | −24.89 | −24.20 | −22.96 | −25.06 |
| $TiO_2 + ZrO_2$ | mol. % | 20.31 | 20.33 | 20.13 | 20.31 | 20.33 | 20.18 | 20.76 | 19.97 |
| $TiO_2 + Nb_2O_5$ | mol. % | 28.94 | 28.51 | 28.91 | 28.94 | 28.51 | 27.30 | 27.10 | 27.51 |
| $Nb_2O_5 - SiO_2$ | mol. % | 15.59 | 15.15 | 15.74 | 15.59 | 15.15 | 14.54 | 14.07 | 15.30 |
| Measured properties | | | | | | | | | |
| $d_{RT}$ | g/cm³ | | | 5.448 | 5.565 | 5.523 | | | |
| $T_{liq}$ | ° C. | 1071 | 1059 | 1020 | 1097 | 1072 | | | |
| 15-min devit test (0/1) | | | | | | | 1 | 1 | 1 |
| Predicted and calculated properties | | | | | | | | | |
| $P_{GF}$ | mol. % | 0.61918 | 1.2983 | 2.0978 | 0.61918 | 1.2983 | 5.9737 | 4.6392 | 5.1051 |
| $P_n$ [for $n_d$] | | 2.0975 | 2.0876 | 2.0847 | 2.0975 | 2.0876 | 2.0709 | 2.081 | 2.0748 |
| $P_d$ [for $d_{RT}$] | g/cm³ | 5.5665 | 5.523 | 5.4658 | 5.5665 | 5.523 | 5.4692 | 5.5447 | 5.4688 |
| $P_{Tg}$ [for $T_g$] | ° C. | 614.1 | 618.3 | 608.5 | 614.1 | 618.3 | 627.5 | 627.8 | 619.7 |
| $P_n - (1.483 + 0.104 * P_d)$ | | 0.0355 | 0.0302 | 0.0332 | 0.0355 | 0.0302 | 0.0191 | 0.0214 | 0.0231 |
| $P_n - (1.503 + 0.104 * P_d)$ | | 0.0155 | 0.0102 | 0.0132 | 0.0155 | 0.0102 | −8.800E−04 | 0.0014 | 0.0031 |
| $P_n - (1.47 + 0.0009 * P_{Tg})$ | | 0.0747 | 0.0612 | 0.0671 | 0.0747 | 0.0612 | 0.0362 | 0.0460 | 0.0471 |
| $P_n - (1.49 + 0.0009 * P_{Tg})$ | | 0.0547 | 0.0412 | 0.0471 | 0.0547 | 0.0412 | 0.0162 | 0.0260 | 0.0271 |

Exemplary Glass

| | | 153 | 154 | 155 | 156 | 157 | 158 | 159 | 160 |
|---|---|---|---|---|---|---|---|---|---|
| Composition - mol. % | | | | | | | | | |
| $WO_3$ | mol. % | 18.75 | 19.45 | 16.77 | 17.06 | 17.41 | 14.49 | 14.97 | 12.00 |
| $B_2O_3$ | mol. % | 24.10 | 22.98 | 25.92 | 24.91 | 24.10 | 26.98 | 25.85 | 28.35 |
| $La_2O_3$ | mol. % | 16.47 | 17.02 | 14.87 | 15.08 | 15.35 | 12.99 | 13.37 | 19.99 |
| $Nb_2O_5$ | mol. % | 15.02 | 14.54 | 16.06 | 15.72 | 15.41 | 16.99 | 16.56 | 14.33 |
| $TiO_2$ | mol. % | 12.35 | 12.66 | 11.65 | 11.86 | 12.03 | 11.00 | 11.25 | 13.97 |
| $ZrO_2$ | mol. % | 8.10 | 8.30 | 8.09 | 8.39 | 8.61 | 8.50 | 8.78 | 6.30 |
| $Bi_2O_3$ | mol. % | 4.32 | 4.23 | 5.50 | 5.81 | 5.92 | 7.50 | 7.67 | 5.00 |
| $Y_2O_3$ | mol. % | 0.83 | 0.79 | 1.10 | 1.13 | 1.13 | 1.50 | 1.50 | 0 |
| $SiO_2$ | mol. % | 0.0326 | 0.0328 | 0.0325 | 0.0328 | 0.0331 | 0.0329 | 0.0332 | 0.0321 |
| $Ta_2O_5$ | mol. % | 0.0133 | 0.0134 | 0.0133 | 0.0134 | 0.0135 | 0.0179 | 0.0135 | 0.0131 |
| Composition constraints | | | | | | | | | |
| $WO_3 + Bi_2O_3$ | mol. % | 23.07 | 23.67 | 22.26 | 22.86 | 23.33 | 21.99 | 22.64 | 17.00 |
| $RE_mO_n + ZrO_2 - Nb_2O_5$ | mol. % | 10.39 | 11.57 | 8.000 | 8.870 | 9.666 | 5.997 | 7.086 | 11.96 |
| $TiO_2 - Nb_2O_5$ | mol. % | −2.666 | −1.882 | −4.407 | −3.866 | −3.380 | −5.984 | −5.310 | −0.3604 |
| $SiO_2 - B_2O_3$ | mol. % | −24.07 | −22.95 | −25.89 | −24.88 | −24.07 | −26.95 | −25.82 | −28.32 |
| $TiO_2 + ZrO_2$ | mol. % | 20.46 | 20.96 | 19.74 | 20.25 | 20.64 | 19.50 | 20.04 | 20.27 |
| $TiO_2 + Nb_2O_5$ | mol. % | 27.37 | 27.19 | 27.71 | 27.58 | 27.44 | 27.99 | 27.82 | 28.31 |
| $Nb_2O_5 - SiO_2$ | mol. % | 14.99 | 14.51 | 16.03 | 15.69 | 15.38 | 16.96 | 16.53 | 14.30 |

TABLE 6-continued

| | Exemplary Glass Compositions | | | | | | | |
|---|---|---|---|---|---|---|---|---|
| | | | | | Measured properties | | | |
| $n_d$ | | | | | 2.103 | | | |
| $d_{RT}$ | g/cm³ | 5.499 | 5.532 | | 5.517 | 5.572 | | |
| $n_{531.9\ nm}$ | | | | | 2.1211 | | | |
| $n_{632.8\ nm}$ | | | | | 2.0923 | | | |
| 15-min devit test (0/1) | | 1 | 1 | 1 | 1 | 1 | 1 | 1 | 1 |
| | | | | Predicted and calculated properties | | | | |
| $P_{GF}$ | mol. % | 3.7820 | 2.8236 | 4.3162 | 3.0346 | 2.1406 | 4.0167 | 2.6628 | −1.1940 |
| $P_n$ [for $n_d$] | | 2.0845 | 2.0921 | 2.0785 | 2.0878 | 2.0945 | 2.0832 | 2.0926 | 2.0704 |
| $P_d$ [for $d_{RT}$] | g/cm³ | 5.5364 | 5.5973 | 5.4681 | 5.5341 | 5.5843 | 5.4663 | 5.536 | 5.4603 |
| $P_{Tg}$ [for $T_g$] | ° C. | 618.9 | 620.2 | 612.2 | 611.7 | 611.8 | 602.7 | 602.9 | 635.2 |
| $P_n - (1.483 + 0.104 \times P_d)$ | | 0.0257 | 0.0270 | 0.0268 | 0.0293 | 0.0307 | 0.0317 | 0.0338 | 0.0196 |
| $P_n - (1.503 + 0.104 \times P_d)$ | | 0.0057 | 0.0070 | 0.0068 | 0.0093 | 0.0107 | 0.0117 | 0.0138 | −4.200E−04 |
| $P_n - (1.47 + 0.0009 \times P_{Tg})$ | | 0.0575 | 0.0639 | 0.0575 | 0.0673 | 0.0739 | 0.0708 | 0.0800 | 0.0288 |
| $P_n - (1.49 + 0.0009 \times P_{Tg})$ | | 0.0375 | 0.0439 | 0.0375 | 0.0473 | 0.0539 | 0.0508 | 0.0600 | 0.0088 |

| | | Exemplary Glass | | | | | | | |
|---|---|---|---|---|---|---|---|---|---|
| | | 161 | 162 | 163 | 164 | 165 | 166 | 167 | 168 |
| | | Composition - mol. % | | | | | | | |
| $WO_3$ | mol. % | 22.99 | 22.99 | 16.67 | 16.68 | 16.68 | 16.68 | 17.04 | 16.69 |
| $B_2O_3$ | mol. % | 25.53 | 22.98 | 24.47 | 24.10 | 23.84 | 23.57 | 29.78 | 24.49 |
| $La_2O_3$ | mol. % | 19.99 | 19.99 | 14.75 | 14.81 | 14.86 | 14.92 | 14.81 | 14.76 |
| $Nb_2O_5$ | mol. % | 11.00 | 13.50 | 15.13 | 15.13 | 15.14 | 15.14 | 15.37 | 15.11 |
| $TiO_2$ | mol. % | 11.00 | 13.50 | 12.23 | 12.23 | 12.24 | 12.24 | 12.06 | 12.20 |
| $ZrO_2$ | mol. % | 7.01 | 6.99 | 8.29 | 8.29 | 8.29 | 8.30 | 7.00 | 8.30 |
| $Bi_2O_3$ | mol. % | 0 | 0 | 7.13 | 7.40 | 7.61 | 7.81 | 1.07 | 7.13 |
| $Y_2O_3$ | mol. % | 2.45 | 0 | 1.29 | 1.30 | 1.30 | 1.30 | 2.82 | 1.27 |
| $SiO_2$ | mol. % | 0.0314 | 0.0316 | 0.0333 | 0.0335 | 0.0337 | 0.0338 | 0.0298 | 0.0333 |
| $Ta_2O_5$ | mol. % | 0.0085 | 0.0129 | 0.0136 | 0.0137 | 0.0137 | 0.0138 | 0.0162 | 0.0136 |
| | | Composition constraints | | | | | | | |
| $WO_3 + Bi_2O_3$ | mol. % | 22.99 | 22.99 | 23.80 | 24.08 | 24.29 | 24.49 | 18.11 | 23.82 |
| $RE_mO_n + ZrO_2 - Nb_2O_5$ | mol. % | 18.45 | 13.49 | 9.195 | 9.270 | 9.322 | 9.374 | 9.265 | 9.217 |
| $TiO_2 - Nb_2O_5$ | mol. % | −2.190E−03 | 8.100E−04 | −2.900 | −2.903 | −2.899 | −2.894 | −3.312 | −2.910 |
| $SiO_2 - B_2O_3$ | mol. % | −25.50 | −22.95 | −24.43 | −24.07 | −23.80 | −23.53 | −29.75 | −24.46 |
| $TiO_2 + ZrO_2$ | mol. % | 18.00 | 20.49 | 20.51 | 20.52 | 20.53 | 20.54 | 19.06 | 20.50 |
| $TiO_2 + Nb_2O_5$ | mol. % | 21.99 | 26.99 | 27.36 | 27.36 | 27.37 | 27.38 | 27.43 | 27.31 |
| $Nb_2O_5 - SiO_2$ | mol. % | 10.97 | 13.46 | 15.10 | 15.10 | 15.10 | 15.10 | 15.34 | 15.08 |
| | | Measured properties | | | | | | | |
| $d_{RT}$ | g/cm³ | 5.437 | | | 5.538 | | | 5.098 | |
| $T_g$ | ° C. | | | | | | | 630 | |
| $T_x$ | ° C. | | | | | | | 742 | |
| $T_{liq}$ | ° C. | | | | | 1136.5 | | | |
| 15-min devit test (0/1) | | 1 | 1 | 1 | 1 | 1 | 1 | 1 | 1 |
| | | Predicted and calculated properties | | | | | | | |
| $P_{GF}$ | mol. % | 5.5615 | 7.1693 | 0.42845 | −0.02897 | −0.37685 | −0.72799 | 8.0980 | 0.46071 |
| $P_n$ [for $n_d$] | | 2.0453 | 2.0656 | 2.100 | 2.1049 | 2.1085 | 2.1121 | 2.0198 | 2.0998 |
| $P_d$ [for $d_{RT}$] | g/cm³ | 5.5035 | 5.4716 | 5.6195 | 5.6527 | 5.677 | 5.7015 | 5.0861 | 5.6197 |
| $P_{Tg}$ [for $T_g$] | ° C. | 641.9 | 638.6 | 605.7 | 605.0 | 604.5 | 603.9 | 636.4 | 605.6 |
| $P_n - (1.483 + 0.104 \times P_d)$ | | −0.0101 | 0.0136 | 0.0326 | 0.0340 | 0.0351 | 0.0362 | 0.0079 | 0.0324 |
| $P_n - (1.503 + 0.104 \times P_d)$ | | −0.0301 | −0.0064 | 0.0126 | 0.0140 | 0.0151 | 0.0162 | −0.0121 | 0.0124 |
| $P_n - (1.47 + 0.0009 \times P_{Tg})$ | | −0.0024 | 0.0209 | 0.0849 | 0.0904 | 0.0945 | 0.0986 | −0.0229 | 0.0848 |
| $P_n - (1.49 + 0.0009 \times P_{Tg})$ | | −0.0224 | 9.000E−04 | 0.0649 | 0.0704 | 0.0745 | 0.0786 | −0.0429 | 0.0648 |

TABLE 6-continued

Exemplary Glass Compositions

| | | Exemplary Glass | | | | | | | |
| --- | --- | --- | --- | --- | --- | --- | --- | --- | --- |
| | | 169 | 170 | 171 | 172 | 173 | 174 | 175 | 176 |
| Composition - mol. % | | | | | | | | | |
| $WO_3$ | mol. % | 16.18 | 16.18 | 15.77 | 15.71 | 15.78 | 15.37 | 15.33 | 15.33 |
| $B_2O_3$ | mol. % | 24.90 | 24.21 | 25.23 | 24.63 | 24.00 | 25.54 | 24.92 | 24.43 |
| $La_2O_3$ | mol. % | 14.17 | 14.15 | 13.71 | 13.63 | 13.67 | 13.25 | 13.18 | 13.16 |
| $Nb_2O_5$ | mol. % | 15.22 | 15.22 | 15.30 | 15.31 | 15.30 | 15.38 | 15.39 | 15.39 |
| $TiO_2$ | mol. % | 12.31 | 12.35 | 12.39 | 12.45 | 12.46 | 12.50 | 12.54 | 12.56 |
| $ZrO_2$ | mol. % | 8.29 | 8.30 | 8.29 | 8.30 | 8.30 | 8.30 | 8.29 | 8.29 |
| $TeO_2$ | mol. % | 0 | 0.68 | 0 | 0.64 | 1.21 | 0 | 0.65 | 1.14 |
| $Bi_2O_3$ | mol. % | 7.59 | 7.58 | 7.93 | 7.98 | 7.93 | 8.28 | 8.32 | 8.32 |
| $Y_2O_3$ | mol. % | 1.29 | 1.30 | 1.32 | 1.31 | 1.32 | 1.33 | 1.34 | 1.33 |
| $SiO_2$ | mol. % | 0.0333 | 0.0334 | 0.0332 | 0.0333 | 0.0334 | 0.0332 | 0.0333 | 0.0333 |
| $Ta_2O_5$ | mol. % | 0.0136 | 0.0136 | 0.0136 | 0.0136 | 0.0136 | 0.0135 | 0.0136 | 0.0136 |
| Composition constraints | | | | | | | | | |
| $WO_3 + Bi_2O_3$ | mol. % | 23.77 | 23.76 | 23.71 | 23.69 | 23.71 | 23.65 | 23.65 | 23.65 |
| $RE_mO_n + ZrO_2 - Nb_2O_5$ | mol. % | 8.534 | 8.524 | 8.026 | 7.925 | 7.994 | 7.505 | 7.424 | 7.396 |
| $TiO_2 - Nb_2O_5$ | mol. % | -2.909 | -2.871 | -2.902 | -2.861 | -2.841 | -2.871 | -2.849 | -2.825 |
| $SiO_2 - B_2O_3$ | mol. % | -24.86 | -24.18 | -25.20 | -24.60 | -23.97 | -25.51 | -24.89 | -24.39 |
| $TiO_2 + ZrO_2$ | mol. % | 20.60 | 20.64 | 20.69 | 20.75 | 20.76 | 20.80 | 20.83 | 20.85 |
| $TiO_2 + Nb_2O_5$ | mol. % | 27.54 | 27.56 | 27.69 | 27.76 | 27.75 | 27.88 | 27.92 | 27.95 |
| $Nb_2O_5 - SiO_2$ | mol. % | 15.19 | 15.18 | 15.26 | 15.28 | 15.26 | 15.34 | 15.35 | 15.35 |
| Measured properties | | | | | | | | | |
| $T_{liq}$ | ° C. | | | 1104 | | 1109 | | | |
| 15-min devit test (0/1) | | 1 | 1 | 1 | 1 | 1 | 1 | 1 | 1 |
| Predicted and calculated properties | | | | | | | | | |
| $P_{GF}$ | mol. % | 0.47927 | 0.27311 | 0.75854 | 0.61716 | 0.39629 | 1.0402 | 0.86320 | 0.73405 |
| $P_n$ [for $n_d$] | | 2.0993 | 2.1013 | 2.0987 | 2.1005 | 2.1024 | 2.0983 | 2.1002 | 2.1017 |
| $P_d$ [for $d_{RT}$] | g/cm³ | 5.6022 | 5.6221 | 5.5872 | 5.6037 | 5.6233 | 5.5725 | 5.591 | 5.6051 |
| $P_{Tg}$ [for $T_g$] | ° C. | 602.4 | 600.1 | 600.0 | 597.5 | 595.9 | 597.6 | 595.1 | 593.4 |
| $P_n - (1.483 + 0.104 * P_d)$ | | 0.0337 | 0.0336 | 0.0346 | 0.0348 | 0.0346 | 0.0357 | 0.0358 | 0.0357 |
| $P_n - (1.503 + 0.104 * P_d)$ | | 0.0137 | 0.0136 | 0.0146 | 0.0148 | 0.0146 | 0.0157 | 0.0158 | 0.0157 |
| $P_n - (1.47 + 0.0009 * P_{Tg})$ | | 0.0872 | 0.0912 | 0.0887 | 0.0928 | 0.0961 | 0.0904 | 0.0946 | 0.0976 |
| $P_n - (1.49 + 0.0009 * P_{Tg})$ | | 0.0672 | 0.0712 | 0.0687 | 0.0728 | 0.0761 | 0.0704 | 0.0746 | 0.0776 |

| | | Exemplary Glass | | | | | | | |
| --- | --- | --- | --- | --- | --- | --- | --- | --- | --- |
| | | 177 | 178 | 179 | 180 | 181 | 182 | 183 | 184 |
| Composition - mol. % | | | | | | | | | |
| $WO_3$ | mol. % | 15.37 | 33.93 | 11.48 | 16.69 | 16.69 | 16.33 | 16.05 | 15.77 |
| $B_2O_3$ | mol. % | 23.80 | 23.96 | 30.29 | 24.49 | 21.74 | 24.79 | 25.00 | 25.24 |
| $La_2O_3$ | mol. % | 13.19 | 24.95 | 15.10 | 14.76 | 14.76 | 14.34 | 14.03 | 13.70 |
| $Nb_2O_5$ | mol. % | 15.38 | 0 | 16.51 | 15.11 | 15.11 | 15.19 | 15.25 | 15.30 |
| $TiO_2$ | mol. % | 12.57 | 9.98 | 14.08 | 12.20 | 12.20 | 12.27 | 12.33 | 12.40 |
| $ZrO_2$ | mol. % | 8.30 | 6.99 | 7.00 | 8.30 | 8.29 | 8.29 | 8.30 | 8.30 |
| $TeO_2$ | mol. % | 1.74 | 0 | 0 | 0 | 2.76 | 0 | 0 | 0 |
| $Bi_2O_3$ | mol. % | 8.28 | 0 | 4.31 | 7.13 | 7.14 | 7.46 | 7.70 | 7.94 |
| $Y_2O_3$ | mol. % | 1.33 | 0 | 1.18 | 1.27 | 1.27 | 1.28 | 1.30 | 1.31 |
| $SiO_2$ | mol. % | 0.0334 | 0 | 0.0305 | 0.0333 | 0.0337 | 0.0333 | 0.0333 | 0.0332 |
| $CeO_2$ | mol. % | 0 | 0.15 | 0 | 0 | 0 | 0 | 0 | 0 |
| $CaO$ | mol. % | 0 | 0.0345 | 0 | 0 | 0 | 0 | 0 | 0 |
| $Ta_2O_5$ | mol. % | 0.0136 | 0 | 0.0166 | 0.0136 | 0.0138 | 0.0136 | 0.0136 | 0.0136 |
| Composition constraints | | | | | | | | | |
| $WO_3 + Bi_2O_3$ | mol. % | 23.65 | 33.96 | 15.79 | 23.82 | 23.82 | 23.78 | 23.75 | 23.71 |
| $RE_mO_n + ZrO_2 - Nb_2O_5$ | mol. % | 7.437 | 32.04 | 6.765 | 9.217 | 9.204 | 8.732 | 8.385 | 8.006 |
| $TiO_2 - Nb_2O_5$ | mol. % | -2.812 | 9.99 | -2.431 | -2.910 | -2.908 | -2.923 | -2.913 | -2.903 |
| $SiO_2 - B_2O_3$ | mol. % | -23.76 | -23.98 | -30.26 | -24.46 | -21.71 | -24.76 | -24.97 | -25.20 |
| $TiO_2 + ZrO_2$ | mol. % | 20.86 | 16.98 | 21.08 | 20.50 | 20.49 | 20.56 | 20.64 | 20.69 |
| $TiO_2 + Nb_2O_5$ | mol. % | 27.95 | 9.99 | 30.60 | 27.31 | 27.31 | 27.46 | 27.58 | 27.70 |
| $Nb_2O_5 - SiO_2$ | mol. % | 15.35 | 0 | 16.48 | 15.08 | 15.08 | 15.16 | 15.21 | 15.27 |

TABLE 6-continued

| | | | | | | | | |
|---|---|---|---|---|---|---|---|---|
| Exemplary Glass Compositions | | | | | | | | |
| Measured properties | | | | | | | | |
| $T_{liq}$ | ° C. | | | | | 1143 | | 1114 |
| 15-min devit test (0/1) | | 1 | 1 | 1 | 1 | 1 | 1 | 1 |
| Predicted and calculated properties | | | | | | | | |
| $P_{GF}$ | mol. % | 0.52635 | 3.3433 | 6.0363 | 0.47148 | −0.44929 | 0.38401 | 0.57209 | 0.77308 |
| $P_n$ [for $n_d$] | | 2.1035 | 2.0435 | 2.0438 | 2.0998 | 2.1081 | 2.0994 | 2.0991 | 2.0987 |
| $P_d$ [for $d_{RT}$] | g/cm³ | 5.6243 | 5.9676 | 5.1399 | 5.6197 | 5.7074 | 5.6071 | 5.5976 | 5.587 |
| $P_{Tg}$ [for $T_g$] | ° C. | 591.6 | 609.6 | 629.4 | 605.6 | 596.1 | 603.3 | 601.7 | 599.9 |
| $P_n - (1.483 + 0.104 * P_d)$ | | 0.0355 | −0.0602 | 0.0262 | 0.0324 | 0.0315 | 0.0332 | 0.0340 | 0.0347 |
| $P_n - (1.503 + 0.104 * P_d)$ | | 0.0155 | −0.0802 | 0.0062 | 0.0124 | 0.0115 | 0.0132 | 0.0140 | 0.0147 |
| $P_n - (1.47 + 0.0009 * P_{Tg})$ | | 0.1011 | 0.0249 | 0.0073 | 0.0848 | 0.1016 | 0.0864 | 0.0876 | 0.0888 |
| $P_n - (1.49 + 0.0009 * P_{Tg})$ | | 0.0811 | 0.0049 | −0.0127 | 0.0648 | 0.0816 | 0.0664 | 0.0676 | 0.0688 |

| | | Exemplary Glass | | | | | | |
|---|---|---|---|---|---|---|---|---|
| | | 185 | 186 | 187 | 188 | 189 | 190 | 191 | 192 |
| Composition - mol. % | | | | | | | | |
| $WO_3$ | mol. % | 13.35 | 15.27 | 13.95 | 15.71 | 22.98 | 19.99 | 21.01 | 19.53 |
| $B_2O_3$ | mol. % | 30.73 | 30.24 | 29.77 | 29.35 | 23.00 | 24.55 | 22.70 | 22.46 |
| $La_2O_3$ | mol. % | 16.01 | 15.38 | 14.49 | 13.96 | 19.99 | 19.99 | 19.99 | 18.61 |
| $Nb_2O_5$ | mol. % | 16.01 | 15.68 | 16.06 | 15.74 | 13.45 | 14.08 | 14.62 | 15.63 |
| $TiO_2$ | mol. % | 12.73 | 12.39 | 13.52 | 13.17 | 13.54 | 14.36 | 13.21 | 13.78 |
| $ZrO_2$ | mol. % | 7.00 | 7.00 | 7.00 | 6.99 | 7.01 | 7.00 | 6.99 | 6.99 |
| $Bi_2O_3$ | mol. % | 2.89 | 1.94 | 3.03 | 2.14 | 0 | 0 | 0 | 0 |
| $Y_2O_3$ | mol. % | 1.24 | 2.06 | 2.15 | 2.88 | 0 | 0 | 0.29 | 0.81 |
| BaO | mol. % | 0 | 0 | 0 | 0 | 0 | 0 | 1.13 | 1.04 |
| CaO | mol. % | 0 | 0 | 0 | 0 | 0 | 0 | 0 | 1.10 |
| $SiO_2$ | mol. % | 0.0303 | 0.0301 | 0.0302 | 0.0299 | 0.0316 | 0.031 | 0.0317 | 0.0311 |
| $Ta_2O_5$ | mol. % | 0.0165 | 0.0163 | 0.0164 | 0.0163 | 0.0129 | 0.0126 | 0.0129 | 0.0127 |
| SrO | mol. % | 0 | 0 | 0 | 0 | 0 | 0 | 0.0184 | 0.018 |
| Composition constraints | | | | | | | | |
| $WO_3 + Bi_2O_3$ | mol. % | 16.24 | 17.21 | 16.98 | 17.86 | 22.98 | 19.99 | 21.01 | 19.53 |
| $RE_mO_n + ZrO_2 - Nb_2O_5$ | mol. % | 8.228 | 8.773 | 7.564 | 8.085 | 13.55 | 12.91 | 12.64 | 10.78 |
| $BaO + SrO + ZnO + CdO$ | mol. % | 0 | 0 | 0 | 0 | 0 | 0 | 1.147 | 1.054 |
| $TiO_2 - Nb_2O_5$ | mol. % | −3.285 | −3.290 | −2.547 | −2.567 | 0.09112 | 0.2791 | −1.410 | −1.856 |
| $SiO_2 - B_2O_3$ | mol. % | −30.70 | −30.21 | −29.74 | −29.32 | −22.97 | −24.52 | −22.67 | −22.43 |
| $TiO_2 + ZrO_2$ | mol. % | 19.72 | 19.39 | 20.51 | 20.17 | 20.54 | 21.35 | 20.20 | 20.77 |
| $TiO_2 + Nb_2O_5$ | mol. % | 28.74 | 28.06 | 29.58 | 28.92 | 26.98 | 28.44 | 27.84 | 29.41 |
| $BaO + ZnO$ | mol. % | 0 | 0 | 0 | 0 | 0 | 0 | 1.129 | 1.036 |
| $Nb_2O_5 - SiO_2$ | mol. % | 15.98 | 15.65 | 16.03 | 15.71 | 13.41 | 14.05 | 14.59 | 15.60 |
| Measured properties | | | | | | | | |
| $n_d$ | | | | | | 2.064 | 2.0585 | | |
| $d_{RT}$ | g/cm³ | | | | | 5.444 | 5.369 | 5.441 | |
| $T_g$ | ° C. | | | | | 646 | 642 | | 643 |
| $T_x$ | ° C. | | | | | 792 | 790 | | 795 |
| $T_{liq}$ | ° C. | | | | | 1050 | 1080 | | |
| $Log(\eta_{liq})$ | P | | | | | 0.63 | 0.54 | | |
| $n_{531.9\ nm}$ | | | | | | 2.0784 | 2.0732 | | |
| $n_{632.8\ nm}$ | | | | | | 2.0553 | 2.0497 | | |
| 15-min devit test (0/1) | | 1 | 1 | 1 | 1 | | | 1 | 1 |
| $LR(T_g, T_{liq})$ | | | | | | −0.15824 | −0.16988 | | |
| $n_d - (1.483 + 0.104 * d_{RT})$ | | | | | | 0.0148 | 0.0171 | | |
| $n_d - (1.503 + 0.104 * d_{RT})$ | | | | | | −0.0052 | −0.0029 | | |
| $n_d - (1.47 + 0.0009 * T_g)$ | | | | | | 0.0126 | 0.0107 | | |
| $n_d - (1.49 + 0.0009 * T_g)$ | | | | | | −0.0074 | −0.0093 | | |
| Predicted and calculated properties | | | | | | | | |
| $P_{GF}$ | mol. % | 23.387 | 23.834 | 22.968 | 23.400 | 27.069 | 24.406 | 26.500 | 25.386 |
| $P_n$ [for $n_d$] | | 2.0299 | 2.0246 | 2.036 | 2.0307 | 2.0654 | 2.0567 | 2.0678 | 2.0657 |
| $P_d$ [for $d_{RT}$] | g/cm³ | 5.1243 | 5.1039 | 5.115 | 5.0958 | 5.4706 | 5.3586 | 5.471 | 5.378 |

TABLE 6-continued

| Exemplary Glass Compositions | | | | | | | | | |
|---|---|---|---|---|---|---|---|---|---|
| $P_{Tg}$ [for $T_g$] | ° C. | 633.2 | 634.9 | 631.8 | 633.3 | 638.5 | 645.3 | 646.1 | 648.8 |
| $P_n$ − (1.483 + 0.104 * $P_d$) | | 0.0140 | 0.0108 | 0.0210 | 0.0178 | 0.0135 | 0.0164 | 0.0158 | 0.0234 |
| $P_n$ − (1.503 + 0.104 * $P_d$) | | −0.0060 | −0.0092 | 0.0010 | −0.0022 | −0.0065 | −0.0036 | −0.0042 | 0.0034 |
| $P_n$ − (1.47 + 0.0009 * $P_{Tg}$) | | −0.0100 | −0.0168 | −0.0026 | −0.0093 | 0.0208 | 0.0059 | 0.0163 | 0.0117 |
| $P_n$ − (1.49 + 0.0009 * $P_{Tg}$) | | −0.0300 | −0.0368 | −0.0226 | −0.0293 | 7.600E−04 | −0.0141 | −0.0037 | −0.0083 |

| | | Exemplary Glass | | | | | | |
|---|---|---|---|---|---|---|---|---|
| | | 193 | 194 | 195 | 196 | 197 | 198 | 199 |
| Composition - mol. % | | | | | | | | |
| WO₃ | mol. % | 19.55 | 19.00 | 18.97 | 19.01 | 18.49 | 18.47 | 18.48 |
| B₂O₃ | mol. % | 22.48 | 22.11 | 21.57 | 21.10 | 21.79 | 21.19 | 20.33 |
| La₂O₃ | mol. % | 18.64 | 18.62 | 18.61 | 18.61 | 18.61 | 18.59 | 18.60 |
| Nb₂O₅ | mol. % | 15.65 | 16.08 | 16.36 | 16.57 | 16.49 | 16.76 | 17.19 |
| TiO₂ | mol. % | 13.81 | 13.80 | 13.79 | 13.80 | 13.80 | 13.79 | 13.79 |
| ZrO₂ | mol. % | 7.01 | 7.00 | 7.27 | 7.50 | 7.00 | 7.28 | 7.71 |
| Li₂O | mol. % | 0 | 1.56 | 0.81 | 0 | 2.97 | 2.18 | 0.88 |
| Y₂O3 | mol. % | 0.80 | 0.80 | 0.80 | 0.80 | 0.80 | 0.80 | 0.80 |
| K₂O | mol. % | 0 | 0 | 0.79 | 1.52 | 0 | 0.85 | 2.14 |
| BaO | mol. % | 1.00 | 0.50 | 0.46 | 0.50 | 0 | 0 | 0 |
| CaO | mol. % | 1.00 | 0.50 | 0.47 | 0.50 | 0 | 0 | 0 |
| SiO₂ | mol. % | 0.0311 | 0.0309 | 0.0311 | 0.0313 | 0.0308 | 0.031 | 0.0313 |
| Na₂O | mol. % | 0 | 0 | 0.0302 | 0.0304 | 0 | 0.03 | 0.0303 |
| Ta₂O₅ | mol. % | 0.0127 | 0.0168 | 0.0169 | 0.017 | 0.0167 | 0.0168 | 0.017 |
| Composition constraints | | | | | | | | |
| WO₃ + Bi₂O₃ | mol. % | 19.55 | 19.00 | 18.97 | 19.01 | 18.49 | 18.47 | 18.48 |
| REₘOₙ + ZrO₂ − Nb₂O₅ | mol. % | 10.80 | 10.34 | 10.32 | 10.34 | 9.921 | 9.907 | 9.913 |
| BaO + SrO + ZnO + CdO | mol. % | 1.000 | 0.4971 | 0.4635 | 0.5030 | 0 | 0 | 0 |
| TiO₂ − Nb₂O₅ | mol. % | −1.841 | −2.278 | −2.575 | −2.774 | −2.691 | −2.975 | −3.402 |
| SiO₂ − B₂O₃ | mol. % | −22.45 | −22.08 | −21.54 | −21.07 | −21.75 | −21.16 | −20.30 |
| TiO₂ + ZrO₂ | mol. % | 20.82 | 20.80 | 21.06 | 21.30 | 20.80 | 21.07 | 21.50 |
| TiO₂ + Nb₂O₅ | mol. % | 29.47 | 29.88 | 30.15 | 30.37 | 30.29 | 30.55 | 30.99 |
| BaO + ZnO | mol. % | 1.000 | 0.4971 | 0.4635 | 0.5030 | 0 | 0 | 0 |
| Nb₂O₅ − SiO₂ | mol. % | 15.62 | 16.05 | 16.33 | 16.54 | 16.46 | 16.73 | 17.16 |
| Measured properties | | | | | | | | |
| $d_{RT}$ | g/cm³ | | | | | | 5.321 | |
| $T_{liq}$ | ° C. | 1114 | | | | 1118 | | |
| Predicted and calculated properties | | | | | | | | |
| $P_{GF}$ | mol. % | 25.395 | 25.166 | 25.119 | 25.088 | 24.964 | 24.891 | 24.824 |
| $P_n$ [for $n_d$] | | 2.0661 | 2.0654 | 2.0674 | 2.0694 | 2.065 | 2.0669 | 2.0704 |
| $P_d$ [for $d_{RT}$] | g/cm³ | 5.3788 | 5.3473 | 5.3541 | 5.3639 | 5.3182 | 5.3256 | 5.3403 |
| $P_{Tg}$ [for $T_g$] | ° C. | 648.9 | 643.7 | 643.5 | 643.8 | 639.1 | 638.7 | 639.0 |
| $P_n$ − (1.483 + 0.104 * $P_d$) | | 0.0237 | 0.0263 | 0.0276 | 0.0285 | 0.0289 | 0.0300 | 0.0320 |
| $P_n$ − (1.503 + 0.104 * $P_d$) | | 0.0037 | 0.0063 | 0.0076 | 0.0085 | 0.0089 | 0.0101 | 0.0120 |
| $P_n$ − (1.47 + 0.0009 * $P_{Tg}$) | | 0.0121 | 0.0161 | 0.0182 | 0.0199 | 0.0198 | 0.0220 | 0.0254 |
| $P_n$ − (1.49 + 0.0009 * $P_{Tg}$) | | −0.0079 | −0.0039 | −0.0018 | −1.000E−04 | −2.100E−04 | 0.0021 | 0.0054 |

Table 7 below lists the glass compositions and properties for Comparative Glasses C1-C39.

TABLE 7

| Compositions and Properties of Comparative Example Glasses | | | | | | | | | |
|---|---|---|---|---|---|---|---|---|---|
| Comparative Examples Reference | | C1 [20] | C2 [18] | C3 [19] | C4 [4] | C5 [5] | C6 [9] | C7 [2] | C8 [8] |
| Composition - mol. % | | | | | | | | | |
| BiCl₃ | mol. % | 25.00 | 0 | 0 | 0 | 0 | 0 | 0 | 0 |
| B₂O₃ | mol. % | 50.25 | 10.02 | 32.64 | 13.84 | 28.94 | 35.01 | 11.51 | 13.93 |
| Li₂O | mol. % | 24.75 | 0 | 0 | 0 | 0 | 0 | 0 | 0 |

TABLE 7-continued

Compositions and Properties of Comparative Example Glasses

| | | | | | | | | | |
|---|---|---|---|---|---|---|---|---|---|
| PbO | mol. % | 0 | 69.98 | 0 | 53.94 | 26.56 | 0 | 58.93 | 66.24 |
| $Bi_2O_3$ | mol. % | 0 | 20.00 | 13.36 | 18.09 | 17.81 | 15.00 | 4.00 | 17.17 |
| $Tl_2O$ | mol. % | 0 | 0 | 54.00 | 0 | 0 | 0 | 0 | 0 |
| $Ga_2O_3$ | mol. % | 0 | 0 | 0 | 14.13 | 0 | 0 | 0 | 0 |
| $BF_3$ | mol. % | 0 | 0 | 0 | 0 | 23.76 | 0 | 11.82 | 0 |
| $V_2O_5$ | mol. % | 0 | 0 | 0 | 0 | 1.13 | 0 | 0 | 2.67 |
| $GeO_2$ | mol. % | 0 | 0 | 0 | 0 | 1.80 | 0 | 0 | 0 |
| $ZnF_2$ | mol. % | 0 | 0 | 0 | 0 | 0 | 25.00 | 9.63 | 0 |
| BaO | mol. % | 0 | 0 | 0 | 0 | 0 | 10.00 | 2.56 | 0 |
| $Na_2O$ | mol. % | 0 | 0 | 0 | 0 | 0 | 14.99 | 0 | 0 |
| $SiF_4$ | mol. % | 0 | 0 | 0 | 0 | 0 | 0 | 1.55 | 0 |
| Measured properties | | | | | | | | | |
| $n_d$ | | | | | 2.2024 | | | | |
| $d_{RT}$ | g/cm$^3$ | 2.920 | | | | | | | 7.408 |
| $T_g$ | ° C. | 283.00 | | | 328.00 | 214.00 | 355.00 | 249.00 | |
| $T_{liq}$ | ° C. | | | | 630.00 | | | | |
| $LR(T_g, T_{liq})$ | | | | | −0.17681 | | | | |
| Predicted and calculated properties | | | | | | | | | |
| $P_n$ [for $n_d$] | | 1.905 | 2.277 | 1.969 | 2.211 | 2.066 | 1.953 | 2.108 | 2.223 |
| $P_d$ [for $d_{RT}$] | g/cm$^3$ | 4.357 | 8.056 | 4.719 | 7.294 | 5.989 | 4.983 | 6.506 | 7.625 |
| $P_{Tg}$ [for $T_g$] | ° C. | 511.3 | 329.9 | 504.2 | 372.7 | 424.7 | 468.0 | 429.4 | 348.8 |

| Comparative Examples | | C9 | C10 | C11 | C12 | C13 | C14 | C15 | C16 |
|---|---|---|---|---|---|---|---|---|---|
| Reference | | [6] | [1] | [7] | [3] | [12] | [18] | [11] | [10] |
| Composition - mol. % | | | | | | | | | |
| $B_2O_3$ | mol. % | 26.42 | 12.22 | 42.82 | 14.23 | 29.80 | 19.99 | 20.71 | 23.53 |
| $Li_2O$ | mol. % | 3.08 | 0 | 0 | 0 | 0 | 0 | 0 | 0 |
| PbO | mol. % | 0 | 62.82 | 0 | 39.96 | 0 | 70.01 | 67.33 | 0 |
| $Bi_2O_3$ | mol. % | 3.95 | 1.16 | 9.12 | 14.89 | 0.85 | 10.00 | 10.26 | 3.92 |
| $BF_3$ | mol. % | 0 | 12.24 | 0 | 0 | 0 | 0 | 0 | 0 |
| $GeO_2$ | mol. % | 15.83 | 0 | 0 | 0 | 0 | 0 | 0 | 0 |
| $ZnF_2$ | mol. % | 0 | 5.52 | 0 | 0 | 0 | 0 | 0 | 0 |
| BaO | mol. % | 0 | 0 | 0 | 0 | 0 | 0 | 0 | 19.60 |
| $La_2O_3$ | mol. % | 20.89 | 0 | 0 | 0 | 30.46 | 0 | 0 | 1.96 |
| $Nb_2O_5$ | mol. % | 15.22 | 0 | 0 | 0 | 8.36 | 0 | 0 | 0 |
| $ZrO_2$ | mol. % | 11.94 | 0 | 0 | 0 | 8.83 | 0 | 0 | 0 |
| $Gd_2O_3$ | mol. % | 1.52 | 0 | 0 | 0 | 0 | 0 | 0 | 0 |
| $TiO_2$ | mol. % | 1.15 | 0 | 0 | 0 | 5.18 | 0 | 0 | 0 |
| $CuF_2$ | mol. % | 0 | 2.26 | 0 | 0 | 0 | 0 | 0 | 0 |
| $Sb_2O_3$ | mol. % | 0 | 0.62 | 0 | 0 | 0 | 0 | 0 | 0 |
| $FeF_3$ | mol. % | 0 | 1.51 | 0 | 0 | 0 | 0 | 0 | 0 |
| MnO | mol. % | 0 | 1.65 | 0 | 0 | 0 | 0 | 0 | 0 |
| $PbF_2$ | mol. % | 0 | 0 | 43.38 | 0 | 0 | 0 | 0 | 0 |
| $Al_2O_3$ | mol. % | 0 | 0 | 2.99 | 0 | 0 | 0 | 1.70 | 0 |
| CdO | mol. % | 0 | 0 | 0.57 | 0 | 0 | 0 | 0 | 0 |
| ZnO | mol. % | 0 | 0 | 0.68 | 24.35 | 0 | 0 | 0 | 1.96 |
| CuO | mol. % | 0 | 0 | 0.23 | 0 | 0 | 0 | 0 | 0 |
| NiO | mol. % | 0 | 0 | 0.22 | 0 | 0 | 0 | 0 | 0 |
| $SnO_2$ | mol. % | 0 | 0 | 0 | 6.58 | 0 | 0 | 0 | 0 |
| $SiO_2$ | mol. % | 0 | 0 | 0 | 0 | 13.59 | 0 | 0 | 0 |
| $Y_2O_3$ | mol. % | 0 | 0 | 0 | 0 | 2.93 | 0 | 0 | 0 |
| $TeO_2$ | mol. % | 0 | 0 | 0 | 0 | 0 | 0 | 0 | 47.06 |
| $P_2O_5$ | mol. % | 0 | 0 | 0 | 0 | 0 | 0 | 0 | 1.96 |
| Measured properties | | | | | | | | | |
| $n_d$ | | 2.010 | | | | 1.902 | 2.242 | 2.1462 | 1.9141 |
| $d_{RT}$ | g/cm$^3$ | | | | | 4.850 | 7.680 | 7.220 | 5.183 |
| $T_g$ | ° C. | | 210.00 | 290.00 | | | | | 380.00 |
| $T_{liq}$ | ° C. | | | | | 1250.0 | | | |
| $v_d$ | | 25.3 | | | | 37.1 | 14.8 | 15.3 | 35.9 |
| $\lambda_{70\%}$ | nm | | | | | 395.00 | | | |
| $n_{531.9\,nm}$ | | 2.0233 | | | | 1.9101 | 2.2705 | 2.1717 | 1.9240 |
| $n_{632.8\,nm}$ | | 2.0020 | | | | 1.8970 | 2.2265 | 2.1324 | 1.9104 |
| Predicted and calculated properties | | | | | | | | | |
| $P_n$ [for $n_d$] | | 1.969 | 2.087 | 2.012 | 2.128 | 1.954 | 2.129 | 2.113 | 1.767 |
| $P_d$ [for $d_{RT}$] | g/cm$^3$ | 5.189 | 6.343 | 5.673 | 6.847 | 5.255 | 7.062 | 6.925 | 5.079 |
| $P_{Tg}$ [for $T_g$] | ° C. | 644.4 | 431.9 | 445.2 | 375.2 | 714.6 | 368.8 | 375.3 | 372.0 |

TABLE 7-continued

| Compositions and Properties of Comparative Example Glasses | | | | | | | | | |
|---|---|---|---|---|---|---|---|---|---|
| Comparative Examples | | C17 | C18 | C19 | C20 | C21 | C22 | C23 | C24 |
| Reference | | [21] | [15] | [16] | [14] | [13] | [17] | [14] | [14] |
| Composition - mol. % | | | | | | | | | |
| $B_2O_3$ | mol. % | 30.00 | 43.00 | 33.66 | 27.95 | 43.00 | 40.00 | 26.72 | 27.96 |
| PbO | mol. % | 60.00 | 0 | 0 | 0 | 0 | 0 | 0 | 0 |
| $Bi_2O_3$ | mol. % | 10.00 | 5.00 | 0 | 0 | 5.00 | 0 | 0 | 0 |
| $La_2O_3$ | mol. % | 0 | 16.00 | 24.57 | 21.52 | 16.00 | 15.00 | 21.50 | 20.86 |
| $Nb_2O_5$ | mol. % | 0 | 6.00 | 8.32 | 8.99 | 6.00 | 15.00 | 6.23 | 8.98 |
| $ZrO_2$ | mol. % | 0 | 3.00 | 6.20 | 6.99 | 3.00 | 0 | 6.99 | 6.99 |
| $Gd_2O_3$ | mol. % | 0 | 0 | 2.49 | 0 | 0 | 0 | 0 | 0 |
| $TiO_2$ | mol. % | 0 | 0 | 0 | 4.84 | 0 | 10.00 | 9.97 | 7.01 |
| $Sb_2O_3$ | mol. % | 0 | 0 | 0.0674 | 0 | 0 | 0 | 0 | 0 |
| ZnO | mol. % | 0 | 18.00 | 0 | 0 | 18.00 | 7.00 | 0 | 0 |
| $SiO_2$ | mol. % | 0 | 0 | 0 | 1.44 | 0 | 0 | 2.09 | 2.12 |
| $Y_2O_3$ | mol. % | 0 | 0 | 0.71 | 0 | 0 | 0 | 0 | 0 |
| $TeO_2$ | mol. % | 0 | 9.00 | 0 | 0 | 9.00 | 0 | 0 | 0 |
| $Ta_2O_5$ | mol. % | 0 | 0 | 8.91 | 0.0087 | 0 | 0 | 0.0042 | 0.0085 |
| $WO_3$ | mol. % | 0 | 0 | 15.08 | 28.11 | 0 | 13.00 | 26.34 | 25.93 |
| $CeO_2$ | mol. % | 0 | 0 | 0 | 0.12 | 0 | 0 | 0.13 | 0.12 |
| CaO | mol. % | 0 | 0 | 0 | 0.0343 | 0 | 0 | 0.0329 | 0.0334 |
| Measured properties | | | | | | | | | |
| $n_d$ | | 2.1289 | 1.900 | 1.953 | | | 1.965 | | |
| $d_{RT}$ | g/cm³ | 7.151 | | 5.940 | | 4.970 | | | |
| $T_g$ | ° C. | | 565.00 | 679.00 | | | 614.00 | | |
| $\alpha_{20\text{-}300} \times 10^7$ | K⁻¹ | | | 79.200 | | | | | |
| $v_d$ | | 15.6 | 31.1 | 33.3 | | | 25.4 | | |
| $\lambda_{70\%}$ | nm | | 423.00 | | | | | | |
| $n_{531.9\ nm}$ | | 2.1529 | 1.9096 | 1.9625 | | | 1.9776 | | |
| $n_{632.8\ nm}$ | | 2.1149 | 1.8941 | 1.9471 | | | 1.9574 | | |
| Predicted and calculated properties | | | | | | | | | |
| $P_n$ [for $n_d$] | | 2.052 | 1.859 | 2.026 | 2.010 | 1.859 | 1.925 | 2.013 | 2.005 |
| $P_d$ [for $d_{RT}$] | g/cm³ | 6.495 | 4.968 | 6.072 | 5.583 | 4.968 | 4.630 | 5.511 | 5.466 |
| $P_{Tg}$ [for $T_g$] | ° C. | 384.4 | 534.3 | 681.9 | 614.0 | 534.3 | 610.8 | 620.0 | 618.5 |

| Comparative Examples | | C25 | C26 | C27 | C28 | C29 | C30 | C31 | C32 |
|---|---|---|---|---|---|---|---|---|---|
| Reference | | [14] | [14] | [14] | [14] | [14] | [14] | [17] | [17] |
| Composition - mol. % | | | | | | | | | |
| $B_2O_3$ | mol. % | 28.99 | 26.41 | 26.41 | 27.06 | 27.07 | 32.98 | 40.00 | 40.00 |
| BaO | mol. % | 0 | 0.0115 | 0 | 0.0116 | 0 | 0 | 0 | 0 |
| $La_2O_3$ | mol. % | 19.99 | 19.99 | 19.96 | 19.98 | 19.97 | 19.99 | 15.00 | 15.00 |
| $Nb_2O_5$ | mol. % | 15.99 | 6.90 | 6.92 | 7.78 | 7.79 | 15.00 | 20.00 | 20.00 |
| $ZrO_2$ | mol. % | 7.00 | 6.99 | 6.99 | 7.00 | 7.00 | 7.00 | 0 | 0 |
| $TiO_2$ | mol. % | 10.00 | 13.12 | 13.08 | 11.82 | 11.77 | 8.99 | 10.00 | 10.01 |
| ZnO | mol. % | 0 | 0 | 0 | 0 | 0 | 0 | 7.00 | 6.99 |
| $SiO_2$ | mol. % | 0.031 | 3.50 | 3.52 | 3.26 | 3.29 | 0.0301 | 0 | 0 |
| $TeO_2$ | mol. % | 0 | 0 | 0 | 0 | 0 | 0 | 6.00 | 0 |
| $Ta_2O_5$ | mol. % | 0.0169 | 0.008 | 0.008 | 0.0081 | 0.0081 | 0.0123 | 0 | 0 |
| $WO_3$ | mol. % | 17.99 | 22.98 | 22.95 | 22.98 | 22.96 | 15.99 | 2.00 | 8.00 |
| $CeO_2$ | mol. % | 0 | 0 | 0.12 | 0 | 0.11 | 0 | 0 | 0 |
| CaO | mol. % | 0 | 0.0629 | 0.0315 | 0.0635 | 0.0318 | 0 | 0 | 0 |
| $SiCl_4$ | mol. % | 0 | 0.0416 | 0 | 0.0419 | 0 | 0 | 0 | 0 |
| Measured properties | | | | | | | | | |
| $n_d$ | | | | | | | | 1.983 | 1.988 |
| $T_g$ | ° C. | | | | | | | 597.00 | 613.00 |
| $v_d$ | | | | | | | | 24.8 | 24.4 |
| $n_{531.9\ nm}$ | | | | | | | | 1.9962 | 2.0015 |
| $n_{632.8\ nm}$ | | | | | | | | 1.9751 | 1.9799 |
| Predicted and calculated properties | | | | | | | | | |
| $P_n$ [for $n_d$] | | 2.025 | 2.007 | 2.006 | 2.004 | 2.004 | 1.995 | 1.911 | 1.934 |
| $P_d$ [for $d_{RT}$] | g/cm³ | 5.244 | 5.307 | 5.305 | 5.308 | 5.307 | 5.110 | 4.431 | 4.522 |
| $P_{Tg}$ [for $T_g$] | ° C. | 644.1 | 626.3 | 626.2 | 625.6 | 625.6 | 642.6 | 615.5 | 628.5 |

| Comparative Examples | | C33 | C34 | C35 | C36 | C37 | C38 | C39 |
|---|---|---|---|---|---|---|---|---|
| Reference | | [17] | [17] | [14] | [17] | [17] | [17] | [17] |
| Composition - mol. % | | | | | | | | |
| $B_2O_3$ | mol. % | 39.99 | 40.00 | 27.95 | 40.00 | 39.99 | 40.00 | 40.00 |
| $La_2O_3$ | mol. % | 15.00 | 15.00 | 19.97 | 15.00 | 20.00 | 15.00 | 18.50 |
| $Nb_2O_5$ | mol. % | 15.00 | 15.00 | 8.99 | 10.00 | 10.00 | 10.00 | 8.40 |

TABLE 7-continued

| | | | | | Compositions and Properties of Comparative Example Glasses | | | |
|---|---|---|---|---|---|---|---|---|
| $ZrO_2$ | mol. % | 0 | 0 | 7.00 | 0 | 0 | 0 | 0 |
| $TiO_2$ | mol. % | 15.00 | 9.99 | 9.98 | 15.00 | 9.99 | 10.00 | 9.99 |
| $Sb_2O_3$ | mol. % | 0 | 0 | 0 | 0 | 0 | 0 | 0.0974 |
| ZnO | mol. % | 7.00 | 12.01 | 0 | 12.00 | 12.01 | 17.00 | 15.01 |
| $SiO_2$ | mol. % | 0 | 0 | 3.00 | 0 | 0 | 0 | 0 |
| $Ta_2O_5$ | mol. % | 0 | 0 | 0.0082 | 0 | 0 | 0 | 0 |
| $WO_3$ | mol. % | 8.00 | 8.00 | 22.97 | 8.00 | 8.00 | 8.00 | 8.00 |
| $CeO_2$ | mol. % | 0 | 0 | 0.12 | 0 | 0 | 0 | 0 |
| CaO | mol. % | 0 | 0 | 0.0322 | 0 | 0 | 0 | 0 |
| | | | | Measured properties | | | | |
| $n_d$ | | 1.975 | 1.957 | | 1.946 | 1.941 | 1.924 | 1.926 |
| $T_g$ | ° C. | 617.00 | 607.00 | | 609.00 | 622.00 | 605.00 | 611.00 |
| $v_d$ | | 24.9 | 26.4 | | 26.8 | 29.5 | 28.7 | 30.0 |
| $n_{531.9\ nm}$ | | 1.9880 | 1.9691 | | 1.9577 | 1.9516 | 1.9347 | 1.9363 |
| $n_{632.8\ nm}$ | | 1.9672 | 1.9497 | | 1.9389 | 1.9346 | 1.9175 | 1.9198 |
| | | | | Predicted and calculated properties | | | | |
| $P_n$ [for $n_d$] | | 1.930 | 1.914 | 2.000 | 1.909 | 1.919 | 1.894 | 1.905 |
| $P_d$ [for $d_{RT}$] | $g/cm^3$ | 4.474 | 4.569 | 5.308 | 4.521 | 4.821 | 4.615 | 4.773 |
| $P_{Tg}$ [for $T_g$] | ° C. | 626.4 | 611.8 | 624.7 | 609.8 | 622.5 | 595.2 | 609.2 |

The reference key for each of the Comparative Glasses listed in Table 7 is as follows: [1] JP11116275A; [2] JP5097470A; [3] JP53078048; [4] JP63274638A; [5] JP8157234A; [6] JPH09278480; [7] SU1533244; [8] U.S. Pat. No. 3,480,566; [9] U.S. Pat. No. 9,011,720$B_2$; [10] DD206138; [11] SU798060A1; [12] U.S. Ser. No. 10/287, 205$B_2$; [13] JP2009096662; [14] U.S. provisional patent application Ser. No. 63/163,269; [15] U.S. Pat. No. 8,053, 384$B_2$; [16] U.S. Pat. No. 8,476,177$B_2$; [17] U.S. Pat. No. 8,563,451$B_2$; [18] Imaoka M., Low melting glasses., J. Inst. Ind. Sci. Univ. Tokyo, 1961, vol. 13, No. 11, p. 441-445; Imaoka M., Glasses with high contents of $Bi_2O_3$ and PbO (in Japanese), J. Chem. Soc. Jpn, Chem. Chem. Ind., 1961, vol. 64, No. 5, p. 871-890; [19] Imaoka M., Yamazaki T., Glass-formation ranges of ternary systems. III. Borates containing b-group elements, Rep. Inst. Ind. Sci. Univ. Tokyo, 1972, vol. 22, No. 3, p. 173-212; [20] Chandrashek-araiah G., Reddy N. S., Sujatha B., Viswanatha R., Reddy C. N., Role of Er3+ and Bi3+ ions on thermal and optical properties of Li2B4O7 glasses: Structural correlation, J. Non-Cryst. Solids, 2018, vol. 498, p. 252-261; [21] Milyu-kov E. M., Lunkin S. P., Maltseva Z. S., Glass formation regions and optical properties of some borate and germanate glasses of the systems containing $Bi_2O_3$ and PbO (in Russian), Fizika i Khimiya Stekla, 1979, vol. 5, No. 5, p. 612-616.

Figure 6:
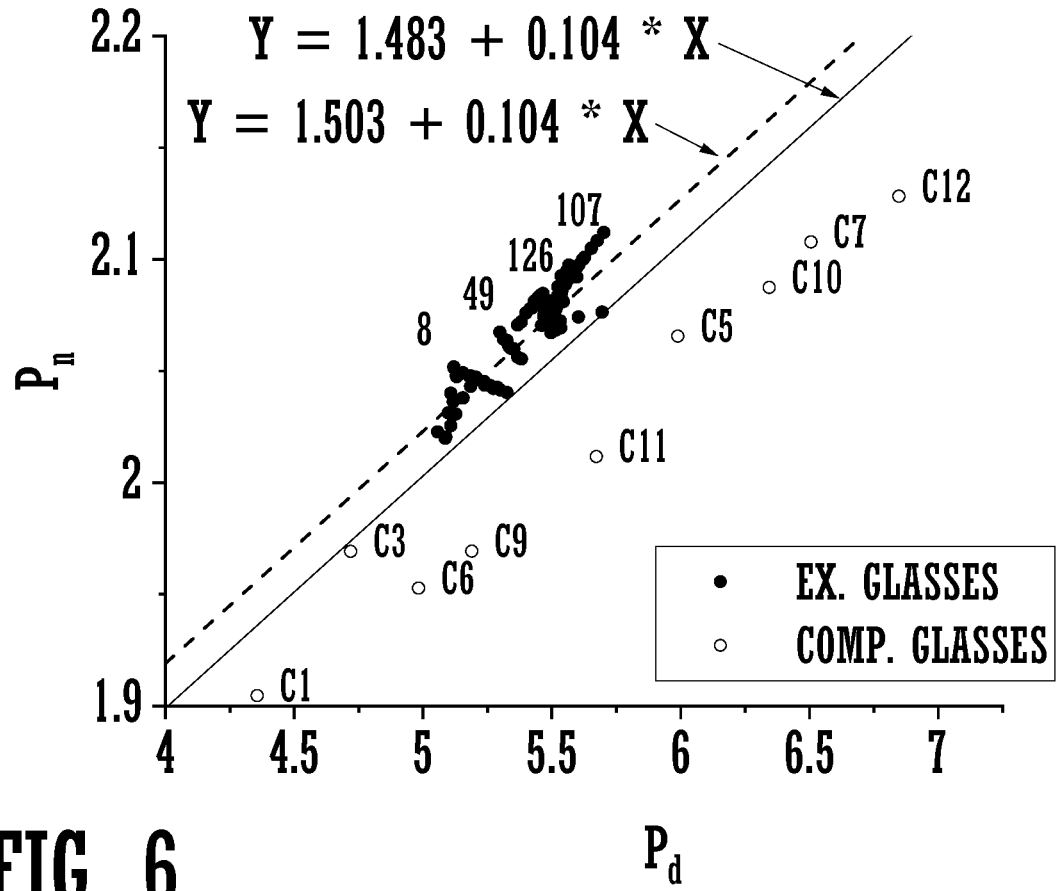
FIG. 6 is a plot illustrating the relationship between the density parameter $P_d$ and the refractive index parameter $P_n$ for some Comparative Glasses and some Exemplary Glasses according to an embodiment of the present disclosure.

FIG. 6 is a plot showing the relationship between the density parameter $P_d$ and the refractive index parameter $P_n$ for some of the Exemplary Glasses and some of the Comparative Glasses. The Exemplary Glasses (filled circles) are the Examples 1, 4 to 8, 26 to 39, 41 to 61, 63 to 72, 74 to 108, 116, 117, 124 to 126, 139 to 160, 163 to 167, and 179 to 188 from Table 6. The Comparative Glasses (open circles) are the Examples C1 to C12 from Table 7. The density parameter $P_d$ that predicts density at room temperature was determined according to Formula (V). The refractive index parameter $P_n$ that predicts refractive index at 587.56 nm was determined according to Formula (IV). All of the Exemplary Glasses and Comparative Glasses shown in FIG. 6 have the features specified in Table 8. In Table 8, "Not limited" refers to a limitation that was not considered when selecting the compositions.

TABLE 8

| | Limitations for glass compositions shown in FIG. 6 | | |
|---|---|---|---|
| Quantity | Unit | Min | Max |
| $B_2O_3$ | mol. % | 10 | 40 |
| $Bi_2O_3$ | mol. % | 0.5 | 20 |
| $P_2O_5$ | mol. % | 0 | 3 |
| Cu | at. % | 0 | 1 |
| Fe | at. % | 0 | 1 |
| BaO + SrO + ZnO + CdO | mol. % | 0 | 25 |
| $MoO_3 + V_2O_5$ | mol. % | 0 | 5 |
| $TiO_2 - Nb_2O_5$ | mol. % | Not limited | 5 |
| $SiO_2 - B_2O_3$ | mol. % | Not limited | 5 |
| $P_n$ | | 1.9 | Not limited |

The above-enumerated Comparative Glasses were selected as having the highest refractive index parameter $P_n$ at comparable values of density parameter $P_d$ among the known glasses that have the features specified in Table 8.

The line corresponding to the formula y=1.483+0.104*x shown in FIG. 6 provides a visual representation of the differences between the Comparative Glasses having the features specified in Table 8 and the Exemplary Glasses 1, 4 to 8, 26 to 39, 41 to 61, 63 to 72, 74 to 108, 116, 117, 124 to 126, 139 to 160, 163 to 167 and 179-188. As can be seen in FIG. 6, the mentioned Exemplary Glasses (filled circles) and none of the Comparative Glasses (open circles) repre-sented in FIG. 6 fall above the line y=1.483+0.104*x, where y corresponds to the refractive index parameter $P_n$ and x corresponds to the density parameter $P_d$. In other words, some of the Exemplary Glasses and none of the Compara-tive Glasses represented in FIG. 6 satisfy the following formula (VII)(a):

$$P_n - (1.483 + 0.104 * P_d) > 0.00 \qquad \text{(VII)(a)}$$

As can also be seen in FIG. 6, some of Exemplary Glasses and none of the Comparative Glasses represented in FIG. 6 fall above the line y=1.503+0.104*x, where y corresponds to the refractive index parameter $P_n$ and x corresponds to the density parameter $P_d$. In other words, some of the Exem-plary Glasses and none of the Comparative Glasses repre-sented in FIG. 6 satisfy the following formula (VII)(b):

$$P_n - (1.503 + 0.104 * P_d) > 0.00 \qquad \text{(VII)(b)}$$

The Exemplary Examples represented in FIG. 6 are accordingly, by prediction, superior in terms of the combination of $d_{RT}$ and $n_d$ to the best known Comparative Glasses that have the features specified in Table 8.

Figure 7:
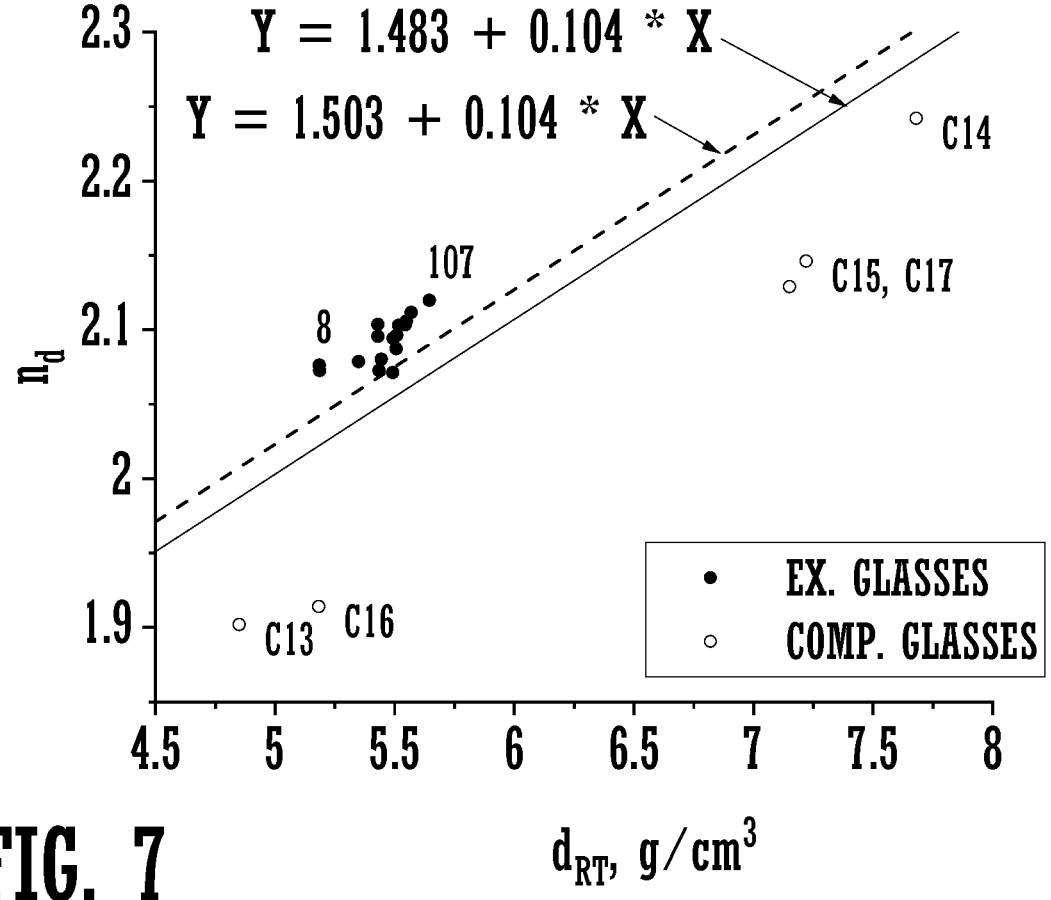
FIG. 7 is a plot illustrating the relationship between the density at room temperature $d_{RT}$ and the refractive index at 587.56 nm $n_d$ for some Comparative Glasses and some Exemplary Glasses according to an embodiment of the present disclosure.

FIG. 7 is a plot showing the relationship between the density at room temperature $d_{RT}$ and the refractive index at 587.56 nm $n_d$ for some of the Exemplary Glasses and some of the Comparative Glasses. The Exemplary Glasses (filled circles) are the Examples 6, 8, 63, 65, 78, 80, 83, 86, 93, 97, 104, 107, and 156 from Table 6. The Comparative Glasses (open circles) are the Examples C13 to C17 from Table 7. All of the Exemplary Glasses and Comparative Glasses shown in FIG. 7 have the features specified in Table 9. In Table 9, the specification "Not limited", if appears, refers to a limitation that was not considered when selecting the compositions. In FIG. 7, some of the above-enumerated compositions may be labeled for better visibility, some others may not, and some more glasses may not be shown, which does not affect the further conclusions.

TABLE 9

Limitations for glass compositions shown in FIG. 7

| Quantity | Unit | Min | Max |
|---|---|---|---|
| $B_2O_3$ | mol. % | 10 | 40 |
| $Bi_2O_3$ | mol. % | 0.5 | 20 |
| $P_2O_5$ | mol. % | 0 | 3 |
| Cu | at. % | 0 | 1 |
| Fe | at. % | 0 | 1 |
| BaO + SrO + ZnO + CdO | mol. % | 0 | 25 |
| $MoO_3 + V_2O_5$ | mol. % | 0 | 5 |
| $TiO_2 - Nb_2O_5$ | mol. % | Not limited | 5 |
| $SiO_2 - B_2O_3$ | mol. % | Not limited | 5 |
| $n_d$ | | 1.9 | Not limited |

The above-enumerated Comparative Glasses were selected as having the highest measured values of the refractive index at 587.56 nm $n_d$ at comparable values of the density at room temperature $d_{RT}$ among the known glasses that have the mentioned features specified in Table 9.

The line corresponding to the formula y=1.483+0.104*x shown in FIG. 7 provides a visual representation of the differences between the Comparative Glasses having the features specified in Table 9 and the Exemplary Glasses 6, 8, 63, 65, 78, 80, 83, 86, 93, 97, 104, 107, and 156 according to the present disclosure. As can be seen in FIG. 7, the mentioned Exemplary Glasses (filled circles) and none of the Comparative Glasses (open circles) represented in FIG. 7 fall above the line y=1.483+0.104*x, where y corresponds to $n_d$ and x corresponds to $d_{RT}$. In other words, some of the Exemplary Glasses and none of the Comparative Glasses represented in FIG. 7 satisfy the following formula (VIII)(a):

$$n_d-(1.483+0.104*d_{RT})>0.00 \qquad \text{(VIII)(a)}$$

As can also be seen in FIG. 7, some of Exemplary Glasses and none of the Comparative Glasses represented in FIG. 7 fall above the line y=1.503+0.104*x, where y corresponds to $n_d$ and x corresponds to $d_{RT}$. In other words, the said Exemplary Glasses and none of the Comparative Glasses represented in FIG. 7 satisfy the following formula (VIII)(b):

$$n_d-(1.503+0.104*d_{RT})>0.00 \qquad \text{(VIII)(b)}$$

The Exemplary Examples represented in FIG. 7 that satisfy the formula (VIII)(b) are characterized by the highest values of $n_d$ at comparable values of $d_{RT}$ among the glasses that have the features specified in Table 9.

This means that, under the conditions specified in Table 9 above, some of the Exemplary Glasses have higher measured values of the refractive index at 587.56 nm $n_d$ at comparable measured values of the density at room temperature $d_{RT}$ than the best of the Comparative Glasses satisfying the same conditions. This can be interpreted as these Exemplary Glasses, according to measurements, have higher values of $n_d$ at comparable values of $d_{RT}$ among the glasses, i.e. they are, according to measurement, superior in terms of combination of $d_{RT}$ and $n_d$ to the best known Comparative Glasses that have the features specified in Table 9.

The values of all attributes specified in Tables 8 and 9 and Formulas (VII)(a), (VII)(b), (VIII)(a) and (VIII)(b) for the Comparative Glasses C1 to C17 plotted in FIGS. 6 and 7 are presented in Table 10 below. Full compositions of comparative example glasses are presented in Table 7. Full compositions and above-mentioned attributes of the Exemplary Glasses from the present disclosure are presented in Table 6.

TABLE 10

Attributes of Comparative Example Glasses Having the Features Specified in Tables 8 and 9

| Ex. # | | C1 | C2 | C3 | C4 | C5 | C6 | C7 | C8 |
|---|---|---|---|---|---|---|---|---|---|
| | | | | | Composition | | | | |
| $Bi_2O_3$ | mol. % | 10.73 | 20.00 | 13.36 | 18.09 | 17.81 | 13.04 | 4.00 | 17.17 |
| $P_2O_5$ | mol. % | 0 | 0 | 0 | 0 | 0 | 0 | 0 | 0 |
| Cu | mol. % | 0 | 0 | 0 | 0 | 0 | 0 | 0 | 0 |
| Fe | mol. % | 0 | 0 | 0 | 0 | 0 | 0 | 0 | 0 |
| BaO + SiO + ZnO + CdO | mol. % | 0 | 0 | 0 | 0 | 0 | 21.74 | 2.56 | 0 |
| $MoO_3 + V_2O_5$ | mol. % | 0 | 0 | 0 | 0 | 1.14 | 0 | 0 | 2.67 |
| $TiO_2 - Nb_2O_5$ | mol. % | 0 | 0 | 0 | 0 | 0 | 0 | 0 | 0 |
| $SiO_2 - B_2O_3$ | mol. % | −39.48 | −10.00 | −32.63 | −13.84 | −28.93 | −30.43 | −11.52 | −13.93 |
| | | | | | Measured properties | | | | |
| $d_{RT}$ | g/cm$^3$ | | | | | | | | |
| $n_d$ | | | | | | | | | |
| $n_d - (1.483 + 0.104 * d_{RT})$ | | | | | | | | | |
| $n_d - (1.503 + 0.104 * d_{RT})$ | | | | | | | | | |
| | | | | | Predicted and calculated properties | | | | |
| $P_d$ | g/cm$^3$ | 4.3564 | 8.0567 | 4.7191 | 7.2942 | 5.9888 | 4.9829 | 6.5057 | 7.6254 |
| $P_n$ | | 1.9046 | 2.2772 | 1.9692 | 2.2114 | 2.0656 | 1.9528 | 2.1077 | 2.2226 |

TABLE 10-continued

| Attributes of Comparative Example Glasses Having the Features Specified in Tables 8 and 9 | | | | | | | | | |
|---|---|---|---|---|---|---|---|---|---|
| $P_n - (1.483 + 0.104 * P_d)$ | | −0.0314 | −0.0437 | −0.0046 | −0.0302 | −0.0403 | −0.0485 | −0.0518 | −0.0534 |
| $P_n - (1.503 + 0.104 * P_d)$ | | −0.0514 | −0.0637 | −0.0246 | −0.0502 | −0.0603 | −0.0685 | −0.0718 | −0.0734 |
| Ex. # | | C9 | C10 | C11 | C12 | C13 | C14 | C15 | C16 | C17 |
| Composition | | | | | | | | | | |
| $Bi_2O_3$ | mol. % | 3.95 | 1.16 | 8.01 | 14.89 | 0.85 | 10.00 | 10.26 | 3.92 | 10.00 |
| $P_2O_5$ | mol. % | 0 | 0 | 0 | 0 | 0 | 0 | 0 | 1.96 | 0 |
| Cu | mol. % | 0 | 0.82 | 0.0565 | 0 | 0 | 0 | 0 | 0 | 0 |
| Fe | mol. % | 0 | 0.54 | 0 | 0 | 0 | 0 | 0 | 0 | 0 |
| BaO + SrO + ZnO + CdO | mol. % | 0 | 0 | 0 | 24.35 | 0 | 0 | 0 | 21.57 | 0 |
| $MoO_3 + V_2O_5$ | mol. % | 0 | 0 | 0 | 0 | 0 | 0 | 0 | 0 | 0 |
| $TiO_2 - Nb_2O_5$ | mol. % | −14.07 | 0 | 0 | 0 | −3.185 | 0 | 0 | 0 | 0 |
| $SiO_2 - B_2O_3$ | mol. % | −26.42 | −12.22 | −28.02 | −14.23 | −16.20 | −20.00 | −20.71 | −23.53 | −30.00 |
| Measured properties | | | | | | | | | | |
| $d_{RT}$ | $g/cm^3$ | | | | | 4.850 | 7.680 | 7.220 | 5.183 | 7.151 |
| $n_d$ | | | | | | 1.902 | 2.242 | 2.1462 | 1.9141 | 2.1289 |
| $n_d - (1.483 + 0.104 * d_{RT})$ | | | | | | −0.0854 | −0.0397 | −0.0877 | −0.1079 | −0.0978 |
| $n_d - (1.503 + 0.104 * d_{RT})$ | | | | | | −0.1054 | −0.0597 | −0.1077 | −0.1279 | −0.1178 |
| Predicted and calculated properties | | | | | | | | | | |
| $P_d$ | $g/cm^3$ | 5.1891 | 6.3436 | 5.673 | 6.8474 | 5.2546 | 7.0621 | 6.9251 | 5.0794 | 6.4949 |
| $P_n$ | | 1.9693 | 2.0874 | 2.0117 | 2.1282 | 1.9542 | 2.1293 | 2.1128 | 1.7669 | 2.0525 |
| $P_n - (1.483 + 0.104 * P_d)$ | | −0.0534 | −0.0553 | −0.0613 | −0.0669 | −0.0753 | −0.0882 | −0.0904 | −0.2444 | −0.1060 |
| $P_n - (1.503 + 0.104 * P_d)$ | | −0.0734 | −0.0753 | −0.0813 | −0.0869 | −0.0953 | −0.1082 | −0.1104 | −0.2644 | −0.1260 |

As follows from FIGS. 6 and 7, both predicted and measured property data confirms that some of the Exemplary Glasses have a better combination of density at room temperature $d_{RT}$ and refractive index at 587.56 nm $n_d$ (higher $n_d$ for a given $d_{RT}$) than the best of the Comparative Glasses that have the features specified in Tables 8 and 9 accordingly.

Figure 8:
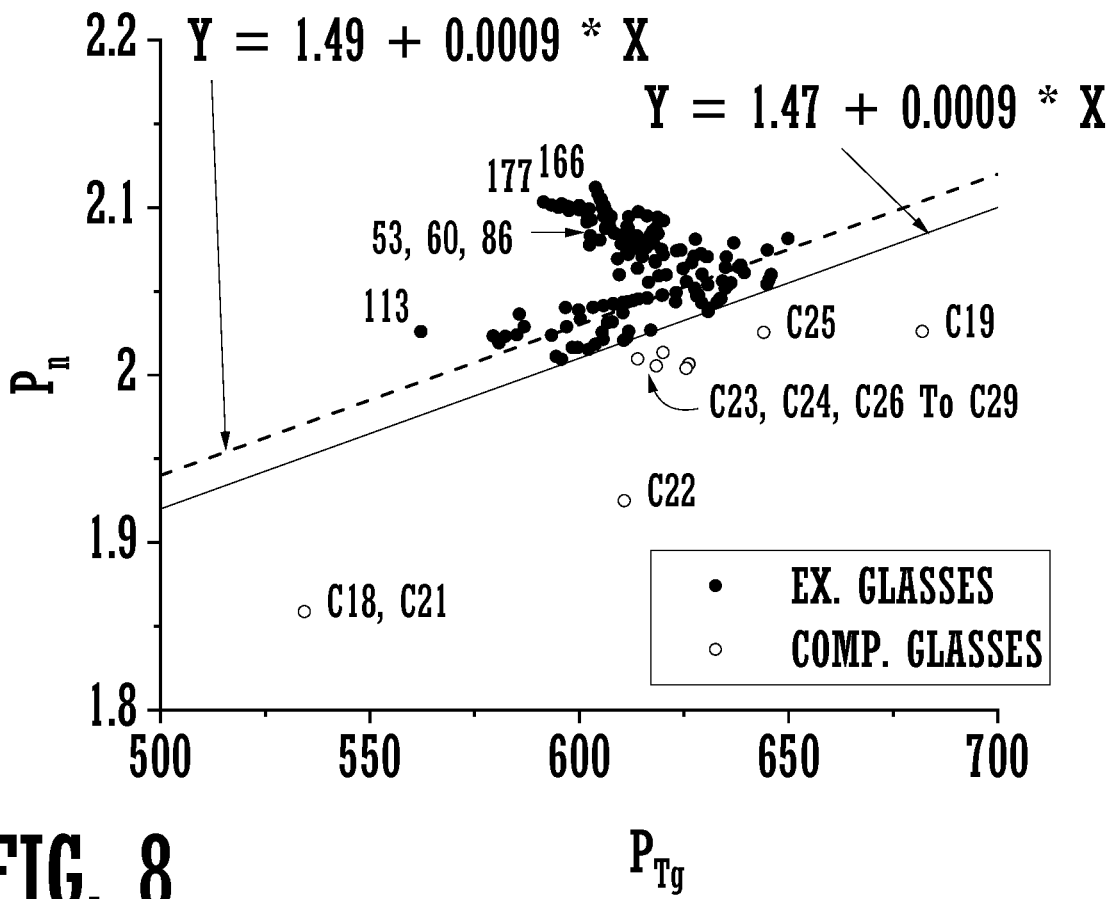
FIG. 8 is a plot illustrating the relationship between the $T_g$ parameter $P_{Tg}$ and the refractive index parameter $P_n$ for some Comparative Glasses and some Exemplary Glasses according to an embodiment of the present disclosure.

FIG. 8 is a plot showing the relationship between the $T_g$ parameter $P_{Tg}$ and the refractive index parameter $P_n$ for some of the Exemplary Glasses and some of the Comparative Glasses. The Exemplary Glasses (filled circles) are the Examples 1 to 21, 23 to 138, 145 to 160, 162 to 166, 168 to 177, and 177 to 184 from Table 6. The Comparative Glasses (open circles) are the Examples C18 to C29 from Table 7. The $T_g$ parameter $P_{Tg}$ that predicts glass transition temperature was determined according to Formula (VI). The refractive index parameter $P_n$ that predicts refractive index at 587.56 nm was determined according to Formula (IV). All of the Exemplary Glasses and Comparative Glasses shown in FIG. 8 have the features specified in Table 11. In Table 11, the specification "Not limited" refers to a limitation that was not considered when selecting the compositions.

TABLE 11

| Limitations for glass compositions shown in FIG. 8 | | | |
|---|---|---|---|
| Quantity | Unit | Min | Max |
| $B_2O_3$ | mol. % | 10 | Not limited |
| $Nb_2O_5$ | mol. % | 3 | 30 |
| $TiO_2$ | mol. % | 0 | 40 |
| $La_2O_3$ | mol. % | 0 | 25 |
| $Bi_2O_3$ | mol. % | 0 | 15 |
| $TeO_2$ | mol. % | 0 | 14 |
| $P_2O_5$ | mol. % | 0 | 10 |
| $GeO_2$ | mol. % | 0 | 10 |
| $WO_3 + Bi_2O_3$ | mol. % | 2 | Not limited |
| $TiO_2 + ZrO_2$ | mol. % | 2 | Not limited |
| $TiO_2 + Nb_2O_5$ | mol. % | 1 | Not limited |
| BaO + ZnO | mol. % | 0 | 20 |

TABLE 11-continued

| Limitations for glass compositions shown in FIG. 8 | | | |
|---|---|---|---|
| Quantity | Unit | Min | Max |
| $Nb_2O_5 - SiO_2$ | mol. % | 3 | Not limited |
| $P_{Tg}$ | ° C. | 500 | 750 |

The above-enumerated Comparative Glasses were selected as having the highest refractive index parameter $P_n$ at comparable values of $T_g$ parameter $P_{Tg}$ among the known glasses that have the features specified in Table 11.

The line corresponding to the formula y=1.47+0.0009*x shown in FIG. 8 provides a visual representation of the differences between the Comparative Glasses having the features specified in Table 11 and the Exemplary Glasses 1 to 21, 23 to 138, 145 to 160, 162 to 166, 168 to 177, and 179-184. As can be seen in FIG. 8, the mentioned Exemplary Glasses (filled circles) and none of the Comparative Glasses (open circles) represented in FIG. 8 fall above the line y=1.47+0.0009*x, where y corresponds to the refractive index parameter $P_n$ and x corresponds to the $T_g$ parameter $P_{Tg}$. In other words, some of the Exemplary Glasses and none of the Comparative Glasses represented in FIG. 8 satisfy the following formula (IX)(a):

$$P_n - (1.47 + 0.0009 * P_{Tg}) > 0.00 \tag{IX)(a}$$

As can also be seen in FIG. 8, some of Exemplary Glasses and none of the Comparative Glasses represented in FIG. 8 fall above the line y=1.49+0.0009*x, where y corresponds to the refractive index parameter $P_n$ and x corresponds to the $T_g$ parameter $P_{Tg}$. In other words, some of the Exemplary Glasses and none of the Comparative Glasses represented in FIG. 8 satisfy the following formula (IX)(b):

$$P_n - (1.49 + 0.0009 * P_{Tg}) > 0.00 \tag{IX)(b}$$

The Exemplary Examples represented in FIG. 8 are accordingly, by prediction, superior in terms of the combination of $T_g$ and $n_d$ to the best known Comparative Glasses that have the features specified in Table 11.

Figure 9:
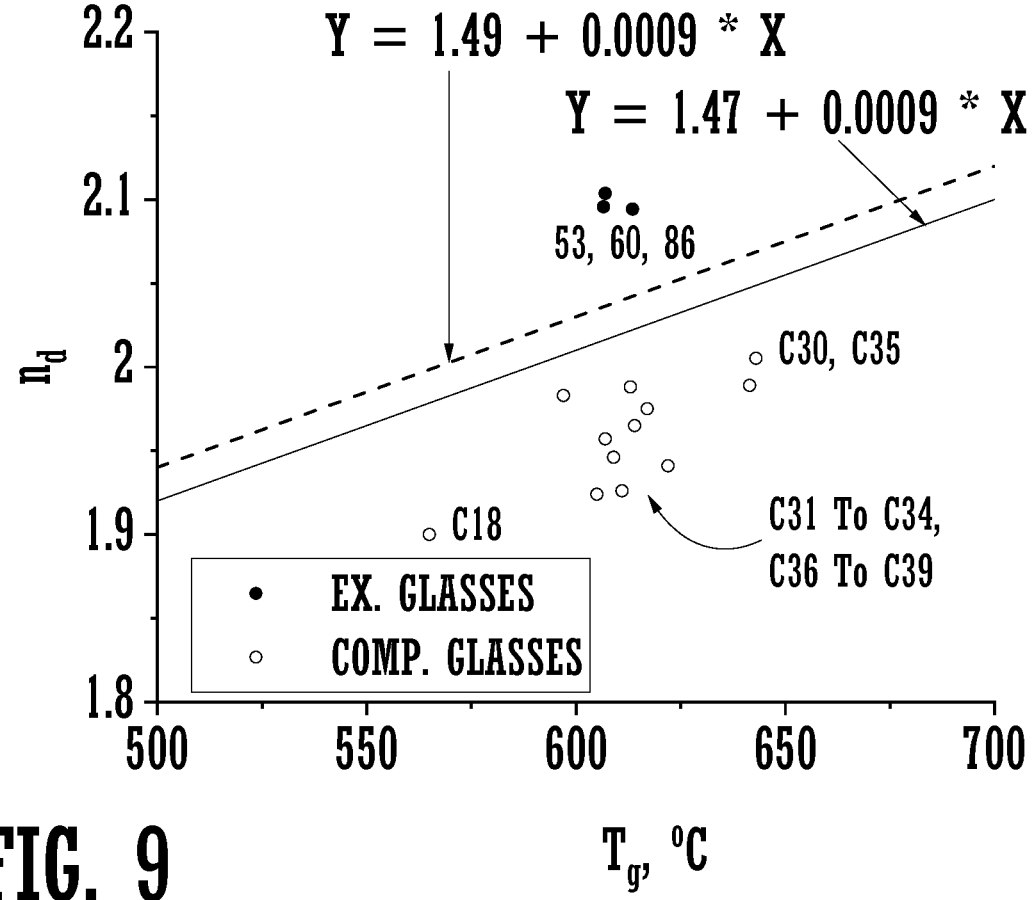
FIG. 9 is a plot illustrating the relationship between the glass transition temperature $T_g$ and the refractive index at 587.56 nm $n_d$ for some Comparative Glasses and some Exemplary Glasses according to an embodiment of the present disclosure.

FIG. 9 is a plot showing the relationship between the glass transition temperature $T_g$ and the refractive index at 587.56 nm $n_d$ for some of the Exemplary Glasses and some of the Comparative Glasses. The Exemplary Glasses (filled circles) are the Examples 53, 60, and 86 from Table 6. The Comparative Glasses (open circles) are the Examples C18, C22 and C30 to C39 from Table 7. All of the Exemplary Glasses and Comparative Glasses shown in FIG. 9 have the features specified in Table 12. In Table 12, "Not limited" refers to a limitation that was not considered when selecting the compositions. In FIG. 9, some of the above-enumerated compositions may be labeled for better visibility, some others may not, and some more glasses may not be shown, which does not affect the further conclusions.

TABLE 12

| Limitations for glass compositions shown in FIG. 9 | | | |
| --- | --- | --- | --- |
| Quantity | Unit | Min | Max |
| $B_2O_3$ | mol. % | 10 | Not limited |
| $Nb_2O_5$ | mol. % | 3 | 30 |
| $TiO_2$ | mol. % | 0 | 40 |
| $La_2O_3$ | mol. % | 0 | 25 |
| $Bi_2O_3$ | mol. % | 0 | 15 |
| $TeO_2$ | mol. % | 0 | 14 |
| $P_2O_5$ | mol. % | 0 | 10 |
| $GeO_2$ | mol. % | 0 | 10 |
| $WO_3 + Bi_2O_3$ | mol. % | 2 | Not limited |
| $TiO_2 + ZrO_2$ | mol. % | 2 | Not limited |
| $TiO_2 + Nb_2O_5$ | mol. % | 1 | Not limited |
| $BaO + ZnO$ | mol. % | 0 | 20 |
| $Nb_2O_5 - SiO_2$ | mol. % | 3 | Not limited |
| $T_g$ | ° C. | 500 | 750 |

The above-enumerated Comparative Glasses were selected as having the highest measured values of the refractive index at 587.56 nm $n_d$ at comparable values of the glass transition temperature $T_g$ among the known glasses that have the mentioned features specified in Table 12.

The line corresponding to the formula y=1.47+0.0009*x shown in FIG. 9 provides a visual representation of the differences between the Comparative Glasses having the features specified in Table 12 and the Exemplary Glasses 53, 60, and 86 according to the present disclosure. As can be seen in FIG. 9, the mentioned Exemplary Glasses (filled circles) and none of the Comparative Glasses (open circles) represented in FIG. 9 fall above the line y=1.47+0.0009*x, where y corresponds to $n_d$ and x corresponds to $T_g$. In other words, some of the Exemplary Glasses and none of the Comparative Glasses represented in FIG. 9 satisfy the following formula (X)(a):

$$n_d-(1.47+0.0009*T_g)>0.00 \qquad (X)(a)$$

As can also be seen in FIG. 9, some of Exemplary Glasses and none of the Comparative Glasses represented in FIG. 9 fall above the line y=1.49+0.0009*x, where y corresponds to $n_d$ and x corresponds to $T_g$. In other words, the said Exemplary Glasses and none of the Comparative Glasses represented in FIG. 9 satisfy the following formula (X)(b):

$$n_d-(1.49+0.0009*T_g)>0.00 \qquad (X)(b)$$

The Exemplary Examples represented in FIG. 9 that satisfy the formula (X)(b) are characterized by the highest values of $n_d$ at comparable values of $T_g$ among the glasses that have the features specified in Table 12.

This means that, under the conditions specified in Table 12 above, some of the Exemplary Glasses have higher measured values of the refractive index at 587.56 nm $n_d$ at comparable measured values of the glass transition temperature $T_g$ than the best of the Comparative Glasses satisfying the same conditions. This can be interpreted as these Exemplary Glasses, according to measurements, have higher values of $n_d$ at comparable values of $T_g$ among the said glasses, i.e. they are, according to measurement, superior in terms of combination of $T_g$ and $n_d$ to the best known Comparative Glasses that have the features specified in Table 12.

The values of all attributes specified in Tables 11 and 12 and Formulas (IX)(a), (IX)(b), (X)(a) and (X)(b) for the Comparative Glasses C18 to C39 plotted in FIGS. 8 and 9 are presented in Table 13 below. Full compositions of comparative example glasses are presented in Table 7. Full compositions and above-mentioned attributes of the Exemplary Glasses from the present disclosure are presented in Table 6.

TABLE 13

| Attributes of Comparative Example Glasses Having the Features Specified in Tables 11 and 12 | | | | | | | | | |
| --- | --- | --- | --- | --- | --- | --- | --- | --- | --- |
| Ex. # | | C18 | C19 | C20 | C21 | C22 | C23 | C24 | C25 |
| Composition | | | | | | | | | |
| $Nb_2O_5$ | mol. % | 6.00 | 8.32 | 8.99 | 6.00 | 15.00 | 6.23 | 8.98 | 15.99 |
| $TiO_2$ | mol. % | 0 | 0 | 4.84 | 0 | 10.00 | 9.97 | 7.01 | 10.00 |
| $La_2O_3$ | mol. % | 16.00 | 24.58 | 21.52 | 16.00 | 15.00 | 21.50 | 20.86 | 19.99 |
| $Bi_2O_3$ | mol. % | 5.00 | 0 | 0 | 5.00 | 0 | 0 | 0 | 0 |
| $TeO_2$ | mol. % | 9.00 | 0 | 0 | 9.00 | 0 | 0 | 0 | 0 |
| $P_2O_5$ | mol. % | 0 | 0 | 0 | 0 | 0 | 0 | 0 | 0 |
| $GeO_2$ | mol. % | 0 | 0 | 0 | 0 | 0 | 0 | 0 | 0 |
| $WO_3 + Bi_2O_3$ | mol. % | 5.00 | 15.08 | 28.11 | 5.00 | 13.00 | 26.34 | 25.93 | 17.99 |
| $TiO_2 + ZrO_2$ | mol. % | 3.00 | 6.20 | 11.83 | 3.00 | 10.00 | 16.96 | 14.00 | 17.00 |
| $TiO_2 + Nb_2O_5$ | mol. % | 6.00 | 8.32 | 13.83 | 6.00 | 25.00 | 16.20 | 15.99 | 25.99 |
| $BaO + ZnO$ | mol. % | 18.00 | 0 | 0 | 18.00 | 7.00 | 0 | 0 | 0 |
| $Nb_2O_5 - SiO_2$ | mol. % | 6.000 | 8.320 | 7.550 | 6.000 | 15.00 | 4.143 | 6.866 | 15.96 |
| Measured properties | | | | | | | | | |
| $T_g$ | ° C. | 565.0 | 679.0 | | | 614.0 | | | |
| $n_d$ | | 1.900 | 1.953 | | | 1.965 | | | |
| $n_d - (1.47 + 0.0009 * T_g)$ | | −0.0785 | −0.1281 | | | −0.0576 | | | |
| $n_d - (1.49 + 0.0009 * T_g)$ | | −0.0985 | −0.1481 | | | −0.0776 | | | |

TABLE 13-continued

Attributes of Comparative Example Glasses Having the Features Specified in Tables 11 and 12

| Predicted and calculated properties | | | | | | | | | |
|---|---|---|---|---|---|---|---|---|---|
| $P_{Tg}$ | ° C. | 534.3 | 682.0 | 614.0 | 534.3 | 610.8 | 620.0 | 618.5 | 644.1 |
| $P_n$ | | 1.8586 | 2.026 | 2.0096 | 1.8586 | 1.9249 | 2.0135 | 2.0054 | 2.0255 |
| $P_n - (1.47 + 0.0009 * P_{Tg})$ | | −0.0923 | −0.0577 | −0.0129 | −0.0923 | −0.0948 | −0.0146 | −0.0212 | −0.0242 |
| $P_n - (1.49 + 0.0009 * P_{Tg})$ | | −0.1123 | −0.0777 | −0.0329 | −0.1123 | −0.1148 | −0.0346 | −0.0412 | −0.0442 |

| Ex. # | | C26 | C27 | C28 | C29 | C30 | C31 | C32 | C33 |
|---|---|---|---|---|---|---|---|---|---|
| Composition | | | | | | | | | |
| $Nb_2O_5$ | mol. % | 6.90 | 6.92 | 7.78 | 7.79 | 15.00 | 20.00 | 20.00 | 15.00 |
| $TiO_2$ | mol. % | 13.12 | 13.08 | 11.82 | 11.77 | 8.99 | 10.00 | 10.00 | 15.00 |
| $La_2O_3$ | mol. % | 19.99 | 19.96 | 19.98 | 19.97 | 19.99 | 15.00 | 15.00 | 15.00 |
| $Bi_2O_3$ | mol. % | 0 | 0 | 0 | 0 | 0 | 0 | 0 | 0 |
| $TeO_2$ | mol. % | 0 | 0 | 0 | 0 | 0 | 6.00 | 0 | 0 |
| $P_2O_5$ | mol. % | 0 | 0 | 0 | 0 | 0 | 0 | 0 | 0 |
| $GeO_2$ | mol. % | 0 | 0 | 0 | 0 | 0 | 0 | 0 | 0 |
| $WO_3 + Bi_2O_3$ | mol. % | 22.98 | 22.96 | 22.98 | 22.96 | 15.99 | 2.00 | 8.00 | 8.00 |
| $TiO_2 + ZrO_2$ | mol. % | 20.11 | 20.06 | 18.81 | 18.77 | 16.00 | 10.00 | 10.00 | 15.00 |
| $TiO_2 + Nb_2O_5$ | mol. % | 20.02 | 19.99 | 19.59 | 19.57 | 23.99 | 30.00 | 30.00 | 30.00 |
| $BaO + ZnO$ | mol. % | 0.0115 | 0 | 0.0116 | 0 | 0 | 7.00 | 7.00 | 7.00 |
| $Nb_2O_5 - SiO_2$ | mol. % | 3.403 | 3.393 | 4.518 | 4.502 | 14.97 | 20.00 | 20.00 | 15.00 |
| Measured properties | | | | | | | | | |
| $T_g$ | ° C. | | | | | 643.0 | 597.0 | 613.0 | 617.0 |
| $n_d$ | | | | | | 2.0051 | 1.983 | 1.988 | 1.975 |
| $n_d - (1.47 + 0.0009 * T_g)$ | | | | | | −0.0436 | −0.0243 | −0.0337 | −0.0503 |
| $n_d - (1.49 + 0.0009 * T_g)$ | | | | | | −0.0636 | −0.0443 | −0.0537 | −0.0703 |
| Predicted and calculated properties | | | | | | | | | |
| $P_{Tg}$ | ° C. | 626.3 | 626.2 | 625.6 | 625.6 | 642.6 | 615.5 | 628.5 | 626.4 |
| $P_n$ | | 2.0066 | 2.0064 | 2.0041 | 2.0039 | 1.995 | 1.9109 | 1.9344 | 1.9296 |
| $P_n - (1.47 + 0.0009 * P_{Tg})$ | | −0.0270 | −0.0271 | −0.0290 | −0.0291 | −0.0533 | −0.1131 | −0.1012 | −0.1042 |
| $P_n - (1.49 + 0.0009 * P_{Tg})$ | | −0.0470 | −0.0471 | −0.0490 | −0.0491 | −0.0733 | −0.1331 | −0.1212 | −0.1242 |

| Ex. # | | C34 | C35 | C36 | C37 | C38 | C39 |
|---|---|---|---|---|---|---|---|
| Composition | | | | | | | |
| $Nb_2O_5$ | mol. % | 15.00 | 8.99 | 10.00 | 10.00 | 10.00 | 8.40 |
| $TiO_2$ | mol. % | 10.00 | 9.98 | 15.00 | 10.00 | 10.00 | 10.00 |
| $La_2O_3$ | mol. % | 15.00 | 19.97 | 15.00 | 20.00 | 15.00 | 18.50 |
| $Bi_2O_3$ | mol. % | 0 | 0 | 0 | 0 | 0 | 0 |
| $TeO_2$ | mol. % | 0 | 0 | 0 | 0 | 0 | 0 |
| $P_2O_5$ | mol. % | 0 | 0 | 0 | 0 | 0 | 0 |
| $GeO_2$ | mol. % | 0 | 0 | 0 | 0 | 0 | 0 |
| $WO_3 + Bi_2O_3$ | mol. % | 8.00 | 22.97 | 8.00 | 8.00 | 8.00 | 8.00 |
| $TiO_2 + ZrO_2$ | mol. % | 10.00 | 16.97 | 15.00 | 10.00 | 10.00 | 10.00 |
| $TiO_2 + Nb_2O_5$ | mol. % | 25.00 | 18.97 | 25.00 | 20.00 | 20.00 | 18.40 |
| $BaO + ZnO$ | mol. % | 12.00 | 0 | 12.00 | 12.00 | 17.00 | 15.00 |
| $Nb_2O_5 - SiO_2$ | mol. % | 15.00 | 5.987 | 10.00 | 10.00 | 10.00 | 8.400 |
| Measured properties | | | | | | | |
| $T_g$ | ° C. | 607.0 | 641.5 | 609.0 | 622.0 | 605.0 | 611.0 |
| $n_d$ | | 1.957 | 1.9889 | 1.946 | 1.941 | 1.924 | 1.926 |
| $n_d - (1.47 + 0.0009 * T_g)$ | | −0.0593 | −0.0584 | −0.0721 | −0.0888 | −0.0905 | −0.0939 |
| $n_d - (1.49 + 0.0009 * T_g)$ | | −0.0793 | −0.0784 | −0.0921 | −0.1088 | −0.1105 | −0.1139 |
| Predicted and calculated properties | | | | | | | |
| $P_{Tg}$ | ° C. | 611.8 | 624.7 | 609.8 | 622.5 | 595.2 | 609.2 |
| $P_n$ | | 1.9143 | 2.0002 | 1.9094 | 1.9187 | 1.8942 | 1.905 |
| $P_n - (1.47 + 0.0009 * P_{Tg})$ | | −0.1063 | −0.0320 | −0.1094 | −0.1116 | −0.1114 | −0.1133 |
| $P_n - (1.49 + 0.0009 * P_{Tg})$ | | −0.1263 | −0.0520 | −0.1294 | −0.1316 | −0.1314 | −0.1333 |

As follows from FIGS. 8 and 9, both predicted and measured property data confirms that some of the Exemplary Glasses have better combination of glass transition temperature $T_g$ and refractive index at 587.56 nm $n_d$ than the best of the Comparative Glasses that have the features specified in Tables 11 and 12 accordingly.

The following non-limiting aspects are encompassed by the present disclosure. To the extent not already described, any one of the features of the first through the seventieth aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 10.0 mol. % and less than or equal to 40.0 mol. % $B_2O_3$, greater than or equal to 0.0 mol. % and less than or equal to 40.0 mol. % $WO_3$, greater than or equal to 0.0 mol. % and less than or equal to 30.0 mol. % $Nb_2O_5$, greater than or equal to 0.0 mol. % and less than or equal to 30.0 mol. % $TiO_2$, greater than or equal to 0.0 mol. % and less than or equal to 25.0 mol. % $La_2O_3$, greater than or equal to 0.0 mol. % and less than or equal to 20.0 mol. % $Bi_2O_3$, greater than or equal to 0.0 mol. % and less than or equal to 15.0 mol. % $TeO_2$, greater than or equal to 0.0 mol. % and less than or equal to 15.0 mol. % $ZrO_2$, greater than or equal to 0.0 mol. % and less than or equal to 10.0 mol. % $SiO_2$, greater than or equal to 0.0 mol. % and less than or equal to 10.0 mol. % PbO, greater than or equal to 0.0 mol. % and less than or equal to 10.0 mol. % $GeO_2$, greater than or equal to 0.0 mol. % and less than or equal to 10.0 mol. % $P_2O_5$, greater than or equal to 0.0 mol. % and less than or equal to 6.0 mol. % $Y_2O_3$, greater than or equal to 0.0 mol. % and less than or equal to 5.0 mol. % $V_2O_5$, greater than or equal to 0.1 mol. % $WO_3+Bi_2O_3$ and may optionally contain one or more components selected from rare earth metal oxides $RE_mO_n$, $Al_2O_3$, BaO, CaO, $K_2O$, $Li_2O$, MgO, $Na_2O$, SrO, $Ta_2O_5$ and ZnO, wherein the composition of the components satisfies the condition: $RE_mO_n+ZrO_2—Nb_2O_5$ [mol. %]≥5.0, and wherein the glass satisfies the conditions: $P_n>2.04$ and $-5≤P_{GF}≤15$, where $P_n$ is a refractive index parameter, calculated from the glass composition in terms of mol. % of the components according to the Formula (IV):

$$P_n=-0.0058979*Al_2O_3-0.006059*B_2O_3- \\ 0.00099077*BaO+0.008748*Bi_2O_3- \\ 0.0023394*CaO+0.0063304*Er_2O_3+ \\ 0.0019089*Gd_2O_3-0.0043254*GeO_2- \\ 0.0056788*K_2O+0.0036519*La_2O_3- \\ 0.0033647*Li_2O-0.0036379*MgO- \\ 0.0043599*Na_2O+0.0027829*Nb_2O_5- \\ 0.0085247*P_2O_5+0.0016124*PbO- \\ 0.0054718*SiO_2-0.0024916*SrO+ \\ 0.0052979*Ta_2O_5-0.0030478*TeO_2+ \\ 0.0018048*TiO_2+0.00087206*WO_3+ \\ 0.0026681*Y_2O_3+0.0052852*Yb_2O_3- \\ 0.0012391*ZnO+2.05,$$  (IV)

$P_{GF}$ is a glass formation parameter, calculated from the glass composition in terms of mol. % of the components according to the Formula (III):

$$P_{GF}=(B_2O_3/3)+max(0,WO_3—TiO_2-0.5*ZrO_2)+ \\ Nb_2O_5+Ta_2O_5—(RE_mO_n+Bi_2O_3),$$  (III)

where $RE_mO_n$ is a total sum of rare earth metal oxides, $max(0, WO_3—TiO_2-0.5*ZrO_2)$ refers to the greater of 0 and a difference $WO_3—TiO_2-0.5*ZrO_2$, and an asterisk (*) means multiplication.

According to a second aspect, the glass of the first aspect, wherein the glass has a refractive index at 587.56 nm, $n_d$ that is greater than or equal to 2.04.

According to a third aspect, the glass of any one of aspects 1-2, wherein the composition of the components comprises greater than or equal to 20.0 mol. % and less than or equal to 35.0 mol. % $B_2O_3$, greater than or equal to 10.0 mol. % and less than or equal to 25.0 mol. % $La_2O_3$, greater than or equal to 2.5 mol. % and less than or equal to 10.0 mol. % $ZrO_2$, greater than or equal to 0.3 mol. % and less than or equal to 40.0 mol. % $WO_3$, greater than or equal to 0.3 mol. % and less than or equal to 20.0 mol. % $Nb_2O_5$, greater than or equal to 0.1 mol. % and less than or equal to 15.0 mol. % $Bi_2O_3$, greater than or equal to 0.0 mol. % and less than or equal to 20.0 mol. % $TiO_2$, greater than or equal to 0.0 mol. % and less than or equal to 10.0 mol. % $TeO_2$, greater than or equal to 0.0 mol. % and less than or equal to 7.5 mol. % $SiO_2$ and greater than or equal to 0.0 mol. % and less than or equal to 4.0 mol. % $Y_2O_3$.

According to a fourth aspect, the glass of any one of aspects 1-3, wherein the composition of the components comprises one or more of the following components: greater than or equal to 23.5 mol. % and less than or equal to 32.0 mol. % $B_2O_3$, greater than or equal to 13.5 mol. % and less than or equal to 22.0 mol. % $La_2O_3$, greater than or equal to 9.0 mol. % and less than or equal to 38.0 mol. % $WO_3$, greater than or equal to 4.4 mol. % and less than or equal to 8.6 mol. % $ZrO_2$, greater than or equal to 3.0 mol. % and less than or equal to 16.0 mol. % $Nb_2O_5$, greater than or equal to 1.0 mol. % and less than or equal to 18.0 mol. % $TiO_2$, greater than or equal to 0.1 mol. % and less than or equal to 11.5 mol. % $Bi_2O_3$, greater than or equal to 0.0 mol. % and less than or equal to 8.5 mol. % $TeO_2$, greater than or equal to 0.0 mol. % and less than or equal to 5.5 mol. % $SiO_2$, greater than or equal to 0.0 mol. % and less than or equal to 3.4 mol. % $Y_2O_3$ and greater than or equal to 0.0 mol. % and less than or equal to 0.9 mol. % CaO.

According to a fifth aspect, the glass of any one of aspects 1-4, wherein the composition of the components comprises greater than or equal to 24.5 mol. % and less than or equal to 31.0 mol. % $B_2O_3$, greater than or equal to 14.25 mol. % and less than or equal to 21.0 mol. % $La_2O_3$, greater than or equal to 13.0 mol. % and less than or equal to 35.0 mol. % $WO_3$, greater than or equal to 0.1 mol. % and less than or equal to 10.0 mol. % $Bi_2O_3$, greater than or equal to 4.5 mol. % and less than or equal to 16.0 mol. % $Nb_2O_5$, greater than or equal to 0.0 mol. % and less than or equal to 5.0 mol. % $SiO_2$, greater than or equal to 3.5 mol. % and less than or equal to 15.5 mol. % $TiO_2$, greater than or equal to 5.0 mol. % and less than or equal to 8.0 mol. % $ZrO_2$, greater than or equal to 0.0 mol. % and less than or equal to 3.0 mol. % $Y_2O_3$, greater than or equal to 0.0 mol. % and less than or equal to 0.8 mol. % CaO and wherein the composition of the components is substantially free of $TeO_2$.

According to a sixth aspect, the glass of aspect 1, wherein the composition of the components comprises greater than or equal to 10.0 mol. % and less than or equal to 25.0 mol. % $Nb_2O_5$, greater than or equal to 5.0 mol. % and less than or equal to 35.0 mol. % $WO_3$, greater than or equal to 5.0 mol. % and less than or equal to 20.0 mol. % $La_2O_3$, greater than or equal to 5.0 mol. % and less than or equal to 20.0 mol. % $TiO_2$ and greater than or equal to 0.1 mol. % and less than or equal to 20.0 mol. % $Bi_2O_3$.

According to a seventh aspect, the glass of any one of aspects 1-3 and 6, wherein the composition of the components comprises greater than or equal to 5.0 mol. % and less than or equal to 20.0 mol. % $WO_3$ and greater than or equal to 1.0 mol. % and less than or equal to 15.0 mol. % $Bi_2O_3$.

According to an eighth aspect, the glass of any one of aspects 1-7, wherein the composition of the components comprises greater than or equal to 0.0 mol. % and less than or equal to 20.0 mol. % BaO, greater than or equal to 0.0 mol. % and less than or equal to 20.0 mol. % CdO, greater than or equal to 0.0 mol. % and less than or equal to 20.0 mol. % ZnO, greater than or equal to 0.0 mol. % and less than or equal to 15.0 mol. % $Li_2O+Na_2O+K_2O$ and greater than or equal to 0.0 mol. % and less than or equal to 15.0 mol. % MgO+CaO+SrO.

According to a ninth aspect, the glass of any one of aspects 1-8, wherein the composition of the components comprises greater than or equal to 0.0 mol. % and less than or equal to 5.0 mol. % $Al_2O_3$ and wherein the composition of the components satisfies the condition: $0.00≤P_2O_5/B_2O_3$ [mol. %]≤0.50.

According to a tenth aspect, the glass of any one of aspects 1-9, wherein the composition of the components comprises greater than or equal to 0.0 mol. % and less than or equal to 3.0 mol. % $MoO_3$, greater than or equal to 0.0 mol. % and less than or equal to 2.0 mol. % $Ta_2O_5$, greater than or equal to 0.0 mol. % and less than or equal to 1.0 mol. % $Sb_2O_3$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$, greater than or equal to 0.0 mol. % and less than or equal to 0.5 mol. % $FeO+Fe_2O_3$, wherein the composition of the components is substantially free of fluorine and $V_2O_5$.

According to an eleventh aspect, the glass of any one of aspects 1-10, wherein $-1 \leq P_{GF} \leq 10$.

According to a twelfth aspect, the glass of any one of aspects 1-11, wherein the glass has a density at room temperature, $d_{RT}$ that is greater than or equal to 4.5 g/cm³ and less than or equal to 6.3 g/cm³, a Young's modulus, E that is greater than or equal to 100 GPa and less than or equal to 140 GPa, a refractive index at 587.56 nm, $n_d$ that is greater than or equal to 2.0 and less than or equal to 2.2, an Abbe number, $v_d$ that is greater than or equal to 14 and less than or equal to 23 and a linear thermal expansion coefficient of glass in the range 20-300° C., $\alpha_{20-300}$ that is greater than or equal to $60 \times 10^{-7}$ K⁻¹ and less than or equal to $90 \times 10^{-7}$ K⁻¹.

According to a thirteenth aspect, the glass of any one of aspects 1-12, wherein the glass satisfies the conditions: $4.5 \leq P_d \leq 5.7$ and $2.1 \leq P_n \leq 2.2$, where $P_d$ is a density parameter, calculated from the glass composition in terms of mol. % of the components according to the Formula (V):

$$P_d=4.488-0.030315*Al_2O_3-0.023886*B_2O_3+$$
$$0.022641*BaO+0.075639*Bi_2O_3-$$
$$0.0035072*CaO+0.072631*Er_2O_3+$$
$$0.072133*Gd_2O_3-0.014396*GeO_2-$$
$$0.019374*K_2O+0.051970*La_2O_3-$$
$$0.011393*Li_2O-0.0049704*MgO-$$
$$0.010898*Na_2O+0.0014888*Nb_2O_5-$$
$$0.043265*P_2O_5+0.032783*PbO-$$
$$0.021778*SiO_2+0.0071976*SrO+$$
$$0.056465*Ta_2O_5+0.0079679*TeO_2-$$
$$0.0080419*TiO_2+0.023079*WO_3+$$
$$0.031205*Y_2O_3+0.080706*Yb_2O_3+$$
$$0.010824*ZnO+0.0073434*ZrO_2, \qquad (V)$$

where an asterisk (*) means multiplication.

According to a fourteenth aspect, the glass of any one of aspects 1-13, wherein the glass has a density at room temperature, $d_{RT}$ that is greater than or equal to 4.5 g/cm³ and less than or equal to 5.7 g/cm³ and a refractive index at 587.56 nm, $n_d$ that is greater than or equal to 2.1 and less than or equal to 2.2.

According to a fifteenth aspect, the glass of any one of aspects 1-14, wherein the glass has an Abbe number, $v_d$ that is greater than or equal to 15 and less than or equal to 21.

According to a sixteenth aspect, the glass of any one of aspects 1-15, wherein the glass has a liquidus temperature, $T_{liq}$ that is less than or equal to 1200° C., and the glass satisfies the conditions:

$$\log\left[\frac{(P_{Tg}+273)}{(T_{liq}+273)}\right] > -0.21 \text{ and } 500 \leq P_{Tg} \leq 700,$$

where $P_{Tg}$ is a $T_g$ parameter, calculated from the glass composition in terms of mol. % of the components according to the Formula (VI):

$$P_{Tg}=590+1.2049*Al_2O_3-0.73463*B_2O_3+$$
$$0.48384*BaO-4.6279*Bi_2O_3+5.1528*Er_2O_3+$$
$$4.7419*Gd_2O_3-0.46782*GeO_2-5.4336*K_2O+$$
$$3.6709*La_2O_3-4.4120*Li_2O-4.5127*Na_2O+$$
$$1.5185*Nb_2O_5-2.2882*PbO+0.18633*SiO_2+$$
$$0.59627*SrO+2.9784*Ta_2O_5-4.1591*TeO_2+$$
$$1.1157*TiO_2-2.0154*WO_3+4.7923*Y_2O_3+$$
$$3.0372*Yb_2O_3-1.8077*ZnO+0.40110*ZrO_2, \qquad (VI)$$

where an asterisk (*) means multiplication.

According to a seventeenth aspect, the glass of any one of aspects 1-16, wherein the glass has logarithmic ratio $LR(T_g, T_{liq})$ that is greater than or equal to $-0.21$, a glass transition temperature, $T_g$ that is greater than or equal to 500° C. and less than or equal to 700° C. and a liquidus temperature, $T_{liq}$ that is less than or equal to 1200° C., where the logarithmic ratio $LR(T_g, T_{liq})$ is given by Formula (I):

$$LR(T_g, T_{liq}) = \log\left[\frac{(T_g+273)}{(T_{liq}+273)}\right]. \qquad (I)$$

According to an eighteenth aspect, the glass of any one of aspects 1-17, wherein the composition of the components satisfies the conditions: $(La_2O_3+Y_2O_3)/(TiO_2+Bi_2O_3)$ [mol. %]$\geq 0.70$, $1.0 \leq Nb_2O_5/TiO_2$ [mol. %]$\leq 1.5$ and $0.00 \leq SiO_2/B_2O_3$ [mol. %]$\leq 0.40$.

According to a nineteenth aspect, the glass of any one of aspects 1-18, wherein when cooled in air from 1100° C. to 500° C. in 2.5 minutes, the glass does not crystallize.

According to a twentieth aspect, the glass of any one of aspects 1-19, wherein when having a thickness of 10 mm, the glass has wavelength corresponding to 70% total transmittance $\lambda_{70\%}$ that is less than or equal to 450 nm.

According to a twenty-first aspect, a method for manufacturing an optical element, the method comprising processing the glass of any one of aspects 1-20.

According to a twenty-second aspect, an optical element comprising the glass of any one of aspects 1-21.

According to a twenty-third aspect, the glass comprises a plurality of components, the glass having a composition of the components comprising greater than or equal to 10.0 mol. % and less than or equal to 40.0 mol. % $B_2O_3$, greater than or equal to 0.5 mol. % and less than or equal to 20.0 mol. % $Bi_2O_3$, greater than or equal to 0.0 mol. % and less than or equal to 3.0 mol. % $P_2O_5$, greater than or equal to 0.0 at. % and less than or equal to 1.0 at. % Cu, greater than or equal to 0.0 at. % and less than or equal to 1.0 at. % Fe, greater than or equal to 0.0 mol. % and less than or equal to 25.0 mol. % $BaO+SrO+ZnO+CdO$, greater than or equal to 0.0 mol. % and less than or equal to 5.0 mol. % $MoO_3+V_2O_5$ and may optionally contain one or more components selected from $TiO_2$, $Nb_2O_5$, $SiO_2$, $Al_2O_3$, CaO, $Er_2O_3$, $Gd_2O_3$, $GeO_2$, $K_2O$, $La_2O_3$, $Li_2O$, MgO, $Na_2O$, PbO, $Ta_2O_5$, $TeO_2$, $WO_3$, $Y_2O_3$, $Yb_2O_3$ and $ZrO_2$, wherein the composition of the components satisfies the conditions: $TiO_2$—$Nb_2O_5$ [mol. %]$\leq 5.0$ and $SiO_2$—$B_2O_3$ [mol. %]$\leq 5.0$, and the glass satisfies the conditions: $P_n > 1.9$ and $P_n-(1.483+0.104*P_d) > 0.000$, where $P_n$ is a refractive index parameter, calculated from the glass composition in terms of mol. % of the components according to the Formula (IV):

$$P_n=-0.0058979*Al_2O_3-0.006059*B_2O_3-$$
$$0.00099077*BaO+0.008748*Bi_2O_3-$$
$$0.0023394*CaO+0.0063304*Er_2O_3+$$
$$0.0019089*Gd_2O_3-0.0043254*GeO_2-$$
$$0.0056788*K_2O+0.0036519*La_2O_3-$$
$$0.0033647*Li_2O-0.0036379*MgO-$$
$$0.0043599*Na_2O+0.0027829*Nb_2O_5-$$
$$0.0085247*P_2O_5+0.0016124*PbO-$$
$$0.0054718*SiO_2-0.0024916*SrO+$$
$$0.0052979*Ta_2O_5-0.0030478*TeO_2+$$
$$0.0018048*TiO_2+0.00087206*WO_3+$$
$$0.0026681*Y_2O_3+0.0052852*Yb_2O_3-$$
$$0.0012391*ZnO+2.05, \qquad (IV)$$

$P_d$ is a density parameter, calculated from the glass composition in terms of mol. % of the components according to the Formula (V):

$P_d$=4.488−0.030315\*Al$_2$O$_3$−0.023886\*B$_2$O$_3$+
0.022641\*BaO+0.075639\*Bi$_2$O$_3$−
0.0035072\*CaO+0.072631\*Er$_2$O$_3$+
0.072133\*Gd$_2$O$_3$−0.014396\*GeO$_2$−
0.019374\*K$_2$O+0.051970\*La$_2$O$_3$−
0.011393\*Li$_2$O−0.0049704\*MgO−
0.010898\*Na$_2$O+0.0014888\*Nb$_2$O$_5$−
0.043265\*P$_2$O$_5$+0.032783\*PbO−
0.021778\*SiO$_2$+0.0071976\*SrO+
0.056465\*Ta$_2$O$_5$+0.0079679\*TeO$_2$−
0.0080419\*TiO$_2$+0.023079\*WO$_3$+
0.031205\*Y$_2$O$_3$+0.080706\*Yb$_2$O$_3$+
0.010824\*ZnO+0.0073434\*ZrO$_2$,     (V)

where an asterisk (\*) means multiplication.

According to a twenty-fourth aspect, the glass of the twenty-third aspect, wherein the glass has a refractive index at 587.56 nm, $n_d$ that is greater than or equal to 1.9 and wherein the glass satisfies the conditions: $n_d$−(1.483+0.104\*$d_{RT}$)>0.000, where $d_{RT}$ [g/cm$^3$] is a density at room temperature.

According to a twenty-fifth aspect, the glass of any one of aspects 23-24, wherein the glass satisfies the conditions: $n_d$−(1.503+0.104\*$d_{RT}$)>0.000, where $n_d$ is a refractive index at 587.56 nm and $d_{RT}$ [g/cm$^3$] is a density at room temperature.

According to a twenty-sixth aspect, the glass of any one of aspects 23-25, wherein the glass satisfies the condition: $P_n$−(1.503+0.104\*$P_d$)>0.000.

According to a twenty-seventh aspect, the glass of any one of aspects 23-26, wherein the composition of the components comprises greater than or equal to 20.0 mol. % and less than or equal to 35.0 mol. % B$_2$O$_3$, greater than or equal to 10.0 mol. % and less than or equal to 25.0 mol. % La$_2$O$_3$, greater than or equal to 2.5 mol. % and less than or equal to 10.0 mol. % ZrO$_2$, greater than or equal to 0.3 mol. % and less than or equal to 40.0 mol. % WO$_3$, greater than or equal to 0.5 mol. % and less than or equal to 15.0 mol. % Bi$_2$O$_3$, greater than or equal to 0.3 mol. % and less than or equal to 20.0 mol. % Nb$_2$O$_5$, greater than or equal to 0.0 mol. % and less than or equal to 20.0 mol. % TiO$_2$, greater than or equal to 0.0 mol. % and less than or equal to 10.0 mol. % TeO$_2$, greater than or equal to 0.0 mol. % and less than or equal to 7.5 mol. % SiO$_2$ and greater than or equal to 0.0 mol. % and less than or equal to 4.0 mol. % Y$_2$O$_3$.

According to a twenty-eighth aspect, the glass of any one of aspects 23-27, wherein the composition of the components comprises one or more of the following components: greater than or equal to 23.5 mol. % and less than or equal to 32.0 mol. % B$_2$O$_3$, greater than or equal to 13.5 mol. % and less than or equal to 22.0 mol. % La$_2$O$_3$, greater than or equal to 9.0 mol. % and less than or equal to 38.0 mol. % WO$_3$, greater than or equal to 4.4 mol. % and less than or equal to 8.6 mol. % ZrO$_2$, greater than or equal to 3.0 mol. % and less than or equal to 16.0 mol. % Nb$_2$O$_5$, greater than or equal to 1.0 mol. % and less than or equal to 18.0 mol. % TiO$_2$, greater than or equal to 0.5 mol. % and less than or equal to 11.5 mol. % Bi$_2$O$_3$, greater than or equal to 0.0 mol. % and less than or equal to 8.5 mol. % TeO$_2$, greater than or equal to 0.0 mol. % and less than or equal to 5.5 mol. % SiO$_2$, greater than or equal to 0.0 mol. % and less than or equal to 3.4 mol. % Y$_2$O$_3$ and greater than or equal to 0.0 mol. % and less than or equal to 0.9 mol. % CaO.

According to a twenty-ninth aspect, the glass of any one of aspects 23-28, wherein the composition of the components comprises greater than or equal to 24.5 mol. % and less than or equal to 31.0 mol. % B$_2$O$_3$, greater than or equal to 14.25 mol. % and less than or equal to 21.0 mol. % La$_2$O$_3$, greater than or equal to 13.0 mol. % and less than or equal to 35.0 mol. % WO$_3$, greater than or equal to 0.5 mol. % and less than or equal to 10.0 mol. % Bi$_2$O$_3$, greater than or equal to 4.5 mol. % and less than or equal to 16.0 mol. % Nb$_2$O$_5$, greater than or equal to 0.0 mol. % and less than or equal to 5.0 mol. % SiO$_2$, greater than or equal to 3.5 mol. % and less than or equal to 15.5 mol. % TiO$_2$, greater than or equal to 0.0 mol. % and less than or equal to 3.0 mol. % Y$_2$O$_3$, greater than or equal to 5.0 mol. % and less than or equal to 8.5 mol. % ZrO$_2$, greater than or equal to 0.0 mol. % and less than or equal to 0.8 mol. % CaO and wherein the composition of the components is substantially free of TeO$_2$.

According to a thirtieth aspect, the glass of any one of aspects 23-26, wherein the composition of the components comprises greater than or equal to 10.0 mol. % and less than or equal to 25.0 mol. % Nb$_2$O$_5$, greater than or equal to 5.0 mol. % and less than or equal to 35.0 mol. % WO$_3$, greater than or equal to 5.0 mol. % and less than or equal to 20.0 mol. % La$_2$O$_3$ and greater than or equal to 5.0 mol. % and less than or equal to 20.0 mol. % TiO$_2$.

According to a thirty-first aspect, the glass of any one of aspects 23-27 and 30, wherein the composition of the components comprises greater than or equal to 5.0 mol. % and less than or equal to 20.0 mol. % WO$_3$ and greater than or equal to 1.0 mol. % and less than or equal to 15.0 mol. % Bi$_2$O$_3$.

According to a thirty-second aspect, the glass of any one of aspects 23-31, wherein the composition of the components comprises greater than or equal to 0.0 mol. % and less than or equal to 20.0 mol. % BaO, greater than or equal to 0.0 mol. % and less than or equal to 20.0 mol. % CdO, greater than or equal to 0.0 mol. % and less than or equal to 20.0 mol. % ZnO, greater than or equal to 0.0 mol. % and less than or equal to 15.0 mol. % Li$_2$O+Na$_2$O+K$_2$O and greater than or equal to 0.0 mol. % and less than or equal to 15.0 mol. % MgO+CaO+SrO.

According to a thirty-third aspect, the glass of any one of aspects 23-32, wherein the composition of the components comprises greater than or equal to 0.0 mol. % and less than or equal to 5.0 mol. % Al$_2$O$_3$ and wherein the composition of the components satisfies the conditions: 0.00≤P$_2$O$_5$/B$_2$O$_3$ [mol. %]≤0.50, where chemical formulas mean the content of corresponding components in the glass.

According to a thirty-fourth aspect, the glass of any one of aspects 23-33, wherein the composition of the components comprises greater than or equal to 0.0 mol. % and less than or equal to 3.0 mol. % MoO$_3$, greater than or equal to 0.0 mol. % and less than or equal to 2.0 mol. % Ta$_2$O$_5$, greater than or equal to 0.0 mol. % and less than or equal to 1.0 mol. % Sb$_2$O$_3$, greater than or equal to 0.0 mol. % and less than or equal to 0.5 mol. % GeO$_2$, greater than or equal to 0.0 mol. % and less than or equal to 0.5 mol. % PbO, greater than or equal to 0.0 mol. % and less than or equal to 0.2 mol. % As$_2$O$_3$, greater than or equal to 0.0 mol. % and less than or equal to 0.5 mol. % FeO+Fe$_2$O$_3$, wherein the composition of the components is substantially free of fluorine and V$_2$O$_5$.

According to a thirty-fifth aspect, the glass of any one of aspects 23-34, wherein the glass has a glass formation parameter, $P_{GF}$ that is greater than or equal to −1 and less than or equal to 10, where $P_{GF}$ is calculated from the glass composition in terms of mol. % of the components according to the Formula (III):

$P_{GF}$=(B$_2$O$_3$/3)+max(0,WO$_3$—TiO$_2$−0.5\*ZrO$_2$)+
Nb$_2$O$_5$+Ta$_2$O$_5$—(RE$_m$O$_n$+Bi$_2$O$_3$),     (III)

where RE$_m$O$_n$ is a total sum of rare earth metal oxides, max(0, WO$_3$−TiO$_2$−0.5\*ZrO$_2$) refers to the greater of 0 and a difference WO$_3$—TiO$_2$−0.5\*ZrO$_2$, and an asterisk (\*) means multiplication.

According to a thirty-sixth aspect, the glass of any one of aspects 23-35, wherein the glass has a density at room temperature, $d_{RT}$ that is greater than or equal to 4.5 g/cm$^3$ and less than or equal to 6.3 g/cm$^3$, a Young's modulus, E that is greater than or equal to 100 GPa and less than or equal to 140 GPa, a refractive index at 587.56 nm, $n_d$ that is greater than or equal to 2.0 and less than or equal to 2.2, an Abbe number, $v_d$ that is greater than or equal to 14 and less than or equal to 23 and a linear thermal expansion coefficient of glass in the range 20-300° C., $\alpha_{20\text{-}300}$ that is greater than or equal to 60×10$^{-7}$ and less than or equal to 90×10$^{-7}$ K$^{-1}$.

According to a thirty-seventh aspect, the glass of any one of aspects 23-36, wherein the glass satisfies the conditions: 4.5≤$P_d$ 5.7 and 2.1≤$P_n$≤2.2.

According to a thirty-eighth aspect, the glass of any one of aspects 23-37, wherein the glass has a density at room temperature, $d_{RT}$ that is greater than or equal to 4.5 g/cm$^3$ and less than or equal to 5.7 g/cm$^3$ and a refractive index at 587.56 nm, $n_d$ that is greater than or equal to 2.1 and less than or equal to 2.2.

According to a thirty-ninth aspect, the glass of any one of aspects 23-38, wherein the glass has an Abbe number, $v_d$ that is greater than or equal to 15 and less than or equal to 21.

According to a fortieth aspect, the glass of any one of aspects 23-39, wherein the glass has a liquidus temperature, $T_{liq}$ that is less than or equal to 1200° C., and wherein the glass satisfies the conditions:

$$\log\left[\frac{(P_{Tg}+273)}{(T_{liq}+273)}\right] > -0.21 \text{ and } 500 \le P_{Tg} \le 700,$$

where $P_{Tg}$ is a $T_g$ parameter, calculated from the glass composition in terms of mol. % of the components according to the Formula (VI):

$P_{Tg}$=590+1.2049*Al$_2$O$_3$–0.73463*B$_2$O$_3$+
    0.48384*BaO–4.6279*Bi$_2$O$_3$+5.1528*Er$_2$O$_3$+
    4.7419*Gd$_2$O$_3$–0.46782*GeO$_2$–5.4336*K$_2$O+
    3.6709*La$_2$O$_3$–4.4120*Li$_2$O–4.5127*Na$_2$O+
    1.5185*Nb$_2$O$_5$–2.2882*PbO+0.18633*SiO$_2$+
    0.59627*SrO+2.9784*Ta$_2$O$_5$–4.1591*TeO$_2$+
    1.1157*TiO$_2$–2.0154*WO$_3$+4.7923*Y$_2$O$_3$+
    3.0372*Yb$_2$O$_3$–1.8077*ZnO+0.40110*ZrO$_2$,     (VI)

where an asterisk (*) means multiplication.

According to a forty-first aspect, the glass of any one of aspects 23-40, wherein the glass has logarithmic ratio LR($T_g$, $T_{liq}$) that is greater than or equal to −0.21, a glass transition temperature, $T_g$ that is greater than or equal to 500° C. and less than or equal to 700° C. and a liquidus temperature, $T_{liq}$ that is less than or equal to 1200° C., where the logarithmic ratio ($T_g/T_{liq}$), LR($T_g$, $T_{liq}$) is calculated according to the Formula (I):

$$LR(T_g, T_{liq}) = \log\left[\frac{(T_g+273)}{(T_{liq}+273)}\right]. \quad (I)$$

According to a forty-second aspect, the glass of any one of aspects 23-41, wherein the composition of the components satisfies the conditions: (La$_2$O$_3$+Y$_2$O$_3$)/(TiO$_2$+Bi$_2$O$_3$) [mol. %]≤0.70, 1.0≤Nb$_2$O$_5$/TiO$_2$ [mol. %]≤1.5 and 0.00 SiO$_2$/B$_2$O$_3$ [mol. %]≤0.40.

According to a forty-third aspect, the glass of any one of aspects 23-42, wherein when cooled in air from 1100° C. to 500° C. in 2.5 minutes, the glass does not crystallize.

According to a forty-fourth aspect, the glass of any one of aspects 23-43, wherein when the glass has a thickness of 10 mm, the glass has wavelength corresponding to 70% total transmittance, $\lambda_{70\%}$ that is less than or equal to 450 nm.

According to a forty-fifth aspect, a method for manufacturing an optical element, the method comprising processing the glass of any one of aspects 23-44.

According to a forty-sixth aspect, an optical element comprising the glass of any one of aspects 23-45.

According to a forty-seventh aspect, the glass comprises a plurality of components, the glass having a composition of the components comprising greater than or equal to 10.0 mol. % B$_2$O$_3$, greater than or equal to 3.0 mol. % and less than or equal to 30.0 mol. % Nb$_2$O$_5$, greater than or equal to 0.0 mol. % and less than or equal to 40.0 mol. % TiO$_2$, greater than or equal to 0.0 mol. % and less than or equal to 25.0 mol. % La$_2$O$_3$, greater than or equal to 0.0 mol. % and less than or equal to 15.0 mol. % Bi$_2$O$_3$, greater than or equal to 0.0 mol. % and less than or equal to 14.0 mol. % TeO$_2$, greater than or equal to 0.0 mol. % and less than or equal to 10.0 mol. % P$_2$O$_5$, greater than or equal to 0.0 mol. % and less than or equal to 10.0 mol. % GeO$_2$, greater than or equal to 2.0 mol. % WO$_3$+Bi$_2$O$_3$, greater than or equal to 2.0 mol. % TiO$_2$+ZrO$_2$, greater than or equal to 1.0 mol. % TiO$_2$+Nb$_2$O$_5$, greater than or equal to 0.0 mol. % and less than or equal to 20.0 mol. % BaO+ZnO and may optionally contain one or more components selected from SiO$_2$, Al$_2$O$_3$, CaO, Er$_2$O$_3$, Gd$_2$O$_3$, K$_2$O, Li$_2$O, MgO, Na$_2$O, PbO, SrO, Ta$_2$O$_5$, Y$_2$O$_3$ and Yb$_2$O$_3$, wherein the composition of the components satisfies the condition: Nb$_2$O$_5$— SiO$_2$ [mol. %]≥3.0, and the glass satisfies the conditions: 500≤$P_{Tg}$≤750 and $P_n$−(1.47+0.0009*$P_{Tg}$)>0.000, where $P_n$ is a refractive index parameter, calculated from the glass composition in terms of mol. % of the components according to the Formula (IV):

$P_n$=−0.0058979*Al$_2$O$_3$–0.006059*B$_2$O$_3$–
    0.00099077*BaO+0.008748*Bi$_2$O$_3$–
    0.0023394*CaO+0.0063304*Er$_2$O$_3$+
    0.0019089*Gd$_2$O$_3$–0.0043254*GeO$_2$–
    0.0056788*K$_2$O+0.0036519*La$_2$O$_3$–
    0.0033647*Li$_2$O–0.0036379*MgO–
    0.0043599*Na$_2$O+0.0027829*Nb$_2$O$_5$–
    0.0085247*P$_2$O$_5$+0.0016124*PbO–
    0.0054718*SiO$_2$–0.0024916*SrO+
    0.0052979*Ta$_2$O$_5$–0.0030478*TeO$_2$+
    0.0018048*TiO$_2$+0.00087206*WO$_3$+
    0.0026681*Y$_2$O$_3$+0.0052852*Yb$_2$O$_3$–
    0.0012391*ZnO+2.05,     (IV)

$P_{Tg}$ is a $T_g$ parameter, calculated from the glass composition in terms of mol. % of the components according to the Formula (VI):

$P_{Tg}$=590+1.2049*Al$_2$O$_3$–0.73463*B$_2$O$_3$+
    0.48384*BaO–4.6279*Bi$_2$O$_3$+5.1528*Er$_2$O$_3$+
    4.7419*Gd$_2$O$_3$–0.46782*GeO$_2$–5.4336*K$_2$O+
    3.6709*La$_2$O$_3$–4.4120*Li$_2$O–4.5127*Na$_2$O+
    1.5185*Nb$_2$O$_5$–2.2882*PbO+0.18633*SiO$_2$+
    0.59627*SrO+2.9784*Ta$_2$O$_5$–4.1591*TeO$_2$+
    1.1157*TiO$_2$–2.0154*WO$_3$+4.7923*Y$_2$O$_3$+
    3.0372*Yb$_2$O$_3$–1.8077*ZnO+0.40110*ZrO$_2$,     (VI)

where an asterisk (*) means multiplication.

According to a forty-eighth aspect, the glass of the forty-seventh aspect, wherein the glass has a glass transition temperature, $T_g$ that is greater than or equal to 500° C. and less than or equal to 750° C. and wherein the glass satisfies the condition: $n_d$−(1.47+0.0009*$T_g$)>0.000, where $n_d$ is a refractive index at 587.56 nm.

According to a forty-ninth aspect, the glass of any one of aspects 47-48, wherein the glass satisfies the condition: $n_d$−(1.49+0.0009*$T_g$)>0.000, where $n_d$ is a refractive index at 587.56 nm, and $T_g$ [° C.] is a glass transition temperature.

According to a fiftieth aspect, the glass of any one of aspects 47-49, wherein the glass satisfies the condition: $P_n-(1.49+0.0009*P_{Tg})>0.000$.

According to a fifty-first aspect, the glass of any one of aspects 47-50, wherein the composition of the components comprises greater than or equal to 20.0 mol. % and less than or equal to 35.0 mol. % $B_2O_3$, greater than or equal to 10.0 mol. % and less than or equal to 25.0 mol. % $La_2O_3$, greater than or equal to 3.0 mol. % and less than or equal to 20.0 mol. % $Nb_2O_5$, greater than or equal to 2.5 mol. % and less than or equal to 10.0 mol. % $ZrO_2$, greater than or equal to 2.0 mol. % and less than or equal to 40.0 mol. % $WO_3$, greater than or equal to 2.0 mol. % and less than or equal to 20.0 mol. % $TiO_2$, greater than or equal to 0.0 mol. % and less than or equal to 10.0 mol. % $TeO_2$, greater than or equal to 0.0 mol. % and less than or equal to 7.5 mol. % $SiO_2$ and greater than or equal to 0.0 mol. % and less than or equal to 4.0 mol. % $Y_2O_3$.

According to a fifty-second aspect, the glass of any one of aspects 47-51, wherein the composition of the components comprises one or more of the following components: greater than or equal to 23.5 mol. % and less than or equal to 32.0 mol. % $B_2O_3$, greater than or equal to 13.5 mol. % and less than or equal to 22.0 mol. % $La_2O_3$, greater than or equal to 9.0 mol. % and less than or equal to 38.0 mol. % $WO_3$, greater than or equal to 4.4 mol. % and less than or equal to 8.6 mol. % $ZrO_2$, greater than or equal to 3.0 mol. % and less than or equal to 16.0 mol. % $Nb_2O_5$, greater than or equal to 2.0 mol. % and less than or equal to 18.0 mol. % $TiO_2$, greater than or equal to 2.0 mol. % and less than or equal to 11.5 mol. % $Bi_2O_3$, greater than or equal to 0.0 mol. % and less than or equal to 8.5 mol. % $TeO_2$, greater than or equal to 0.0 mol. % and less than or equal to 5.5 mol. % $SiO_2$, greater than or equal to 0.0 mol. % and less than or equal to 3.4 mol. % $Y_2O_3$ and greater than or equal to 0.0 mol. % and less than or equal to 0.9 mol. % CaO.

According to a fifty-third aspect, the glass of any one of aspects 47-52, wherein the composition of the components comprises greater than or equal to 24.5 mol. % and less than or equal to 31.0 mol. % $B_2O_3$, greater than or equal to 14.25 mol. % and less than or equal to 21.0 mol. % $La_2O_3$, greater than or equal to 13.0 mol. % and less than or equal to 35.0 mol. % $WO_3$, greater than or equal to 2.0 mol. % and less than or equal to 10.0 mol. % $Bi_2O_3$, greater than or equal to 4.5 mol. % and less than or equal to 16.0 mol. % $Nb_2O_5$, greater than or equal to 3.5 mol. % and less than or equal to 15.5 mol. % $TiO_2$, greater than or equal to 5.0 mol. % and less than or equal to 8.5 mol. % $ZrO_2$, greater than or equal to 0.0 mol. % and less than or equal to 5.0 mol. % $SiO_2$, greater than or equal to 0.0 mol. % and less than or equal to 3.0 mol. % $Y_2O_3$, greater than or equal to 0.0 mol. % and less than or equal to 0.8 mol. % CaO and wherein the composition of the components is substantially free of $TeO_2$.

According to a fifty-fourth aspect, the glass of any one of aspects 47-50, wherein the composition of the components comprises greater than or equal to 10.0 mol. % and less than or equal to 25.0 mol. % $Nb_2O_5$, greater than or equal to 5.0 mol. % and less than or equal to 35.0 mol. % $WO_3$, greater than or equal to 5.0 mol. % and less than or equal to 20.0 mol. % $La_2O_3$, greater than or equal to 5.0 mol. % and less than or equal to 20.0 mol. % $TiO_2$ and greater than or equal to 2.0 mol. % and less than or equal to 15.0 mol. % $Bi_2O_3$.

According to a fifty-fifth aspect, the glass of any one of aspects 47-51 and 54, wherein the composition of the components comprises greater than or equal to 5.0 mol. % and less than or equal to 20.0 mol. % $WO_3$ and greater than or equal to 2.0 mol. % and less than or equal to 15.0 mol. % $Bi_2O_3$.

According to a fifty-sixth aspect, the glass of any one of aspects 47-55, wherein the composition of the components comprises greater than or equal to 0.0 mol. % and less than or equal to 20.0 mol. % CdO, greater than or equal to 0.0 mol. % and less than or equal to 15.0 mol. % $Li_2O+Na_2O+K_2O$ and greater than or equal to 0.0 mol. % and less than or equal to 15.0 mol. % MgO+CaO+SrO.

According to a fifty-seventh aspect, the glass of any one of aspects 47-56, wherein the composition of the components comprises greater than or equal to 0.0 mol. % and less than or equal to 5.0 mol. % $Al_2O_3$ and wherein the composition of the components satisfies the conditions: $0.00 \leq P_2O_5/B_2O_3$ [mol. %]$\leq 0.50$, where chemical formulas mean the content of corresponding components in the glass.

According to a fifty-eighth aspect, the glass of any one of aspects 47-57, wherein the composition of the components comprises greater than or equal to 0.0 mol. % and less than or equal to 3.0 mol. % $MoO_3$, greater than or equal to 0.0 mol. % and less than or equal to 2.0 mol. % $Ta_2O_5$, greater than or equal to 0.0 mol. % and less than or equal to 1.0 mol. % $Sb_2O_3$, greater than or equal to 0.0 mol. % and less than or equal to 0.5 mol. % $GeO_2$, greater than or equal to 0.0 mol. % and less than or equal to 0.5 mol. % PbO, greater than or equal to 0.0 mol. % and less than or equal to 0.2 mol. % $As_2O_3$, greater than or equal to 0.0 mol. % and less than or equal to 0.5 mol. % $FeO+Fe_2O_3$, wherein the composition of the components is substantially free of fluorine and substantially free of $V_2O_5$.

According to a fifty-ninth aspect, the glass of any one of aspects 47-58, wherein the glass has a glass formation parameter, $P_{GF}$ that is greater than or equal to −1 and less than or equal to 10, where $P_{GF}$ is calculated from the glass composition in terms of mol. % of the components according to the Formula (III):

$$P_{GF}=(B_2O_3/3)+\max(0,WO_3\mathrm{—}TiO_2-0.5*ZrO_2)+Nb_2O_5+Ta_2O_5\mathrm{—}(RE_mO_n+Bi_2O_3), \quad \text{(III)}$$

where $RE_mO_n$ is a total sum of rare earth metal oxides, $\max(0, WO_3-TiO_2-0.5*ZrO_2)$ refers to the greater of 0 and a difference $WO_3\mathrm{—}TiO_2-0.5*ZrO_2$, and an asterisk (*) means multiplication.

According to a sixtieth aspect, the glass of any one of aspects 47-59, wherein the glass has a density at room temperature, $d_{RT}$ that is greater than or equal to 4.5 g/cm$^3$ and less than or equal to 6.3 g/cm$^3$, a Young's modulus, E that is greater than or equal to 100 GPa and less than or equal to 140 GPa, a refractive index at 587.56 nm, $n_d$ that is greater than or equal to 2.0 and less than or equal to 2.2, an Abbe number, $v_d$ that is greater than or equal to 14 and less than or equal to 23 and a linear thermal expansion coefficient of glass in the range 20-300° C., $\alpha_{20-300}$ that is greater than or equal to $60\times10^{-7}$ K$^{-1}$ and less than or equal to $90\times10^{-7}$ K$^{-1}$.

According to a sixty-first aspect, the glass of any one of aspects 47-60, wherein the glass satisfies the conditions: $4.5 \leq P_d \leq 5.7$ and $2.1 \leq P_n \leq 2.2$, where $P_d$ is a density parameter, calculated from the glass composition in terms of mol. % of the components according to the Formula (V):

$$P_d=4.488-0.030315*Al_2O_3-0.023886*B_2O_3+0.022641*BaO+0.075639*Bi_2O_3-0.0035072*CaO+0.072631*Er_2O_3+0.072133*Gd_2O_3-0.014396*GeO_2-0.019374*K_2O+0.051970*La_2O_3-0.011393*Li_2O-0.0049704*MgO-0.010898*Na_2O+0.0014888*Nb_2O_5-0.043265*P_2O_5+0.032783*PbO-$$

$$0.021778*SiO_2+0.0071976*SrO+$$
$$0.056465*Ta_2O_5+0.0079679*TeO_2-$$
$$0.0080419*TiO_2+0.023079*WO_3+$$
$$0.031205*Y_2O_3+0.080706*Yb_2O_3+$$
$$0.010824*ZnO+0.0073434*ZrO_2,\qquad (V)$$

an asterisk (*) means multiplication.

According to a sixty-second aspect, the glass of any one of aspects 47-61, wherein the glass has a density at room temperature, $d_{RT}$ that is greater than or equal to 4.5 g/cm$^3$ and less than or equal to 5.7 g/cm$^3$ and a refractive index at 587.56 nm, $n_d$ that is greater than or equal to 2.1 and less than or equal to 2.2.

According to a sixty-third aspect, the glass of any one of aspects 47-62, wherein the glass has an Abbe number, $v_d$ that is greater than or equal to 15 and less than or equal to 21.

According to a sixty-fourth aspect, the glass of any one of aspects 47-63, wherein the glass has a liquidus temperature, $T_{liq}$ that is less than or equal to 1200° C., and wherein the glass satisfies the conditions:

$$\log\left[\frac{(P_{Tg}+273)}{(T_{liq}+273)}\right] > -0.21 \text{ and } 500 \le P_{Tg} \le 700.$$

According to a sixty-fifth aspect, the glass of any one of aspects 47-64, wherein the glass has logarithmic ratio LR($T_g$, $T_{liq}$) that is greater than or equal to −0.21, a glass transition temperature, $T_g$ that is greater than or equal to 500° C. and less than or equal to 700° C. and a liquidus temperature, $T_{liq}$ that is less than or equal to 1200° C., the logarithmic ratio(, LR($T_g$, $T_{liq}$) is calculated according to the Formula (I):

$$LR(T_g, T_{liq}) = \log\left[\frac{(T_g+273)}{(T_{liq}+273)}\right]. \qquad (I)$$

According to a sixty-sixth aspect, the glass of any one of aspects 47-65, wherein the composition of the components satisfies the conditions: (La$_2$O$_3$+Y$_2$O$_3$)/(TiO$_2$+Bi$_2$O$_3$) [mol. %]≥0.70, 1.0≤Nb$_2$O$_5$/TiO$_2$ [mol. %]≤1.5 and 0.00 SiO$_2$/B$_2$O$_3$ [mol. %]≤0.40.

According to a sixty-seventh aspect, the glass of any one of aspects 47-66, wherein when cooled in air from 1100° C. to 500° C. in 2.5 minutes, the glass does not crystallize.

According to a sixty-eighth aspect, the glass of any one of aspects 47-67, wherein when having a thickness of 10 mm, the glass has wavelength corresponding to 70% total transmittance, $\lambda_{70\%}$ that is less than or equal to 450 nm.

According to a sixty-ninth aspect, a method for manufacturing an optical element, the method comprising processing the glass of any one of aspects 47-68.

According to a seventieth aspect, an optical element comprising the glass of any one of aspects 47-69.

According to a seventy first aspect, the glass of any one of aspects 1-70, wherein the glass has a liquidus viscosity that is greater than or equal to 2.0 Poise.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:
   greater than or equal to 10.0 mol. % and less than or equal to 40.0 mol. % B$_2$O$_3$,
   greater than or equal to 0.0 mol. % and less than or equal to 40.0 mol. % WO$_3$,
   greater than or equal to 0.0 mol. % and less than or equal to 30.0 mol. % Nb$_2$O$_5$,
   greater than or equal to 0.0 mol. % and less than or equal to 30.0 mol. % TiO$_2$,
   greater than or equal to 0.0 mol. % and less than or equal to 25.0 mol. % La$_2$O$_3$,
   greater than or equal to 0.0 mol. % and less than or equal to 20.0 mol. % Bi$_2$O$_3$,
   greater than or equal to 0.0 mol. % and less than or equal to 15.0 mol. % TeO$_2$,
   greater than or equal to 0.0 mol. % and less than or equal to 15.0 mol. % ZrO$_2$,
   greater than or equal to 0.0 mol. % and less than or equal to 10.0 mol. % SiO$_2$,
   greater than or equal to 0.0 mol. % and less than or equal to 10.0 mol. % PbO,
   greater than or equal to 0.0 mol. % and less than or equal to 10.0 mol. % GeO$_2$,
   greater than or equal to 0.0 mol. % and less than or equal to 10.0 mol. % P$_2$O$_5$,
   greater than or equal to 0.0 mol. % and less than or equal to 6.0 mol. % Y$_2$O$_3$,
   greater than or equal to 0.0 mol. % and less than or equal to 5.0 mol. % V$_2$O$_5$,
   greater than or equal to 0.1 mol. % WO$_3$+Bi$_2$O$_3$ and
   optionally comprising one or more components selected from rare earth metal oxides RE$_m$O$_n$, Al$_2$O$_3$, BaO, CaO, K$_2$O, Li$_2$O, MgO, Na$_2$O, SrO, Ta$_2$O$_5$ and ZnO,
wherein none of the ranges of the components is modified by the term "about"; and
wherein the composition of the components satisfies the condition:
   RE$_m$O$_n$+ZrO$_2$−Nb$_2$O$_5$ [mol. %]≥5.0, and
wherein the glass satisfies the conditions:
   $P_n$>2.04,
   −5≤P$_{GF}$≤15
where
   $P_n$ is a refractive index parameter, calculated from the glass composition in terms of mol. % of the components according to the Formula (IV):

$$P_n=-0.0058979*Al_2O_3-0.006059*B_2O_3-$$
$$0.00099077*BaO+0.008748*Bi_2O_3-$$
$$0.0023394*CaO+0.0063304*Er_2O_3+$$
$$0.0019089*Gd_2O_3-0.0043254*GeO_2-$$
$$0.0056788*K_2O+0.0036519*La_2O_3-$$
$$0.0033647*Li_2O-0.0036379*MgO-$$
$$0.0043599*Na_2O+0.0027829*Nb_2O_5-$$
$$0.0085247*P_2O_5+0.0016124*PbO-$$
$$0.0054718*SiO_2-0.0024916*SrO+$$
$$0.0052979*Ta_2O_5-0.0030478*TeO_2+$$
$$0.0018048*TiO_2+0.00087206*WO_3+$$
$$0.0026681*Y_2O_3+0.0052852*Yb_2O_3-$$
$$0.0012391*ZnO+2.05,\qquad (IV)$$

$P_{GF}$ is a glass formation parameter, calculated from the glass composition in terms of mol. % of the components according to the following formula:

$$P_{GF} = (B_2O_3/3) + \max(0, WO_3 - TiO_2 - 0.5*ZrO_2) + Nb_2O_5 + Ta_2O_5 - (RE_mO_n + Bi_2O_3), \quad \text{(III)}$$

where $RE_mO_n$ is a total sum of rare earth metal oxides, $\max(0, WO_3 - TiO_2 - 0.5*ZrO_2)$ refers to the greater of 0 and a difference $WO_3 - TiO_2 - 0.5*ZrO_2$, and an asterisk (*) means multiplication; and wherein neither the value of the refractive index parameter $P_n$ nor the value of the glass formation parameter $P_{GF}$ is modified by the term "about".

2. The glass of claim 1, wherein the glass has a refractive index at 587.56 nm, $n_d$ that is greater than or equal to 2.04, wherein the value of the refractive index at 587.56 nm, $n_d$ is not modified by the term "about".

3. The glass of claim 1, wherein the composition of the components comprises:

greater than or equal to 24.5 mol. % and less than or equal to 31.0 mol. % $B_2O_3$, greater than or equal to 14.25 mol. % and less than or equal to 21.0 mol. % $La_2O_3$, greater than or equal to 13.0 mol. % and less than or equal to 35.0 mol. % $WO_3$, greater than or equal to 0.1 mol. % and less than or equal to 10.0 mol. % $Bi_2O_3$, greater than or equal to 4.5 mol. % and less than or equal to 16.0 mol. % $Nb_2O_5$, greater than or equal to 0.0 mol. % and less than or equal to 5.0 mol. % $SiO_2$, greater than or equal to 3.5 mol. % and less than or equal to 15.5 mol. % $TiO_2$, greater than or equal to 5.0 mol. % and less than or equal to 8.5 mol. % $ZrO_2$, greater than or equal to 0.0 mol. % and less than or equal to 3.0 mol. % $Y_2O_3$, greater than or equal to 0.0 mol. % and less than or equal to 0.8 mol. % CaO and wherein, the composition of the components is substantially free of $TeO_2$.

4. The glass of claim 1, wherein $-1 \leq P_{GF} \leq 10$.

5. The glass of claim 1, wherein the glass has a liquidus temperature, $T_{liq}$ that is less than or equal to 1200° C., and wherein the glass satisfies the conditions:

$$\log\left[\frac{(P_{Tg} + 273)}{(T_{liq} + 273)}\right] > -0.21 \text{ and}$$

$$500 \leq P_{Tg} \leq 700,$$

where $P_{Tg}$ is a $T_g$ parameter, calculated from the glass composition in terms of mol. % of the components according to the Formula (VI):

$$\begin{aligned}P_{Tg} = &590 + 1.2049*Al_2O_3 - 0.73463*B_2O_3 + \\ &0.48384*BaO - 4.6279*Bi_2O_3 + 5.1528*Er_2O_3 + \\ &4.7419*Gd_2O_3 - 0.46782*GeO_2 - 5.4336*K_2O + \\ &3.6709*La_2O_3 - 4.4120*Li_2O - 4.5127*Na_2O + \\ &1.5185*Nb_2O_5 - 2.2882*PbO + 0.18633*SiO_2 + \\ &0.59627*SrO + 2.9784*Ta_2O_5 - 4.1591*TeO_2 + \\ &1.1157*TiO_2 - 2.0154*WO_3 + 4.7923*Y_2O_3 + \\ &3.0372*Yb_2O_3 - 1.8077*ZnO + 0.40110*ZrO_2, \quad \text{(VI)}\end{aligned}$$

where an asterisk (*) means multiplication, and wherein the value of the $T^g$ parameter $P_{Tg}$ is not modified by the term "about".

6. The glass of claim 1, wherein the composition of the components satisfies the conditions:

$(La_2O_3 + Y_2O_3)/(TiO_2 + Bi_2O_3)$ [mol. %] $\geq 0.70$, $1.0 \leq Nb_2O_5/TiO_2$ [mol. %] $\leq 1.5$ and $0.00 \leq SiO_2/B_2O_3$ [mol. %] $\leq 0.40$.

7. The glass of claim 1, wherein when cooled in air from 1100° C. to 500° C. in 2.5 minutes, the glass does not crystallize.

8. A glass comprising a plurality of components, the glass having a composition of the components comprising:

greater than or equal to 10.0 mol. % and less than or equal to 40.0 mol. % $B_2O_3$, greater than or equal to 0.5 mol. % and less than or equal to 20.0 mol. % $Bi_2O_3$, greater than or equal to 0.0 mol. % and less than or equal to 3.0 mol. % $P_2O_5$, greater than or equal to 0.0 at. % and less than or equal to 1.0 at. % Cu, greater than or equal to 0.0 at. % and less than or equal to 1.0 at. % Fe, greater than or equal to 0.0 mol. % and less than or equal to 25.0 mol. % $BaO+SrO+ZnO+CdO$, greater than or equal to 0.0 mol. % and less than or equal to 5.0 mol. % $MoO_3+V_2O_5$ and optionally comprising one or more components selected from $TiO_2$, $Nb_2O_5$, $SiO_2$, $Al_2O_3$, CaO, $Er_2O_3$, $Gd_2O_3$, $GeO_2$, $K_2O$, $La_2O_3$, $Li_2O$, MgO, $Na_2O$, PbO, $Ta_2O_5$, $TeO_2$, $WO_3$, $Y_2O_3$, $Yb_2O_3$ and $ZrO_2$, wherein none of the ranges of the components is modified by the term "about"; and wherein the composition of the components satisfies the conditions:

$TiO_2 - Nb_2O_5$ [mol. %] $\leq 5.0$ and $SiO_2 - B_2O_3$ [mol. %] $\leq 5.0$, and wherein the glass satisfies the conditions:

$P_n > 1.9$ and $P_n - (1.483 + 0.104*P_d) > 0.000$, where $P_n$ is a refractive index parameter, calculated from the glass composition in terms of mol. % of the components according to the Formula (IV):

$$\begin{aligned}P_n = &-0.0058979*Al_2O_3 - 0.006059*B_2O_3 - \\ &0.00099077*BaO + 0.008748*Bi_2O_3 - \\ &0.0023394*CaO + 0.0063304*Er_2O_3 + \\ &0.0019089*Gd_2O_3 - 0.0043254*GeO_2 - \\ &0.0056788*K_2O + 0.0036519*La_2O_3 - \\ &0.0033647*Li_2O - 0.0036379*MgO - \\ &0.0043599*Na_2O + 0.0027829*Nb_2O_5 - \\ &0.0085247*P_2O_5 + 0.0016124*PbO - \\ &0.0054718*SiO_2 - 0.0024916*SrO + \\ &0.0052979*Ta_2O_5 - 0.0030478*TeO_2 + \\ &0.0018048*TiO_2 + 0.00087206*WO_3 + \\ &0.0026681*Y_2O_3 + 0.0052852*Yb_2O_3 - \\ &0.0012391*ZnO + 2.05, \quad \text{(IV)}\end{aligned}$$

$P_d$ is a density parameter, calculated from the glass composition in terms of mol. % of the components according to the Formula (V):

$$\begin{aligned}P_d = &4.488 - 0.030315*Al_2O_3 - 0.023886*B_2O_3 + \\ &0.022641*BaO + 0.075639*Bi_2O_3 - \\ &0.0035072*CaO + 0.072631*Er_2O_3 + \\ &0.072133*Gd_2O_3 - 0.014396*GeO_2 - \\ &0.019374*K_2O + 0.051970*La_2O_3 - \\ &0.011393*Li_2O - 0.0049704*MgO - \end{aligned}$$

$$0.010898*Na_2O+0.0014888*Nb_2O_5-$$
$$0.043265*P_2O_5+0.032783*PbO-$$
$$0.021778*SiO_2+0.0071976*SrO+$$
$$0.056465*Ta_2O_5+0.0079679*TeO_2-$$
$$0.0080419*TiO_2+0.023079*WO_3+$$
$$0.031205*Y_2O_3+0.080706*Yb_2O_3+$$
$$0.010824*ZnO+0.0073434*ZrO_2, \quad\quad (V)$$

where an asterisk (*) means multiplication, and
wherein neither the value of the refractive index parameter
$P_n$ nor the value of the density parameter $P_d$ is modified by
the term "about".

9. The glass of claim 8, wherein the glass has
a refractive index at 587.56 nm, $n_d$ that is greater than or
equal to 1.9 and
wherein the glass satisfies the conditions:
$$n_d-(1.483+0.104*d_{RT})>0.000,$$
where
$d_{RT}$ [g/cm$^3$] is a density at room temperature, and
wherein neither the value of the refractive index at 587.56
nm, $n_d$ nor the value of the density at room temperature $d_{RT}$
is modified by the term "about".

10. The glass of claim 8, wherein the composition of the
components comprises:
greater than or equal to 24.5 mol. % and less than or equal
to 31.0 mol. % $B_2O_3$,
greater than or equal to 14.25 mol. % and less than or
equal to 21.0 mol. % $La_2O_3$,
greater than or equal to 13.0 mol. % and less than or equal
to 35.0 mol. % $WO_3$,
greater than or equal to 0.5 mol. % and less than or equal
to 10.0 mol. % $Bi_2O_3$,
greater than or equal to 4.5 mol. % and less than or equal
to 16.0 mol. % $Nb_2O_5$,
greater than or equal to 0.0 mol. % and less than or equal
to 5.0 mol. % $SiO_2$,
greater than or equal to 3.5 mol. % and less than or equal
to 15.5 mol. % $TiO_2$,
greater than or equal to 0.0 mol. % and less than or equal
to 3.0 mol. % $Y_2O_3$,
greater than or equal to 5.0 mol. % and less than or equal
to 8.5 mol. % $ZrO_2$,
greater than or equal to 0.0 mol. % and less than or equal
to 0.8 mol. % CaO and
wherein,
the composition of the components is substantially free of
$TeO_2$.

11. The glass of claim 8, wherein the glass satisfies the
condition:
$$-1\leq P_{GF}\leq 10,$$
where $P_{GF}$ is a glass formation parameter, calculated from
the glass composition in terms of mol. % of the components
according to the following formula:

$$P_{GF}=(B_2O_3/3)+max(0,WO_3-TiO_2-0.5*ZrO_2)+$$
$$Nb_2O_5+Ta_2O_5-(RE_mO_n+Bi_2O_3),$$

where $RE_mO_n$ is a total sum of rare earth metal oxides,
$max(0, WO_3-TiO_2-0.5*ZrO_2)$ refers to the greater of 0 and
a difference $WO_3-TiO_2-0.5*ZrO_2$, and an asterisk (*)
means multiplication, and
wherein the value of the glass formation parameter $P_{GF}$ is
not modified by the term "about".

12. The glass of claim 8, wherein the glass has
a liquidus temperature, $T_{liq}$ that is less than or equal to
1200° C., wherein the glass satisfies the conditions:

$$\log\frac{(P_{Tg}+273)}{(T_{liq}+273)} > -0.21 \text{ and}$$

$$500 \leq P_{Tg} \leq 700,$$

where
$P_{Tg}$ is a $T_g$ parameter, calculated from the glass compo-
sition in terms of mol. % of the components according
to the Formula (VI):

$$P_{Tg}=590+1.2049*Al_2O_3-0.73463*B_2O_3+$$
$$0.48384*BaO-4.6279*Bi_2O_3+5.1528*Er_2O_3+$$
$$4.7419*Gd_2O_3-0.46782*GeO_2-5.4336*K_2O+$$
$$3.6709*La_2O_3-4.4120*Li_2O-4.5127*Na_2O+$$
$$1.5185*Nb_2O_5-2.2882*PbO+0.18633*SiO_2+$$
$$0.59627*SrO+2.9784*Ta_2O_5-4.1591*TeO_2+$$
$$1.1157*TiO_2-2.0154*WO_3+4.7923*Y_2O_3+$$
$$3.0372*Yb_2O_3-1.8077*ZnO+0.40110*ZrO_2, \quad (VI)$$

where an asterisk (*) means multiplication, and
wherein the value of the glass formation parameter $P_{GF}$ is
not modified by the term "about".

13. The glass of claim 8, wherein the composition of the
components satisfies the conditions:
$(La_2O_3+Y_2O_3)/(TiO_2+Bi_2O_3)$ [mol. %]$\geq 0.70$,
$1.0\leq Nb_2O_5/TiO_2$ [mol. %]$\leq 1.5$ and
$0.00\leq SiO_2/B_2O_3$ [mol. %]$\leq 0.40$.

14. The glass of claim 8, wherein when cooled in air from
1100° C. to 500° C. in 2.5 minutes, the glass does not
crystallize.

15. A glass comprising a plurality of components, the
glass having a composition of the components comprising:
greater than or equal to 10.0 mol. % $B_2O_3$,
greater than or equal to 3.0 mol. % and less than or equal
to 30.0 mol. % $Nb_2O_5$,
greater than or equal to 0.0 mol. % and less than or equal
to 40.0 mol. % $TiO_2$,
greater than or equal to 0.0 mol. % and less than or equal
to 25.0 mol. % $La_2O_3$,
greater than or equal to 0.0 mol. % and less than or equal
to 15.0 mol. % $Bi_2O_3$,
greater than or equal to 0.0 mol. % and less than or equal
to 14.0 mol. % $TeO_2$,
greater than or equal to 0.0 mol. % and less than or equal
to 10.0 mol. % $P_2O_5$,
greater than or equal to 0.0 mol. % and less than or equal
to 10.0 mol. % $GeO_2$,
greater than or equal to 2.0 mol. % $WO_3+Bi_2O_3$,
greater than or equal to 2.0 mol. % $TiO_2+ZrO_2$,
greater than or equal to 1.0 mol. % $TiO_2+Nb_2O_5$,
greater than or equal to 0.0 mol. % and less than or equal
to 20.0 mol. % BaO+ZnO and
optionally comprising one or more components selected
from $SiO_2$, $Al_2O_3$, CaO, $Er_2O_3$, $Gd_2O_3$, $K_2O$, $Li_2O$,
MgO, $Na_2O$, PbO, SrO, $Ta_2O_5$, $Y_2O_3$ and $Yb_2O_3$,
wherein none of the ranges of the components is modified by
the term "about"; and
wherein the composition of the components satisfies the
condition:
$Nb_2O_5-SiO_2$ [mol. %]$\geq 3.0$,
and wherein the glass satisfies the conditions:
$500\leq P_{Tg}\leq 750$ and
$P_n-(1.47+0.0009*P_{Tg})>0.000,$
where
$P_n$ is a refractive index parameter, calculated from the
glass composition in terms of mol. % of the compo-
nents according to the Formula (IV):

$$P_n = -0.0058979*Al_2O_3 - 0.006059*B_2O_3 - \\ 0.00099077*BaO + 0.008748*Bi_2O_3 - \\ 0.0023394*CaO + 0.0063304*Er_2O_3 + \\ 0.0019089*Gd_2O_3 - 0.0043254*GeO_2 - \\ 0.0056788*K_2O + 0.0036519*La_2O_3 - \\ 0.0033647*Li_2O - 0.0036379*MgO - \\ 0.0043599*Na_2O + 0.0027829*Nb_2O_5 - \\ 0.0085247*P_2O_5 + 0.0016124*PbO - \\ 0.0054718*SiO_2 - 0.0024916*SrO + \\ 0.0052979*Ta_2O_5 - 0.0030478*TeO_2 + \\ 0.0018048*TiO_2 + 0.00087206*WO_3 + \\ 0.0026681*Y_2O_3 + 0.0052852*Yb_2O_3 - \\ 0.0012391*ZnO + 2.05, \qquad (IV)$$

$P_{Tg}$ is a $T_g$ parameter, calculated from the glass composition in terms of mol. % of the components according to the Formula (VI):

$$P_{Tg} = 590 + 1.2049*Al_2O_3 - 0.73463*B_2O_3 + \\ 0.48384*BaO - 4.6279*Bi_2O_3 + 5.1528*Er_2O_3 + \\ 4.7419*Gd_2O_3 - 0.46782*GeO_2 - 5.4336*K_2O + \\ 3.6709*La_2O_3 - 4.4120*Li_2O - 4.5127*Na_2O + \\ 1.5185*Nb_2O_5 - 2.2882*PbO + 0.18633*SiO_2 + \\ 0.59627*SrO + 2.9784*Ta_2O_5 - 4.1591*TeO_2 + \\ 1.1157*TiO_2 - 2.0154*WO_3 + 4.7923*Y_2O_3 + \\ 3.0372*Yb_2O_3 - 1.8077*ZnO + 0.40110*ZrO_2, \qquad (VI)$$

where an asterisk (*) means multiplication, and wherein neither the value of the refractive index parameter $P_n$ nor the value of the $T_g$ parameter $P_{Tg}$ is modified by the term "about".

16. The glass of claim 15, wherein the glass has
a glass transition temperature, $T_g$ that is greater than or equal to 500° C. and less than or equal to 750° C. and
wherein the glass satisfies the condition:
$$n_d - (1.47 + 0.0009*T_g) > 0.000,$$
where
$n_d$ is a refractive index at 587.56 nm, and
wherein neither the value of the refractive index at 587.56 nm, $n_d$ nor the value of the glass transition temperature $T_g$ is modified by the term "about".

17. The glass of claim 15, wherein the composition of the components comprises:
greater than or equal to 24.5 mol. % and less than or equal to 31.0 mol. % $B_2O_3$,
greater than or equal to 14.25 mol. % and less than or equal to 21.0 mol. % $La_2O_3$,
greater than or equal to 13.0 mol. % and less than or equal to 35.0 mol. % $WO_3$,
greater than or equal to 2.0 mol. % and less than or equal to 10.0 mol. % $Bi_2O_3$,
greater than or equal to 4.5 mol. % and less than or equal to 16.0 mol. % $Nb_2O_5$,
greater than or equal to 3.5 mol. % and less than or equal to 15.5 mol. % $TiO_2$,
greater than or equal to 5.0 mol. % and less than or equal to 8.5 mol. % $ZrO_2$,
greater than or equal to 0.0 mol. % and less than or equal to 5.0 mol. % $SiO_2$, greater than or equal to 0.0 mol. % and less than or equal to 3.0 mol. % $Y_2O_3$,
greater than or equal to 0.0 mol. % and less than or equal to 0.8 mol. % CaO and
wherein,
the composition of the components is substantially free of $TeO_2$.

18. The glass of claim 15, wherein the glass satisfies the condition:
$$-1 \leq P_{GF} \leq 10,$$
where $P_{GF}$ is a glass formation parameter, calculated from the glass composition in terms of mol. % of the components according to the following formula:

$$P_{GF} = (B_2O_3/3) + max(0, WO_3 - TiO_2 - 0.5*ZrO_2) + \\ Nb_2O_5 + Ta_2O_5 - (RE_mO_n + Bi_2O_3),$$

where $RE_mO_n$ is a total sum of rare earth metal oxides, $max(0, WO_3 - TiO_2 - 0.5*ZrO_2)$ refers to the greater of 0 and a difference $WO_3 - TiO_2 - 0.5*ZrO_2$, and an asterisk (*) means multiplication, and
wherein the value of the glass formation parameter $P_{GF}$ is not modified by the term "about".

19. The glass of claim 15, wherein the glass has
a liquidus temperature, $T_{liq}$ that is less than or equal to 1200° C.,
wherein the glass satisfies the conditions:

$$\log \frac{(P_{Tg} + 273)}{(T_{liq} + 273)} > -0.21 \text{ and}$$

$$500 \leq P_{Tg} \leq 700,$$

where
$P_{Tg}$ is a $T_g$ parameter, calculated from the glass composition in terms of mol. % of the components according to the Formula (VI):

$$P_{Tg} = 590 + 1.2049*Al_2O_3 - 0.73463*B_2O_3 + \\ 0.48384*BaO - 4.6279*Bi_2O_3 + 5.1528*Er_2O_3 + \\ 4.7419*Gd_2O_3 - 0.46782*GeO_2 - 5.4336*K_2O + \\ 3.6709*La_2O_3 - 4.4120*Li_2O - 4.5127*Na_2O + \\ 1.5185*Nb_2O_5 - 2.2882*PbO + 0.18633*SiO_2 + \\ 0.59627*SrO + 2.9784*Ta_2O_5 - 4.1591*TeO_2 + \\ 1.1157*TiO_2 - 2.0154*WO_3 + 4.7923*Y_2O_3 + \\ 3.0372*Yb_2O_3 - 1.8077*ZnO + 0.40110*ZrO_2, \qquad (VI)$$

where an asterisk (*) means multiplication, and wherein the value of $T_g$ parameter $P_{Tg}$ is not modified by the term "about".

20. The glass of claim 15, wherein when cooled in air from 1100° C. to 500° C. in 2.5 minutes, the glass does not crystallize.

\* \* \* \* \*